United States Patent [19]

Rusterholz et al.

[11] Patent Number: 4,945,479
[45] Date of Patent: Jul. 31, 1990

[54] TIGHTLY COUPLED SCIENTIFIC PROCESSING SYSTEM

[75] Inventors: John T. Rusterholz, Roseville; Charles J. Homan, St. Paul; Lowell E. Brown, Anoka; Donald B. Bennett, Burnsville; Robert J. Malnati, St. Paul; James R. Hamstra, Plymouth, all of Minn.

[73] Assignee: Unisys Corporation, Blue Bell, Pa.

[21] Appl. No.: 761,139

[22] Filed: Jul. 31, 1985

[51] Int. Cl.⁵ .............................................. G06F 9/00
[52] U.S. Cl. ................................ 364/200; 364/228.6; 364/228.9; 364/255.1
[58] Field of Search ... 364/200 MS File, 900 MS File

[56] References Cited

U.S. PATENT DOCUMENTS

| | | | |
|---|---|---|---|
| 3,541,516 | 11/1970 | Senzig | 364/200 |
| 4,101,960 | 7/1978 | Stokes et al. | 364/200 |
| 4,128,880 | 12/1978 | Cray, Jr. | 364/200 |
| 4,293,941 | 10/1981 | Muraoka et al. | 364/200 |
| 4,541,046 | 9/1985 | Nagashima et al. | 364/200 |
| 4,594,682 | 6/1986 | Drimark | 364/900 |
| 4,620,275 | 10/1986 | Wallach et al. | 364/200 |
| 4,651,274 | 3/1987 | Omoda et al. | 364/200 |

Primary Examiner—Gareth D. Shaw
Assistant Examiner—John G. Mills
Attorney, Agent, or Firm—Charles J. Johnson; Robert S. Bramson

[57] ABSTRACT

A tightly coupled data processing system having high performance characteristics, including at least one general purpose host processor coupled to host processor ports of a High Performance Storage Unit, and a Scientific Processor directly coupled to scientific processor ports of the High Performance Storage Unit is described. The Scientific Processor is under task assignment control of the host processor and shares the same memory space as the host processor, and thereby provides the tight coupling without need of dedicated memory or caching. Provision is also made for the Scientific Processor to share the virtual address space of the host processor. A tightly coupled system is also disclosed wherein a plurality of general purpose host processors are each coupled to one or more High Performance Storage Units, and a Multiple Unit Adapter is utilized to couple an associated Scientific Processor to all of the High Performance Storage Units. Each Scientific Processor includes a parallel operable scalar processor module and a vector processor module.

29 Claims, 58 Drawing Sheets

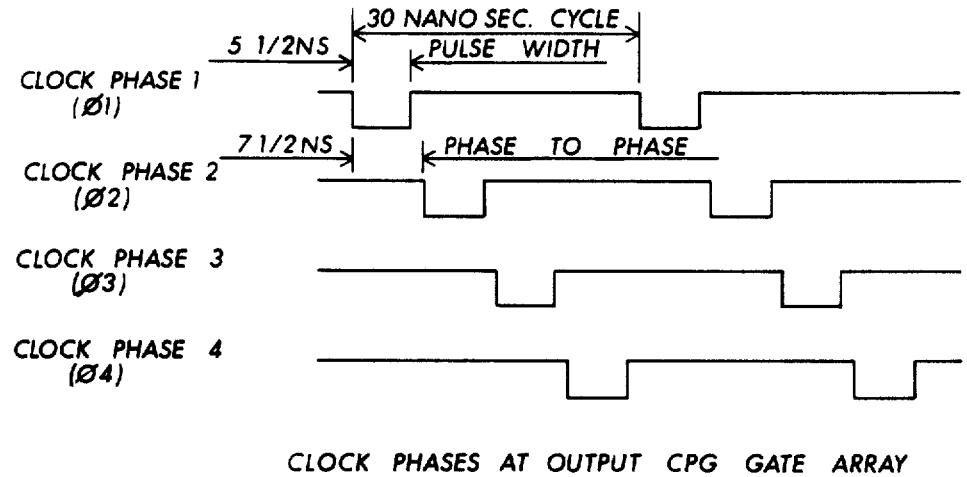
CLOCK PHASES AT OUTPUT CPG GATE ARRAY
*FIG. 7*
*FIG. 6*
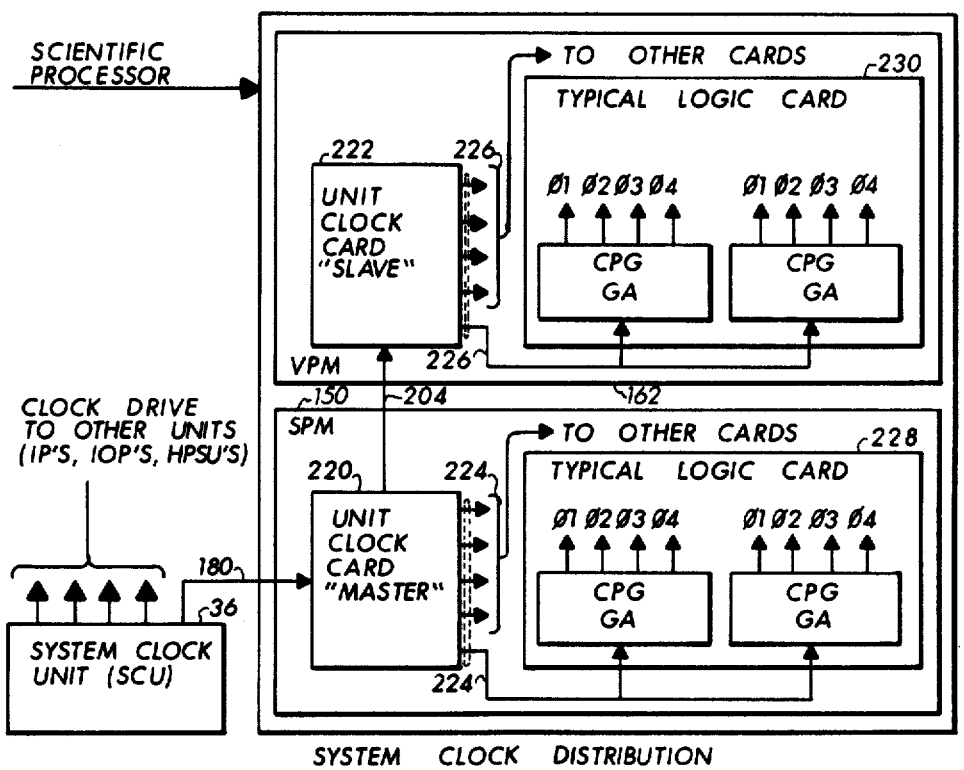
SYSTEM CLOCK DISTRIBUTION

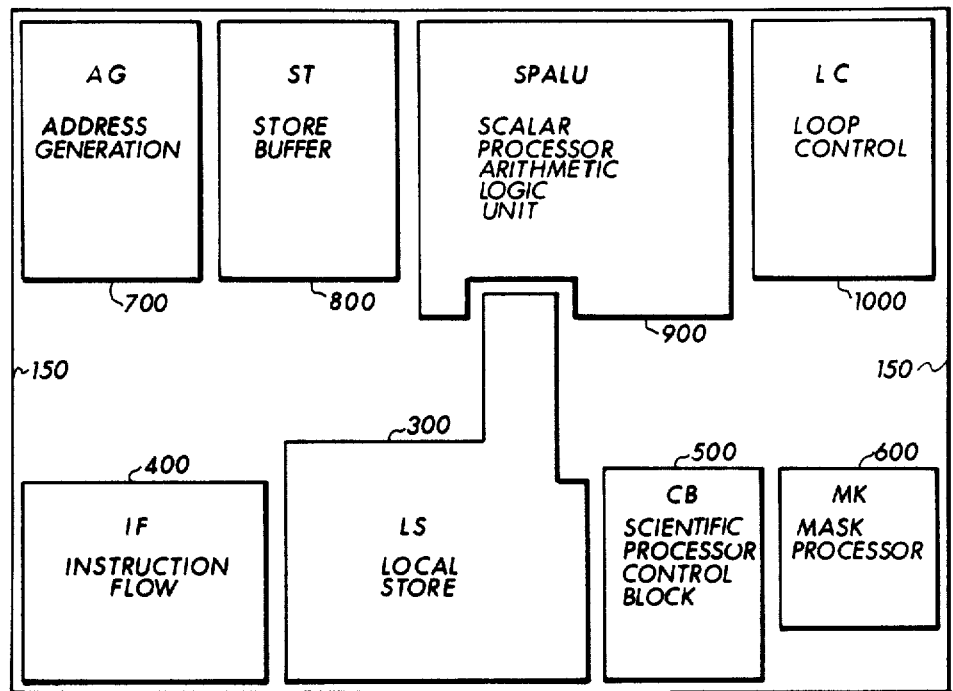
FIG. 8 — SPM BLOCK DIAGRAM
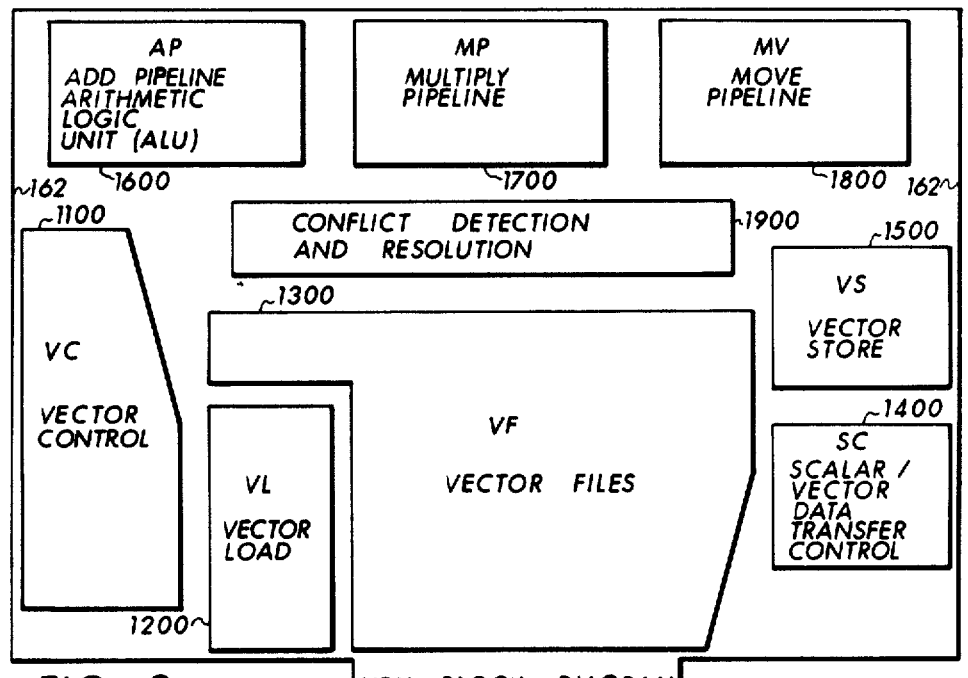
FIG. 9 — VPM BLOCK DIAGRAM

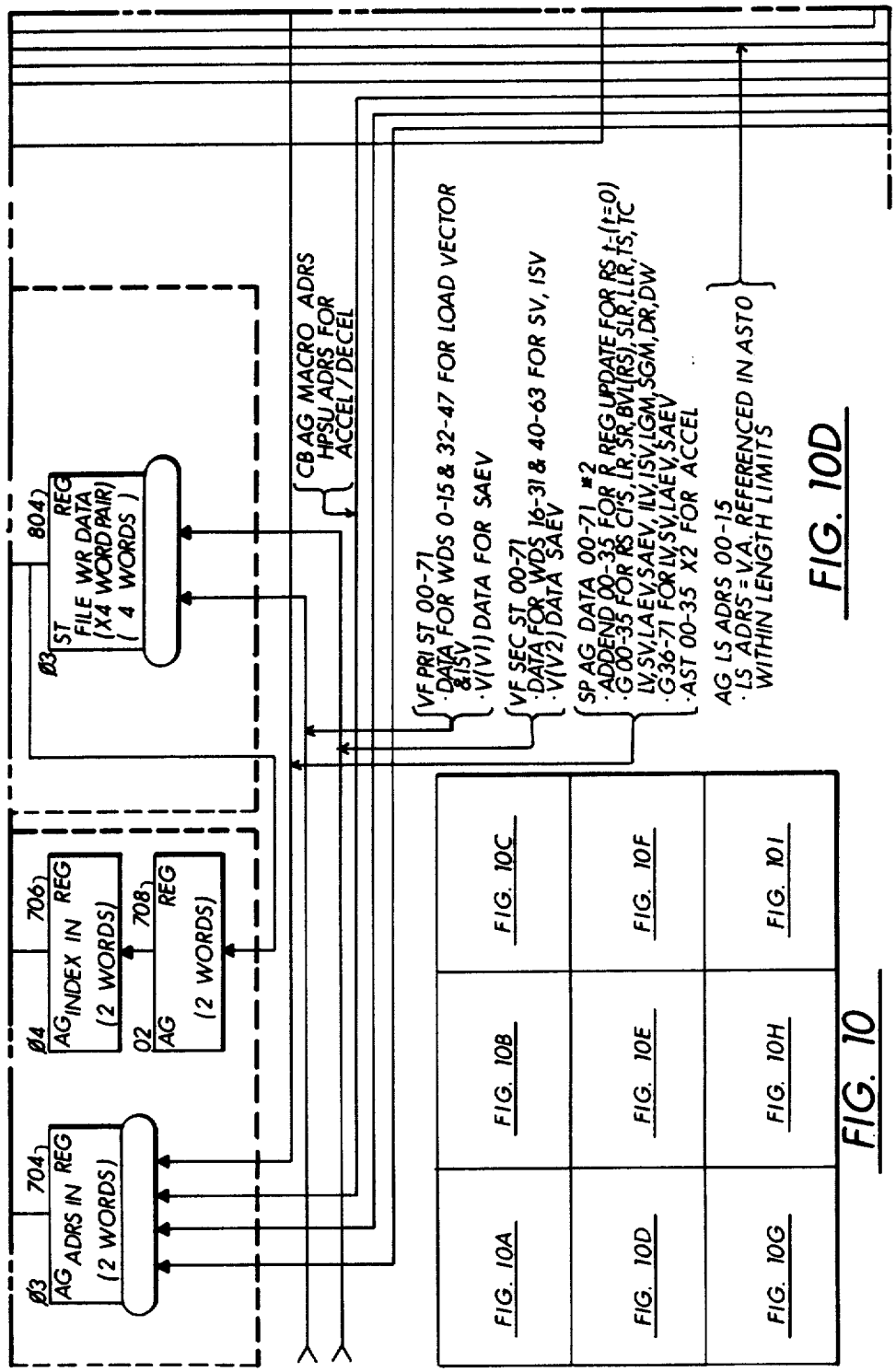

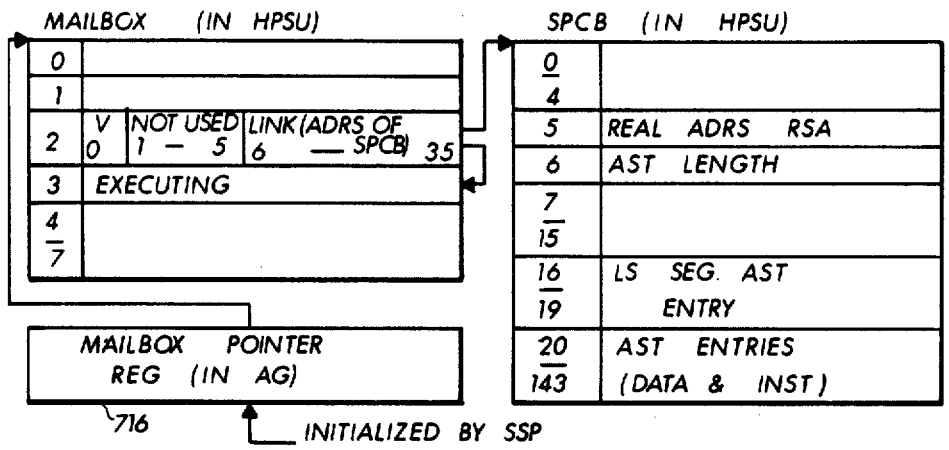
FIG. 12    LOCATING SPCB
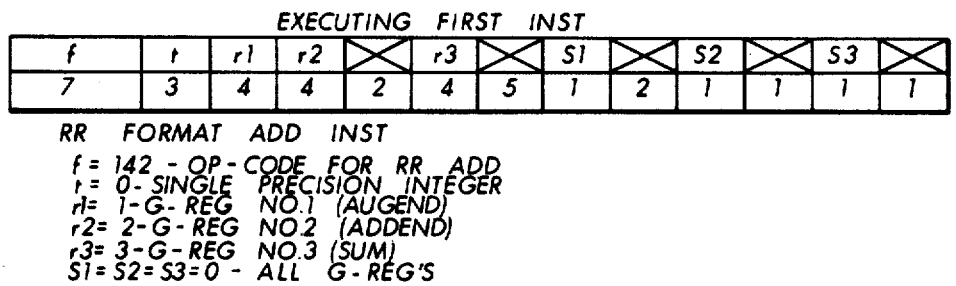
RR FORMAT ADD INST
f = 142 - OP-CODE FOR RR ADD
t = 0 - SINGLE PRECISION INTEGER
r1= 1 - G-REG NO.1 (AUGEND)
r2= 2 - G-REG NO.2 (ADDEND)
r3= 3 - G-REG NO.3 (SUM)
S1= S2=S3=0 - ALL G-REG'S
FIG. 13    EXAMPLE RR FORMAT ADD
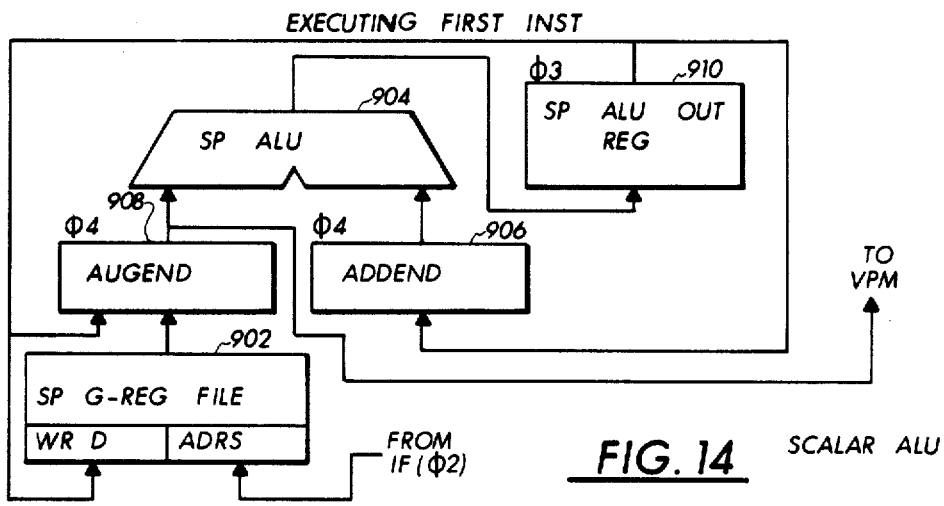
FIG. 14    SCALAR ALU

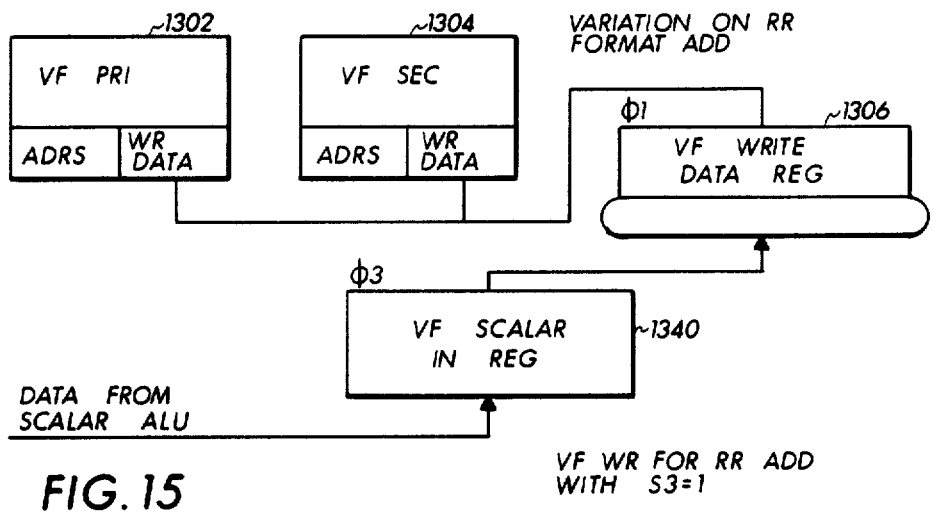

FIG. 15

| f | t | V1 | V2 | I | V3 | | S1 | | S2 | C |
|---|---|----|----|----|----|---|----|---|----|---|
| 7 | 3 | 4 | 4 | 2 | 4 | 6 | 1 | 2 | 1 | 2 |

VV FORMAT ADD INST
f = 042 - OP-CODE FOR VV ADD
t = 2 - SINGLE PRECISION FP
V1 = 4 - VECTOR FILE NO.4 (AUG)
V2 = 5 - VECTOR FILE NO.5 (ADD)
I = 0 - ELCNT (NO. ELEMENTS)
V3 = 6 - VECTOR FILE NO.6 (SUM)
S1 = S2 = 1 - VECTOR FILES (NOT G-REG)
C = 3 - DO ELEMENTS WITH ONE IN MASK

FIG. 16  THIRD INSTRUCTION

· SC X-FERS GOP TO VF DP & SP ADDEND REG WHEN AVAILABLE.

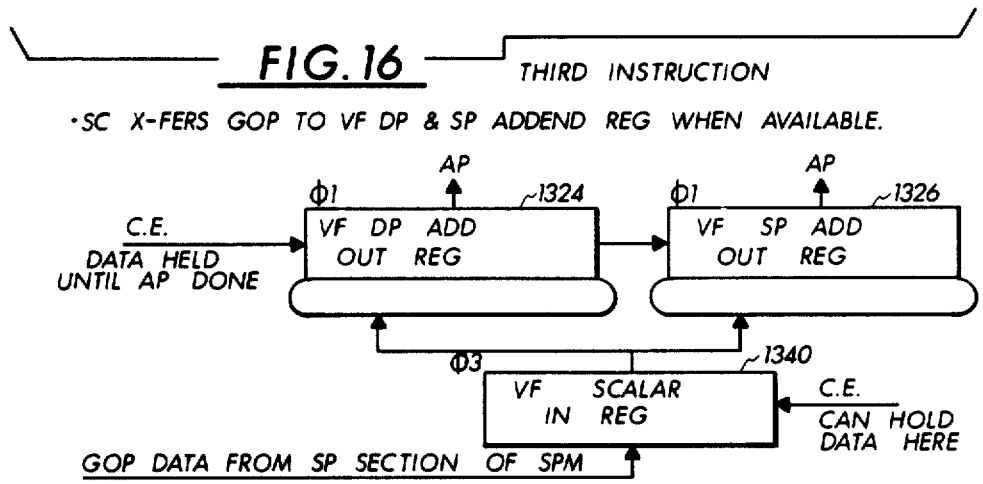

· SC CLEARS GOP WAIT DES AND TERMINATES. ALLOWS VC & AP TO PROCEED. REST IS SIMILAR TO THE PREVIOUS INST (VV ADD).

FIG. 17  VPM EXECUTING FOURTH INST GOP TRANSFER

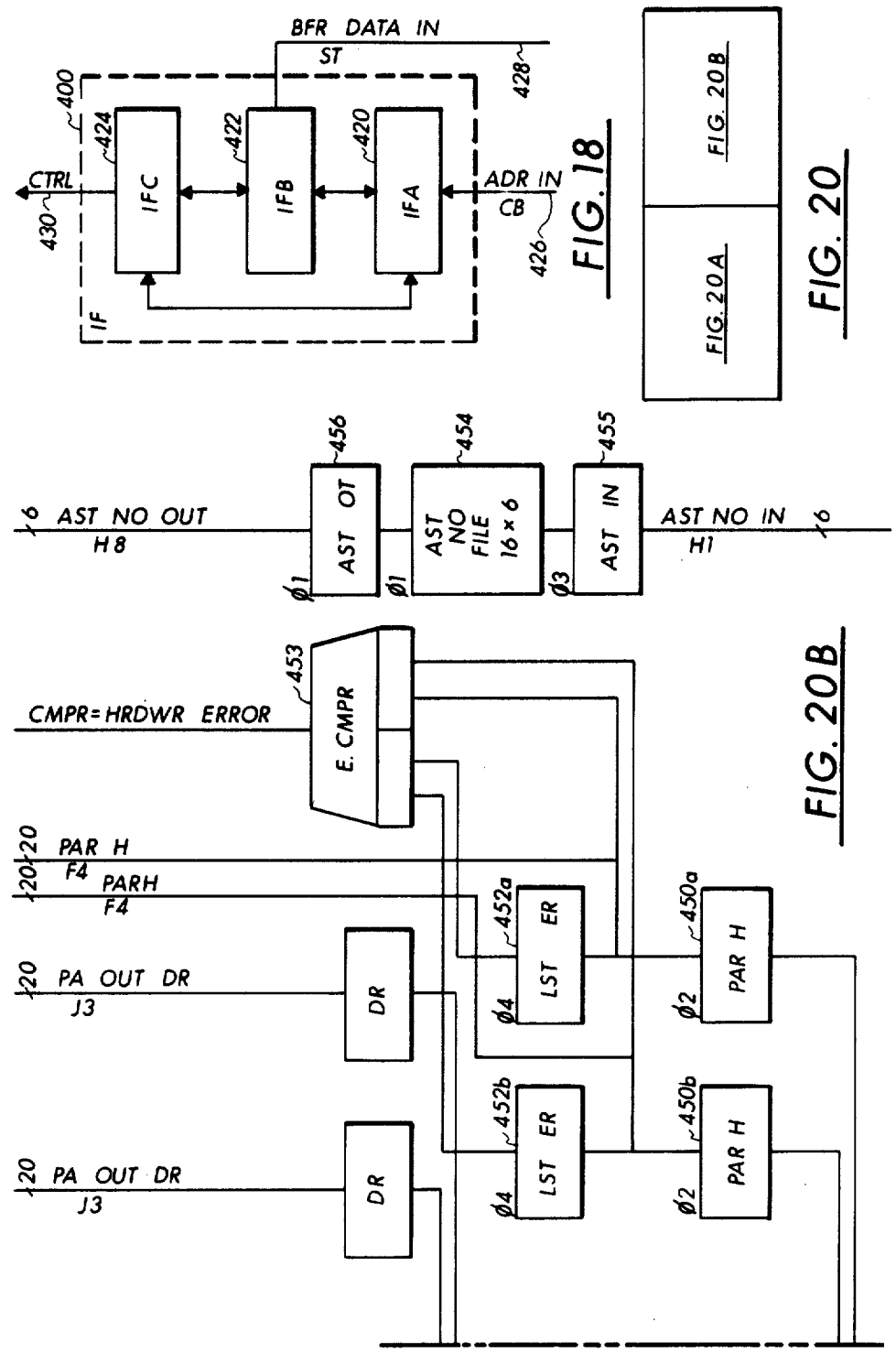

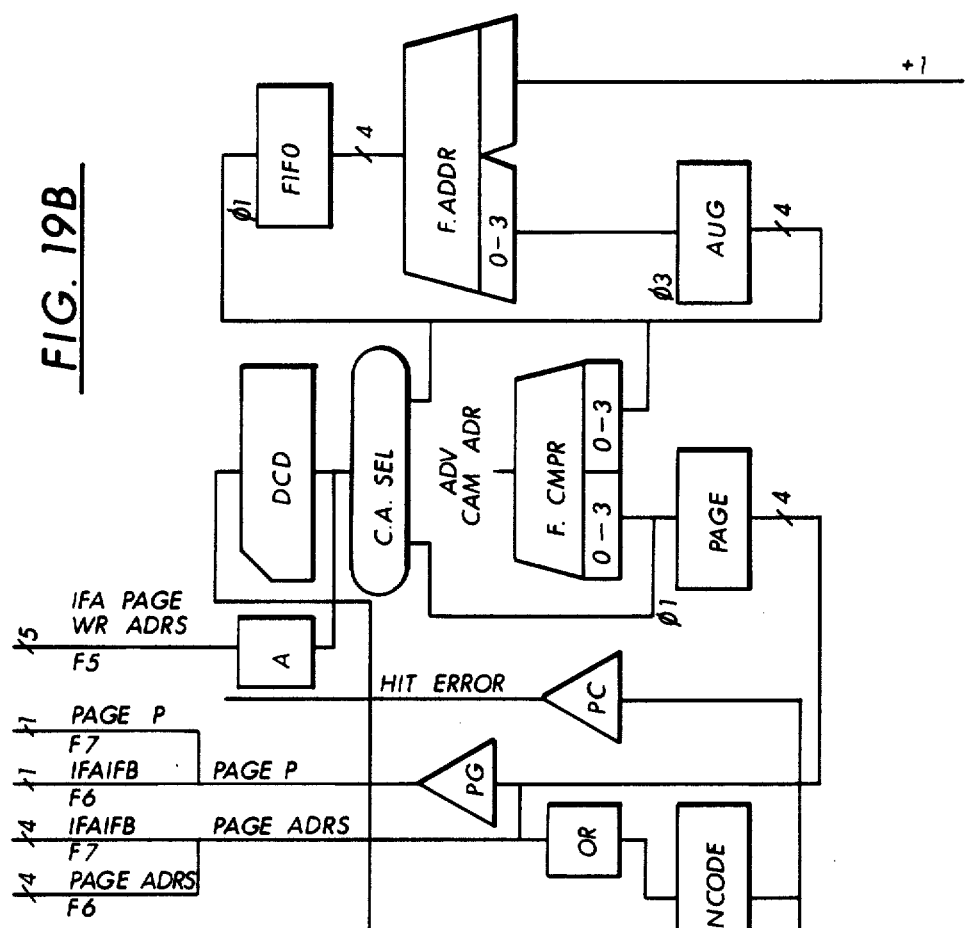
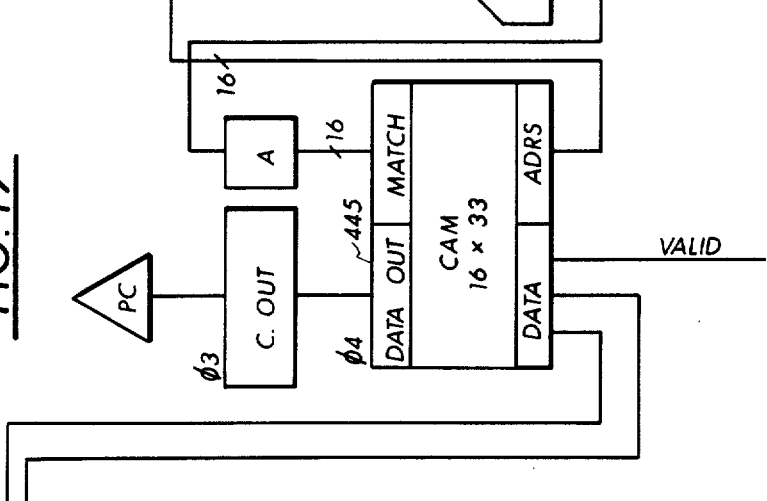
FIG. 19B
FIG. 19
| FIG. 19A | FIG. 19B |

INST BFR AND XRAM BLOCK DIAGRAM

OPERATION
36 BIT VIRTUAL ADRS USED FOR
INST BFR REFERENCES

VIRTUAL ADRS FORMAT

| SEGMENT ADRS | 0  0 | PAGE ADRS | WORD ADRS | BFR STACK ADRS |
|---|---|---|---|---|
| 00 - 17 | 18 - 19 | 20 - 27 | 28 - 33 | 34 - 35 |

FIG. 23  INST. BFR. REFERENCING

JP SEQ DESIGNATORS

JP SEQUENCE

\* IF JP TAKEN
\*\* IF JP NOT TAKEN

3 CYCLES JP TAKEN TIMING

3 CYCLES JP NOT TAKEN TIMING

RAISING BLOCK DESIGNATORS
FOR JUMP INSTRUCTIONS
(BLKS FOR JUMPS RESOLVED IN 4 CYCLES)

RAISING BLOCKS FOR
NON JUMP INSTRUCTIONS
(RESOLVED IN 3 CYCLES)

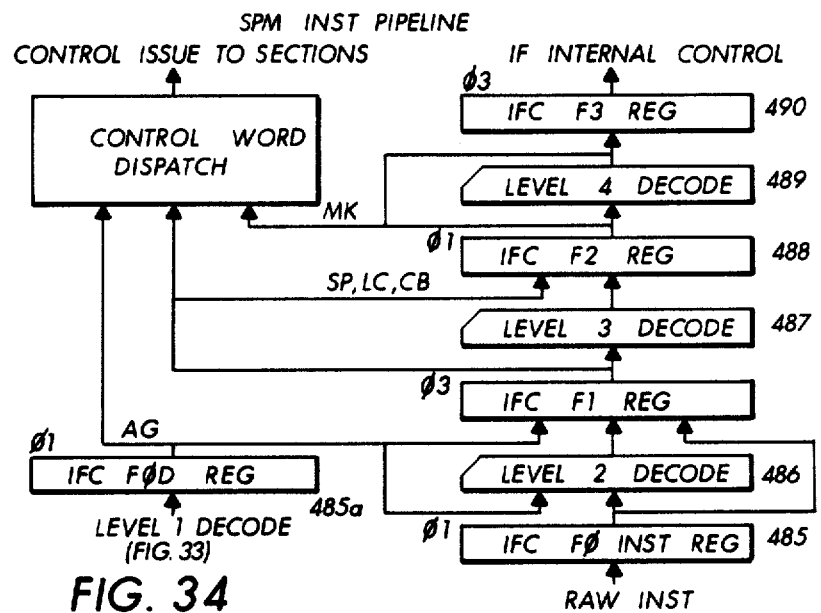
FIG. 34
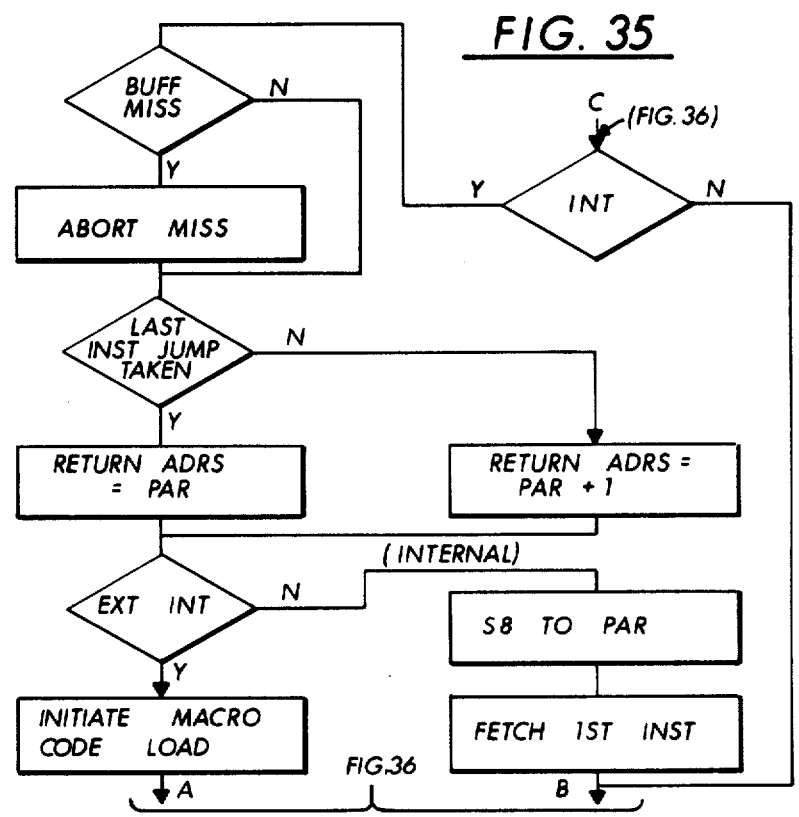
FIG. 35
FIG. 36

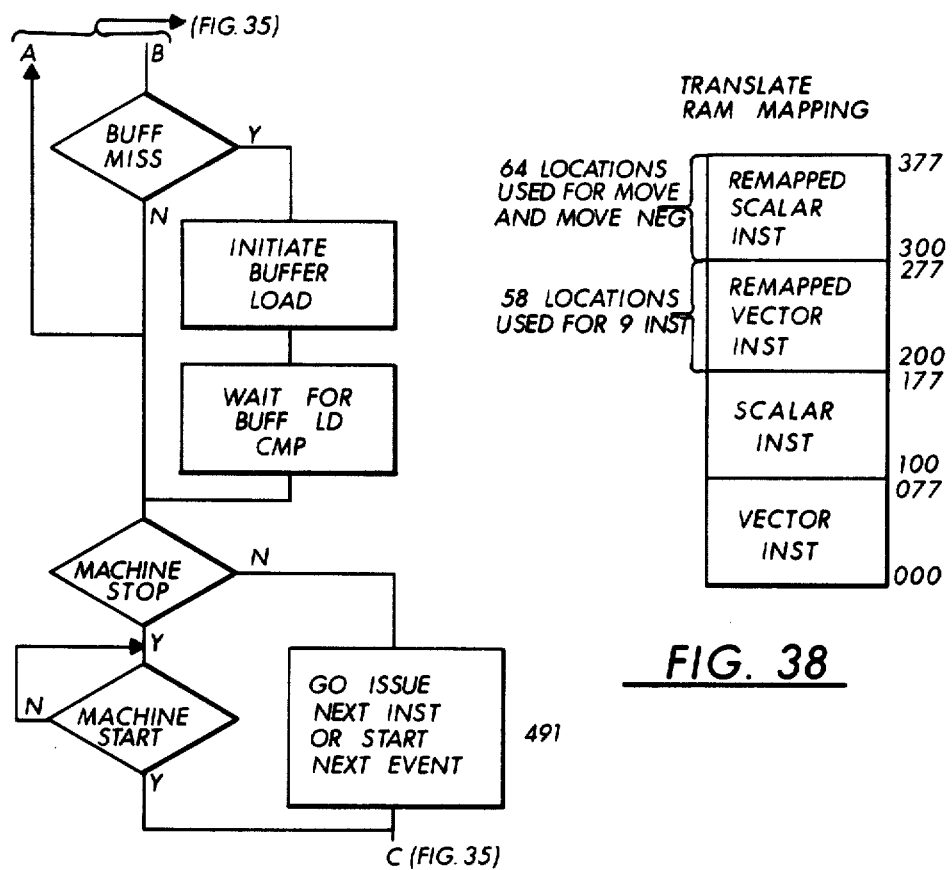
FIG. 36
FIG. 38
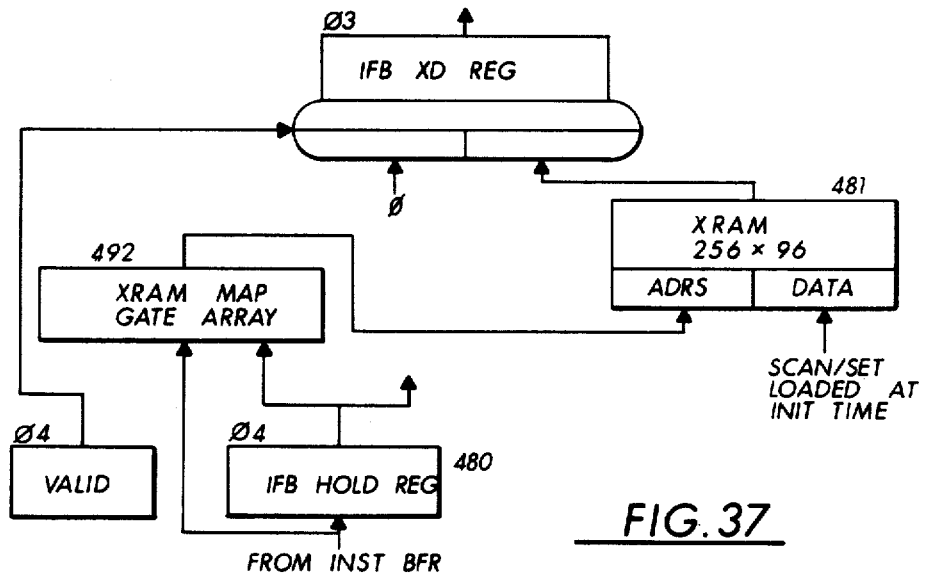
FIG. 37

FIG. 40

| | REMAPPED VECT INST | OCTAL ADRS |
|---|---|---|
| 16 | CONVERTS | 277 |
| | | 260 |
| 4 | SHIFT | 254 |
| 4 | LOGICAL | 250 |
| 4 | DIVIDE | 244 |
| 4 | NOT USED | 240 |
| 4 | SUBTRACT | 234 |
| 4 | ADD | 230 |
| 4 | COMPARE | 224 |
| 4 | NOT USED | 220 |
| 4 | COUNT LEADING SIGN | 214 |
| 4 | SUM REDUCTION | 210 |
| 8 | NOT USED | |
| | | 200 |

REMAPPED VECT INST ADDRESS GEN
XRAM ADDRESS BITS

| INST | 0 | 1 | 2 | 3 | 4 | 5 | 6 | 7 |
|---|---|---|---|---|---|---|---|---|
| SUM REDUCT | 1 | 0 | 0 | 0 | 1 | 0 | $TI_1$ | $TI_2$ |
| COMPARE | 1 | 0 | 0 | 1 | 0 | 1 | J0 | J1 |
| ADD | 1 | 0 | 0 | 1 | 1 | 0 | $TI_1$ | $TI_2$ |
| SUBTRACT | 1 | 0 | 0 | 1 | 1 | 1 | $TI_1$ | $TI_2$ |
| DIVIDE | 1 | 0 | 1 | 0 | 0 | 1 | $TI_1$ | $TI_2$ |
| LOGICAL | 1 | 0 | 1 | 0 | 1 | 0 | $TI_0$ | $TI_1$ |
| SHIFT | 1 | 0 | 1 | 0 | 1 | 1 | $TI_0$ | $TI_1$ |
| CONVERT | 1 | 0 | 1 | 1 | $TI_1$ | $TI_2$ | $T3_0$ | $T3_1$ |
| CLS | 1 | 0 | 0 | 0 | 1 | 1 | $TI_1$ | $TI_2$ |

FIG. 41

INTERFACE SIGNALS

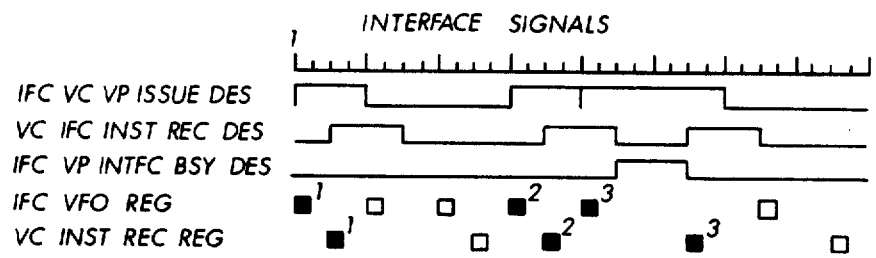

IFC VC VP ISSUE DES
VC IFC INST REC DES
IFC VP INTFC BSY DES
IFC VFO REG
VC INST REC REG

FIG. 42

INST RDY COND

FIG 55 TRANSLATION

TIGHTLY COUPLED SCIENTIFIC PROCESSING SYSTEM

RELATED PATENT APPLICATIONS

The following co-pending patent applications are assigned to the assignee of this invention, and their teachings are incorporated herein by reference:
Title: HIGH PERFORMANCE STORAGE UNIT
  Inventor: James H. Scheuneman
  Serial No.: 596,130
  Filed: Apr. 2, 1984
  Patent No.: 4,633,434
  Issued: Dec. 30, 1986
Title: MULTIPLE UNIT ADAPTER
  Inventor: James H. Scheuneman
  Serial No.: 596,205 (Now Abandon)
  Filed: Apr. 2, 1984
  Ser. No.: 047,579—Continuing Application
  Filed: May 5, 1987
  Patent No.: 4,722,052
  Issued: Jan. 26, 1988
Title: A SCIENTIFIC PROCESSOR
  Inventors:
    Louis B. Bushard
    Larry L. Byers
    James R. Hamstra
    Charles H. Homan
    Archie E. Lahti
    John T. Rusterholz
  Serial No.: 761,201
  Filed: July 31, 1985
  Patent No.: 4,873,630
  Issued: Oct. 10, 1989

BACKGROUND OF THE INVENTION

A. Field of the Invention

This invention relates to the field of digital data processing systems wherein one or more host data processors utilize one or more supporting scientific processors in conjunction with storage systems that are commonly accessible. More particularly it relates to an improved Scientific Processor tightly coupled to Host Processing System for use in such a digital data processing system. Still more particularly it relates to an improved Scientific Processor having a Scalar Processor Module and a Vector Processor Module, and operable under program control of one or more host processors, and further having addressing compatible with the host processor(s). More particularly, it relates to an improved Scientific Processor tightly coupled for accessing the high speed storage of a host processor(s) without need for dedicated mass storage or extensive caching. Still more particularly, it relates to an improved memory accessing system allowing a tightly coupled Scientific Processor to have access to the virtual address space of the host processor(s).

B. State of the Prior Art

Digital data processing systems are known wherein one or more independently operable data processors function with one or more commonly accessible main storage systems. Systems are also known that utilize a support processor with its associated dedicated supporting, or secondary storage system. Such support processors are often configured to perform specialized scientific computations and are commonly under task assignment control of one of the independently operable data processors. The controlling data processor is commonly referred to as a "host processor". The host processor characteristically functions to cause a task to be assigned to the support processor; to cause required instructions and data to be transferred to the secondary storage system; to cause the task execution to be initiated; and to respond to signals indicating the task has been completed, so that results can be transferred to the selected main storage systems. It is also the duty of the host processor or recognize and accommodate conflicts in usage and timing that might be detected to exist. Commonly, the host processor is free to perform other data processing matters while the support processor is performing its assigned tasks. It is also common for the host processor to respond to intermediate needs of the support processor, such as providing additional data if required, responding to detected fault conditions and the like.

In the past, support scientific data processors have been associated with host data processing systems. One such prior art scientific processor is disclosed in U.S. Pat. No. 4,101,960, entitled "Scientific Processor" and assigned to Burroughs Corporation, of Detroit, Mich. In that system, a single instruction multiple data processor, which is particularly suited for scientific applications, includes a high level language programmable front-end processor; a parallel task processor with an array memory; a large high speed secondary storage system having a multiplicity of high speed input/output channels commonly coupled to the front-end processor and to the array memory; and an over-all control unit. In operation of that system, an entire task is transferred from the front-end processor to the secondary storage system whereupon the task is thereafter executed on the parallel task processor under the supervision of the control unit, thereby freeing the front-end processor to perform general purpose input/output operations and other tasks. Upon parallel task completion, the complete results are transferred back to the front-end processor from the secondary storage system.

It is believed readily seen that the front-end processor used in this earlier system is a large general purpose data processing system which has its own primary storage system. It is from this primary storage system that the entire task is transferred to the secondary storage system. Further, it is believed to be apparent that an input-/output path exists to and from the secondary storage system from this front-end processor. Since task transfers involve the use of the input/output path of the front-end processor, it is this input/output path and the transfer of data thereon between the primary and secondary storage systems which becomes the limiting link between the systems. Such as limitation is not unique to the Scientific Processor as disclosed in U.S. Pat. No. 4,101,960. Rather, this input/output path and the transfers of data are generally considered to be the bottleneck in may such earlier known systems.

The prior art also includes array processors coupled to the host processors, but such array processor coupled systems generally require transfers of operands from main storage of the host, to buffers or dedicated storage of the array processor. Characteristically the operational rates of the array processors are considerably faster than the rates of the host and its main storage.

Other data processing systems have included scientific processor(s) coupled to associated general purpose host processor(s) via either input/output (I/O) channels, with the attendant increase in transfer times required in establishing the I/O interconnect; or via shared mass storage such as disks, or rams. These alternative intercouplings require unwanted overhead either in time of establishing link or the required bufferng or caching memories in the scientific processors, or both.

The present scientific data processing system is considered to overcome the data transfer bottleneck by providing unique system architecture using a high speed memory unit which is commonly accessible by the host processor and the scientific processor. Further, when multiple High Performance Storage Units (HPSU) are required, a Multiple Unit Adapter (MUA) is coupled between a plurality of High Performance Memory Units and the Scienfific Processor (SP).

Data processing systems are becoming more and more complex. With the advent of integrated circuit fabrication technology, the cost per gate of logic elements is greatly reduced and the number of gates utilized is ever-increasing. A primary goal in architectural design is to improve the through-put of problem solutions. Such architectures often utilize a plurality of processing units in cooperation with one or more multiple port memory systems, whereby portions of the same problem solution may be parcelled out to different processors or different problems may be in the process of solution simultaneously.

When an SP is utilized in a data processing system to perform supporting scientific calculations in support of a host processor or processors, and is utilized in conjunction with two or more HPSU's, the problem of timing of the access of the SP to any selected HPSU for either reading or writing causes problems of access coordination. In order to coordinate and provide the required control, the over-all system is arbitrarily bounded to require that the SP issue no more than a predetermined number of Requests for access without the receipt back of an Acknowledge. In one configuration, the system is bounded by requiring that no more than eight such Requests be issued by the SP without receipt of an Acknowledge. The details of operation of an SP is set forth in co-pending Application entitled "A Scientific Processor" filed July 31, 1985, as Ser. No. 761,201, how issued as U.S. Pat. No. 4,873,630 on Oct. 10, 1989. The details of the interface and control of a Multiple Unit Adapter for transmitting data to and from a designated HPSU by the SP is described in detail in the co-pending application entitled "Multiple Unit Adapter". The details of operation of the MUA is set forth in detail in copending application entitled "Multiple Unit Adpater" filed Apr. 2, 1984, as Ser. No. 596,205, the parent application (now abandoned) of the continuing application Ser. No. 047,579 filed May 5, 1987, which was issued as patent No. 4,722,052. There it is pointed out that the interface of the HPSU's must also provide for and accommodate different requesters that may be associated therewith. While the data processing system is essentially synchronous, that is operations are under clock control in their execution, the occurrence of Requests, the availability of responding units, and the occurrence of Acknowledge signals are asynchronous with respect to each other. The details of operation of the HPSU's are set forth in detail in the copending application entitled "High Performance Storage Unit", Ser. No. 596,130, filed Apr. 2, 1984, now Patent No. 4,633,434 issued Dec. 30, 1986.

The prior art has recognized that scientific processors generally have computational rates that significantly exceed the storage rates of associated memory systems. This imbalance restricted the use of these earlier systems and made them suitable for only a small class of scientific problems. The previously noted prior art scientific processor disclosed in U.S. Pat. No. 4,101,960 was an exception to that general rule, in that it had a computational rate of one-half of the storage rate of the memory system. A more ideal solution to the problem is to set the maximum rate at which arithmetic/logical computational results are produced in a support processor are approximately equal to the maximum rate that data operands can move to and from the memory system, yielding a computation-to-storage rate ratio that is as close as possible to one-to-one.

Prior art systems have provided for host processor(s) to utilize various types of support (scientific) processor(s), wherein the host processor(s) have access to all of the main memory, but the support processor(s) cannot access all of the main memory. Such arrangements add to system overhead wherein data and/or instructions must be moved by operating system software within main memory to provide access as needed. This results in reduced performance rates of the system. Prior attempts to increase this performance increase, but only at the unacceptable increase in the cost of the system for the performance gained.

OBJECTS

It is a primary object of this invention to provide an improved digital data processing system wherein one or more host data processors utilize one or more supporting scientific processors in conjunction with storage systems that are commonly accessible.

Another primary object of the invention is to utilize an improved High Performance Storage Unit for use in a data processing system for providing common access to one or more host data processors and at least one Scientific Processor.

Another object of the invention is to provide an improved data processing system having a Scientific Processor tightly coupled to one or more host processors through shared main high-speed storage without the necessity of coupling through input/output channels or mass storage systems.

Still another object of the invention is to provide an improved data processing system having a Scientific Processor tightly coupled to one or more host processor through common access to the virtual address space of the host processor(s) in main high-speed storage.

Yet another object of the invention is to provide an improved data processing system having a Scientific Processor functional to perform scalar and vector manipulations in parallel and under program control of one or more host processors, through task assignments made by the operating system of the host(s).

Another object of the invention is to provide an improved data processing system having a Scientific Processor having enhanced address translation capabilities using general purpose registers.

Yet a further object of the invention is to provide an improved data processing system having a Scientific Processor having address translation occurring at rates similar to single-register indexing rates.

Another object of the invention is to provide an improved data processing system having a Scientific Processor that utilizes an activity segment table loaded by a host processor for use in controlling accessing the tightly coupled High Performance Storage Unit.

Yet another object of the invention is to provide an improved data processing system having a Scientific Processor that includes an activity segment table for use by the Scientific Processor in the formation of virtual addresses in the virtual address space of the host processor.

The foregoing objectives and other more detailed and specific objects will be come apparent and be understood from the drawings and the description of the invention.

SUMMARY OF THE INVENTION

The digital data processing system includes one or more host processors each coupled to one or more high performance storage units. Host processors can be selected from units available commercially, where the 1100/90 System available from Sperry Corporation is found to be particularly advantageous.

The High Performance Storage Unit (HPSU) is unique, and is basically a memory unit capable of coupling to various pluralities of instruction processors, and input/output units as well as to a pair of Scientific Processor(s) (SP). Since each HPSU is directly connected to the input/output units and the instruction processors of the host system, it is an inherent part of the host data processing system. On the other hand, since it is also directly connected to the Scientific Processor, it is also its main storage system. Because of its novel properties, it is able to interface both with the host system and the Scientific Processor within the resulting "bottleneck" of past scientific data processing systems, and without the requirement of caching or use of input/output lines by either the host or the Scientific Processor.

When more than one HPSU is desired to provide additional storage capacity, a Multiple Unit Adapter (MUA) is utilized between each Scientific Processor and multiple High Performance Storage units. Generally, the MUA is an interface unit which couples a single Scientific Processor port to a plurality of up to four HPSUs via four HPSU ports. In this manner a Scientific Processor may address, read and write in any of the HPSUs.

The MUA is used in a scientific data processing system to interface at least one Scientific Processor to a plurality of High Performance Storage Units. The use of a separate MUA in such a data processing system enables the Scientific Processor of such a system to have a single HPSU port to thereby reduce the cost of the Scientific Processor when a single HPSU is desired to be used in the system. The MUA is required only when more than one HPSU is used in the scientific data processing system, thereby providing the additional memory interfaces needed for the Scientific Processor.

The Scientific Processor (SP) used herein is a special purpose processor attached to the host system via the HPSU(s). It is optimized for high speed execution of floating-point vector arithmetic operations. The SP provides increased performance for both integer and floating-point scalar operations that are embedded in the vectorized code to thereby provide over-all increased performance for scientific vector FORTRAN programs.

The present invention is directed toward the data processing system that includes a Scientific Processor (SP) having a Scalar Processor Module (SPM) and a Vector Processor Module (VPM), and tightly coupled to the High Performance Storage Unit for having direct access thereto.

The so-call tight coupling is accomplished through the use of at least one HPSU which has a set of ports directly coupled to one or more Host processors for transmitting data words and control signals to and from the HPSU. The HPSU has a set of Scientific Processor ports directly coupled to an associated SP for transmitting data words and control signals to and from the HPSU. The set of ports and the set of Scientific Processor ports are configured and timed to accommodate the requirements of the Host and the SP respectively.

The operating system software of the Host processor controls the operation of the SP, which is adapted for execution of instructions sent by the Host. The SP includes an Activity Segment Table (AST) and associated control circuitry. The Host causes control signals designated as the Scientific Processor Control Block (SPCB) to be transferred to the SP. Along with other signals, SPCB includes signals defining Virtual Address (VA) space for a currently executing program on the SP, which VA signals are loaded in AST. Application programs pass parameters as normal VA values, and the AST controls address translation on SP. In order to provide tight coupling such that the Host processor and the SP have common access within the HPSU, it is necessary that all entries in the AST must also be in HPSU. Therefore, when a Host processor adds an entry, a corresponding segment is made resident in HPSU.

The Host processor controls the SP, and when a Host processor requests a main program or subprogram for execution by an SP, it must provide an SPCB that includes signals to be stored in AST. The AST signals define a called program code and data segments, as well as data segments containing the caller's parameters. When assembled, the SPCB is scheduled for execution.

During execution of instructions in the SP, a call or reference to a segment not in AST causes return to the Host processor. If reference is to an SP code or data, a new entry is made in AST. If reference is called to Host code, a Host subroutine is called and AST remains unchanged. If reference is returned to Host code, AST entries created by original call may be cleared.

An SP can be multiprogrammed, so multiple SPCB's can exist, with each one defining AST contents and other applicable control signals, for a different program. The SP only executes from one SPCB at any given time.

In the arrangement described, the SP is tightly coupled to the HPSU, which in turn is tightly coupled to a Host processor, thereby allowing use of the operating system software of the Host(s) when adapted to take the SP into account. No special operating system software is utilized within the SP. In this manner of control, the SP can be utilized with different Host processors, each of which can have different address translation rules and table structures. The Host and SP subprograms can call each other in arbitrary sequence or nesting with full parameter passing capability.

| | GLOSSARY OF ABBREVIATIONS |
|---|---|
| TERM | DEFINITION |
| ACCEL | ACCELERATE |

-continued

| GLOSSARY OF ABBREVIATIONS | |
|---|---|
| TERM | DEFINITION |
| ADD | ADDEND |
| ADRS | ADDRESS |
| AG | ADDRESS TRANSLATION AND GENERATION SECTION |
| AI | ATTENTION INTERRUPT |
| ALT1 | FIRST ALTERNATE ELEMENT COUNT |
| ALT2 | SECOND ALTERNATE ELEMENT COUNT |
| ALU | ARITHMETIC LOGIC UNIT |
| AP | ADD PIPELINE SECTION (ALU) |
| ARM | AVAILABILITY, RELIABILITY, MAINTAINABILITY |
| AST | ACTIVITY SEGMENT TABLE |
| AUG | AUGEND |
| BFR | BUFFER |
| BNA | BANK NOT AVAILABLE |
| BPA | BOARD-PAIR ASSEMBLY |
| BRKPT | BREAKPOINT |
| BUF | BUFFER |
| BVL | BEGIN VECTOR LOOP |
| CB | CONTROL BLOCK SECTION |
| CAM | CONTENT ADDRESSABLE MEMORY |
| CELP | CURRENT ELEMENT LOOP POINTER |
| CBS | CB MEMORY SHADOW RESIGER |
| CLK | CLOCK |
| CLR | CLEAR |
| COMPR | COMPARE |
| CNT | COUNT |
| CONSIM | CONCURRENT FAULT SIMULATOR |
| CP | CHARACTERISTIC PIPELINE |
| CPG | CLOCK PULSE GENERATOR |
| CTRL | CONTROL |
| CVLP | CURRENT VECTOR LOOP POINTER |
| DBL | DOUBLE |
| DEC | DECELERATE |
| DES | DESIGNATOR |
| DEST | DESTINATION |
| DIAG | DIAGNOSE INSTRUCTION |
| DP | DOUBLE PRECISION |
| DP-FLP | DOUBLE PRECISION FLOATING POINT |
| DP-FXP | DOUBLE PRECISION FIXED POINT |
| EDC | ERROR DATA CAPTURE |
| EI | EXTERNAL INTERRUPT |
| EIF | EXECUTE IMMEDIATE FUNCTION |
| EL | ELEMENT LOOP |
| ELCNT | ELEMENT COUNT |
| ELPT | ELEMENT POINTER |
| EM | EXTERNAL MONITOR INTERFACE SECTION |
| EN | ENABLE |
| FDD | FIELD |
| FLP | FLOATING POINT |
| FXP | FIXED POINT |
| G | G REGISTER |
| GA | GATE ARRAY |
| GIV | GENERATE INDEX VECTOR |
| GOP | G OPERAND |
| HPP | HIGH PERFORMANCE PACKAGING TECHNOLOGY |
| HPSU | HIGH PERFORMANCE STORAGE UNIT |
| IA | INSTRUCTION ADDRESS |
| IDX | INDEX |
| IF | INSTRUCTION FLOW SECTION (CONSISTS OF IFA, IFB, & IFC) |
| IFA | INSTRUCTION FLOW ADDRESSING |
| IFB | INSTRUCTION FLOW BUFFER |
| IFC | INSTRUCTION FLOW CONTROL |
| IIH | INTERFACE INTERRUPT HANDLING |
| INTFC | INTERFACE |
| INTRP | INTERRUPT |
| INVLD | INVALIDATE |
| INTIN | INTERRUPTING INSTRUCTION |
| IP | INSTRUCTION PROCESSOR |
| IOP | INPUT/OUTPUT PROCESSOR |
| IPL | INITAL PROGRAM LOAD |
| IPCU | INSTRUCTION PROCESSOR COOLING UNIT |
| IUCT | IN UNIT CARD TEST |
| LSB | LEAST SIGNIFICANT BIT ($2^{35}$ IN 36 BIT WORD) |
| JHF | JUMP HISTORY FILE |
| LC | LOOP CONTROL SECTION (VECTOR LOOP & EL LOOP REG.) |
| LCS | LOOP CONTROL STACK |

-continued

| GLOSSARY OF ABBREVIATIONS | |
|---|---|
| TERM | DEFINITION |
| LD | LOAD |
| LS | LOCAL STORAGE (4K RAM IN LOCAL STORE |
| LSI | LARGE SCALE INTEGRATED CIRCUITS |
| LSS | LOCAL STORAGE STACK SECTION) |
| LSSA | LOCAL STORAGE SEGMENT ADDRESS |
| MCI | MAINTENANCE AND CONTROL INTERFACE |
| MEC | MAXIMUM ELEMENT COUNT |
| MFLOPS | MILLION FLOATING POINT OPERATIONS PER SECOND |
| MK | MASK PROCESSOR SECTION |
| MP | MULTIPLY PIPELINE |
| MPS | MULTIPLY PIPELINE SECTION |
| MPCD | MULTIPLICAND |
| MPI | MULTIPLE PASS INSTRUCTION |
| MRDNG | MOVE REGISTER DATA-NOT A G REGISTER |
| MSB | MOST SIGNIFICANT BIT ($2^*$ IN 36 BIT WORD) |
| MUA | MULTIPLE UNIT ADAPTER |
| MULTR | MULTIPLIER |
| MUX | MULTIPLEXER |
| MV | MOVE PIPELINE SECTION |
| MZ | MAXIMUM STRIP SIZE |
| NELCNT | NEXT ELEMENT COUNT |
| NLJ | NON-LOCAL JUMP |
| NOVLP INST | NONOVERLAPPED INSTRUCTION |
| OLM | ONLINE MAINTENANCE |
| PAR | PROGRAM ADDRESS REGISTER (ADDRESS OF NEXT INSTRUCTION) |
| PT | POINTER |
| PCC | POWER COUPLING CONTROL |
| RAM | RANDUM ACCESS MEMORY |
| RDY | READY |
| REG | REGISTER |
| RR | REGISTER-TO-REGISTER INSTRUCTION FORMAT |
| RSLT | RESULT |
| RS | REGISTER-TO-STORAGE INSTRUCTION FORMAT |
| SAEV | STORE ALTERNATE ELEMENT |
| ST | STORE BUFFER SECTION |
| SC | SCALAR/VECTOR DATA TRANSFER CONTROL SECTION |
| SCC | SCALAR CONDITION CODE |
| SCG | SINGLE CONDITION GENERATE |
| SCU | SYSTEM CLOCK UNIT |
| SCS | SCALAR LOCAL STORE |
| SEDC | SCANSET ERROR DATA CAPTURE |
| SEL | SELECT |
| SI | STORAGE INTERFACE |
| SIMD | SINGLE INSTRUCTION MULTIPLE DATA |
| SLR | STORE LOOP CONTROL REGISTER |
| SP | SCIENTIFIC PROCESSOR |
| SP ALU | SCALAR PROCESSOR ARITHMETIC LOGIC SECTION |
| SP-FLP | SINGLE PRECISION FLOATING POINT |
| SP-FP | SINGLE PRECISION FIXED POINT |
| SPCB | SCIENTIFIC PROCESSOR CONTROL BLOCK |
| SPM | SCALAR PROCESSOR MODULE |
| SPP | SYSTEM PROBE PANEL |
| SRC | SOURCE |
| SS | SCANSET SECTION |
| SSI | SMALL SCALE INTEGRATED CIRCUITS |
| SSP | SYSTEM SUPPORT PROCESSOR |
| ST | STORE BUFFER SECTION |
| SUNA | STORAGE UNIT NOT AVAILABLE |
| SV | STORE VECTOR |
| SVX | STORE VECTOR INDEXED |
| TC | TIMING CHAIN |
| TM | TRACKING MEMORY |
| TS | TIME SLOTS |
| UCM | UNIT CONTROL MODULE |
| UIA | UNIVERSAL INTERFACE ADAPTER |
| UP | UNIVERSAL PROCESSOR INTERFACE SECTION |
| UPI | UNIVERSAL PROCESSOR INTERFACE |
| USC | UNIT SUPPORT CONTROLLER |
| VC | VECTOR CONTROL SECTION |
| VCW | VECTOR CONTROL WORD |
| VF | VECTOR FILE |
| VL | VECTOR LOOP |

| GLOSSARY OF ABBREVIATIONS | |
|---|---|
| TERM | DEFINITION |
| VL | VECTOR LOAD |
| VOP | VECTOR OPERAND |
| VP | VECTOR PROCESSOR |
| VPM | VECTOR PROCESSOR MODULE |
| VPW | VECTOR PARAMETER WORD |
| VS | VECTOR STORE |
| VSO | VIRTUAL SEGMENT OFFSET |
| VS | VECTOR STORAGE SECTION |
| VV | VECTOR STORAGE INSTRUCTION FORMAT |
| WO | WORK CAPACITY |
| WR | WRITE |

BRIEF DESCRIPTION OF THE DRAWINGS

FIG. 6 is a block diagram of the Clock Distribution system used in the SP;

FIG. 7 is a timing diagram of the Clock Phases of the Clock Distribution System;

FIG. 8 is a simplified pictorial diagram of the major sections of the Scalar Processor Module (SPM) of the SP;

FIG. 9 is a simplified pictorial diagram of the major sections of the Vector Processor Module (VPM) of the SP;

FIG. 10A through FIG. 10I, when arranged as shown in FIG. 10, comprises a logic block diagram of the Scalar Processor Module (SPM) illustrating in more detail the logical arrangement and functioning of the sections illustrated in FIG. 8.

FIG. 12 is a simplified block diagram illustrating the method of locating of the Control Block (CB) in the HPSU by the mailbox pointer register in the Address Generation (AG) section of the Scalar Processor Module (SPM);

FIG. 13 illustrates an example of the RR Format of the Add instruction of the Arithmetic Logic Unit (ALU) portion of the SPM in the SP executing the first instruction;

FIG. 14 is a block diagram of the Scalar Processor Arithmetic Logic Unit (SPALU) portion of the SPM illustrating a first instruction execution;

FIG. 15 is a block diagram of the Vector File Write operation for an RR Add Instruction;

FIG. 16 is the format of one of the instructions that requires information from Vector Files only (VV), being an Add Instruction;

FIG. 17 is a block diagram of the VPM G Operand Transfer Instruction;

FIG. 18 is a simplified block diagram of the Instruction Flow (IF) section of the SPM of the Scientific Processor;

FIG. 19A and FIG. 19B, when arranged as in FIG. 19, is a logical block diagram showing the program addressing portion of the Instruction Flow section of FIG. 18;

FIG. 20A and FIG. 20B, when arranged as in FIG. 20, is a logical block diagram showing how the original program address is captured, the retry address is captured, the retry address is compared and the Address Segment Table (AST) number file is organized;

FIG. 23 is a logical block diagram showing how the Instruction Flow Buffer (IFB) is referenced;

FIG. 34 is a logical block diagram of the same raw instruction entering the control portion of the Instruction Flow section (IF) and passing through the various decoding levels prior to becoming the internal control for the IF section and the control for all other sections;

FIG. 35 is a flow chart of the events that have to occur and that must be referred to by the Instruction Flow Control (IFC) before it can determine what it must do next;

FIG. 36 is a second flow chart which must be combined with FIG. 35 at the A and B points noted and returns to point C, (the input of FIG. 35) to form a loop;

FIG. 37 is a logical block diagram illustrating an overview configuration of the Translate RAM with an erroneous instruction having just entered the IFB hold register;

FIG. 38 illustrates a simplified block diagram of the mapping of the Translate RAM;

FIG. 40 is a further simplified pictorial diagram of the remapped Vector instruction with their corresponding octal addresses;

FIG. 41 is a table showing the XRAM address bits of the instruction of the remapped vector instruction address generator;

FIG. 42 is a timing diagram of the interface signals between the Instruction Flow section and the Vector Processor Module;

DETAILED DESCRIPTION OF THE PREFERRED EMBODIMENT

A. Conventions

Throughout the following description and in the accompanying drawings there are certain conventions employed which are familiar to those that are skilled in the art to which this invention pertains. The Conventions are described in the identified co-pending applications.

B. The System

Figure 1:
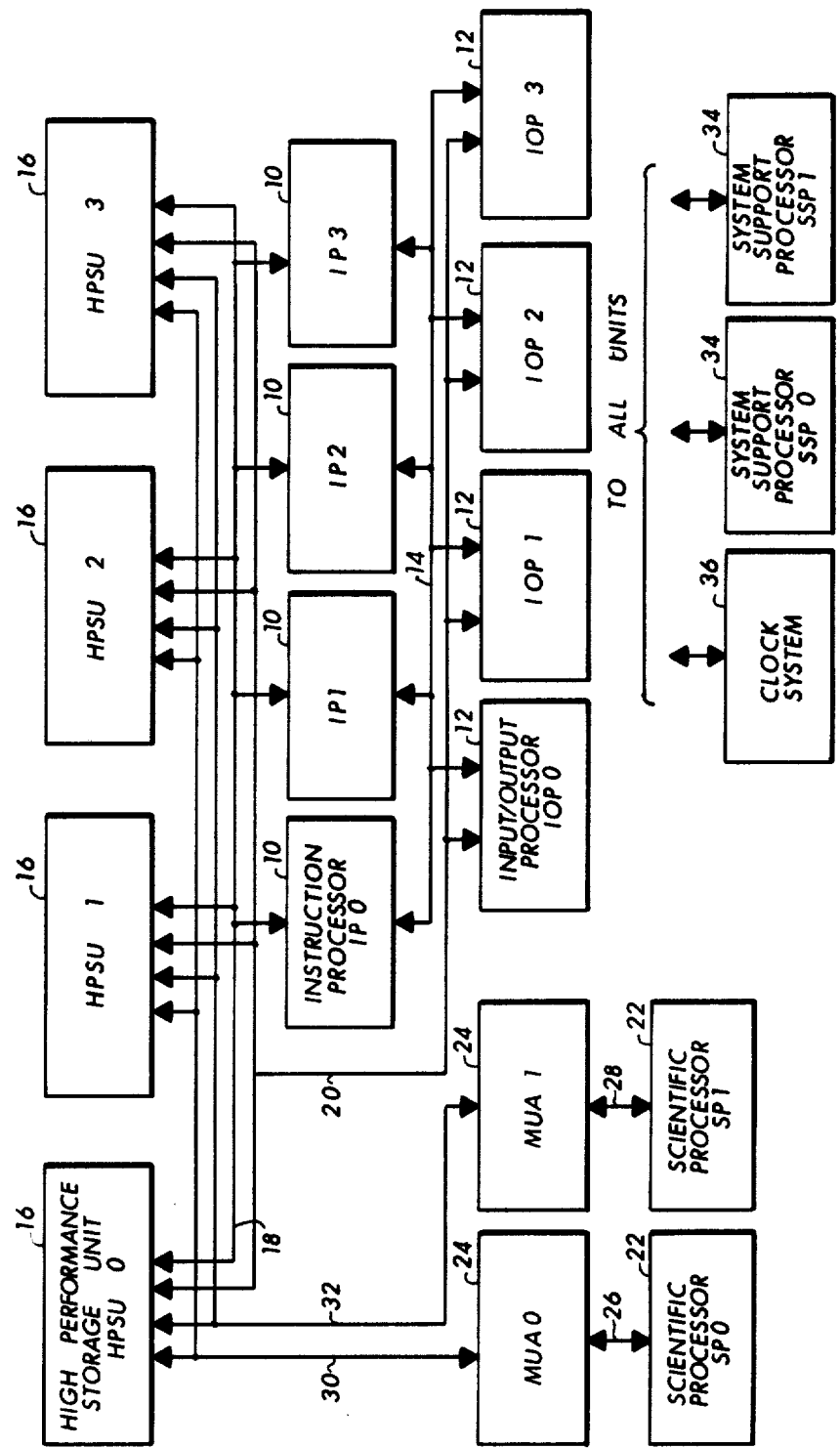
FIG. 1 is a system block diagram of the over-all digital data processing system in which the invention can be utilized.

FIG. 1 is a system block diagram of the over-all digital data processing system in which the invention can be utilized. The over-all system is essentially modular, and provides for parallel processing.

For the configuration illustrated, from one to four Instruction Processors IP0 through IP3, each labelled 10, can be utilized. Each IP can, for example, be a Type 3054-00 unit available from Sperry Corporation, or such other Instruction Processor available commercially as would be compatible. The IP provides basic mode and extended mode instruction execution, virtual machine capability, and contains two buffer memories (not shown), one an operand buffer, and the other an instruction buffer. Each IP is functional to call instructions from memory, execute the instructions, and in general does data manipulation. The IP also executes instructions to set up input and output data buffers and channel access control.

In conjunction with the IPs, from one to four Input-/Output Processors IOP0 through IOP3, labelled 12, can be utilized. The interconnections between the IPs and the IOPs, collectively labelled 14, are in fact direct connections between each unit, and the interconnection is not bused. Each IOP can be a Type 3067-00 unit available from Sperry Corporation, or an equivalent type of processor. The IOPs handle all communications between the IPs, and the memory systems, and the peripheral subsystems (not shown). In this type of configuration, the IPs function as the system Central Processing Units, and the IOPs act as CPUs to handle all of the communications. The IPs and IOPs are commonly referred to as the 1100/90 system.

From one to four High Performance Storage Units HPSU0 through HPSU3, each labelled 16, can be utilized in the system. Each HPSU is a free-standing unit with eight memory Banks, each Bank containing 524K words. Each HPSU provides four Instruction Processor (IP) ports for providing communication paths to the IPs, both for reading and writing, shown collectively as interconnectuion paths 18. Again it should be understood that interconnection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SP) port, and in the embodiment shown has two such SP ports. Each SP port has a four-word data interface. The IOP and the IP interfaces operate on a 60 nanosecond clock cycle and the SP interface operates on a 30 nanosecond clock cycle. The HPSU is a novel memory system and is described in one or more of the above identified co-pending incorporated patent applications.

Error Correction Code (ECC) is used internally to each HPSU to provide single-bit error correction and double-bit error detection.

In the embodiment illustrated one or two Scientific Processor SP1 and SP2, labelled 22, can be utilized. If a single SP is used with a single HPSU, it may be coupled directly to the SP port of such HPSU. The SP can be for example a Type 3068-00 unit available from Sperry Corporation. When two or more HPSUs are used with an SP, it is necessary to provide a Multiple Unit Adapter (MUA) for each SP. In this configuration, MUA0 and MUA1, each labelled 24, are coupled to SP0 and SP1, respectively, across interface lines 26 and 28. MUA0 is coupled to each HPSU through interconnection paths 30, and MUA1 is coupled to each HPSU through intercommunication path 32.

Each SP functions under direction of one or more of the IPs to perform scientific type calculations in a support mode. In this regard, the IPs can be considered to be the so-called "host" processors and the SPs can be considered to be support processor, all operating through common storage. The host IPs execute the master operating systemm and function to initiate specific tasks in the SPs. The SPs respond and execute the instructions necessary to accomplish the assigned tasks. The instruction set of the SPs include scalar and vector instructions, as will be described below, and interfaces with the HPSUs without need for large quantities of dedicated storage.

The over-all system maintenance and supervision is accomplished through one or two System Support Processors SSP0 and SSP1, each labelled 34, which are connected to all units of the system. The SSP is available commercially and is utilized in the Sperry Corporation 1100/90 Systems. In general, it is understood that each SSP performs the function of a hardware maintenance panel for the system. The display and setting of information, the activation of most maintenance facilities, selecting modes of operation and the like, is done at the control section of the SSP.

A Clock System 36 is utilized to maintain synchronous operation of the entire system. Clock and synchronizing signals are sent to each IP as well as each HPSU, each IOP, and each SP. The clock interface includes signals and commands from the IP for controlling clock rates, clock mode, cycle count, and other capabilities of the clock. The clock system is novel, and is described in one of the above identified co-pending patent applications.

Intercommunication between units is essentially on a Request and Acknowledge basis, and the interfaces will be described in more detail as appropriate.

C. High Performance Storage Unit (HPSU)

Figure 2:
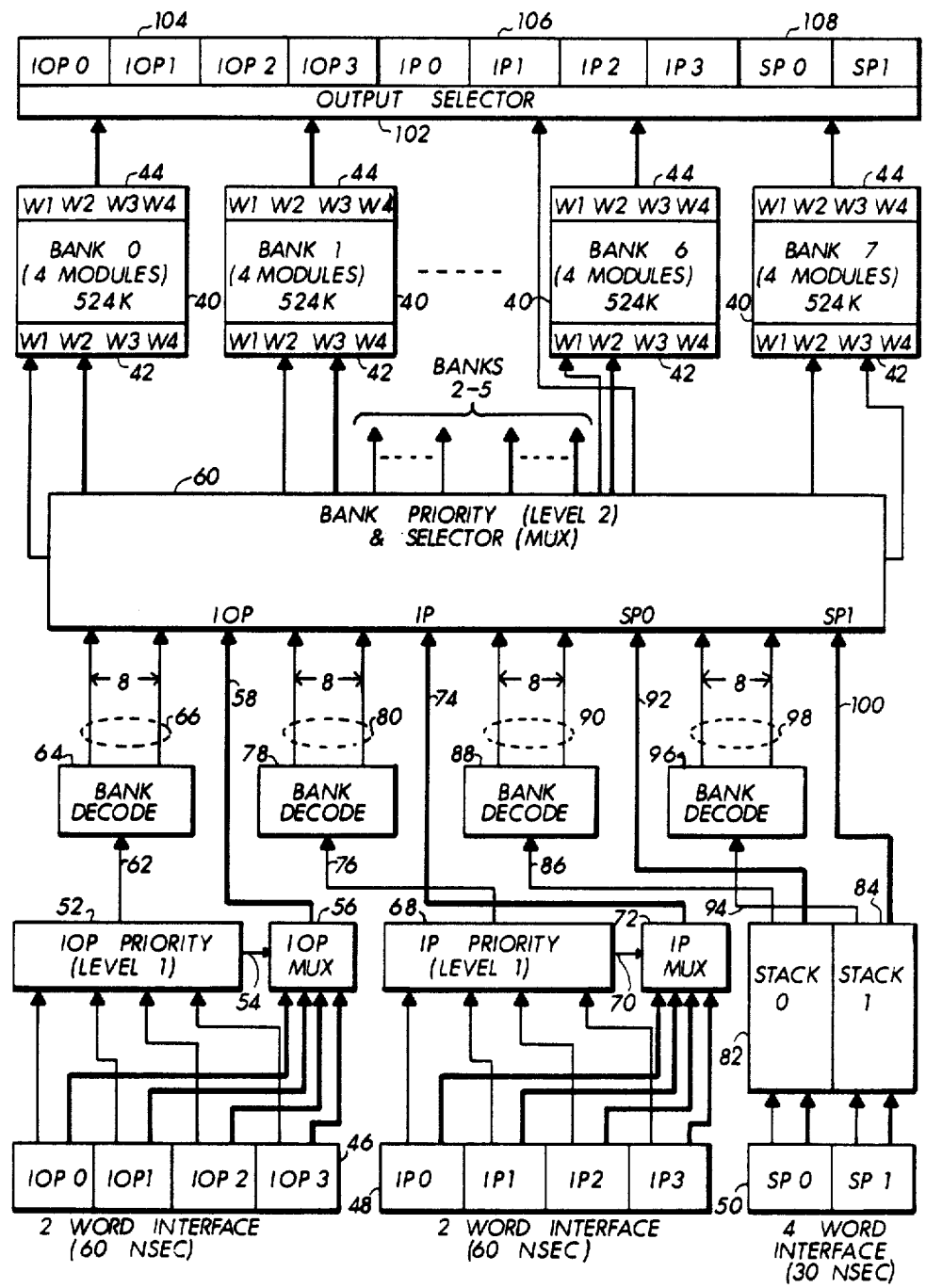
FIG. 2 is a simplified functional block diagram of the High Performance Storage Unit (HPSU)

FIG. 2 is a simplified functional block diagram of the High Performance Storage Unit (HPSU).

The HPSU is a storage device that is commonly accessible by the IPs, the IOPs, and the SPs via the MUAs. The various devices that can be coupled to the HPSU can have differing interface systems and operational rates.

In the preferred embodiment, the HPSU utilizes eight Banks of storage devices, generally identified as Bank 0 through Bank 7 of which Banks 0, 1, 6, and 7, are illustrated, and each labelled 40 since they are essentially similar. Though not specifically illustrated, each Bank is comprised of four Memory Modules and each Bank has a total capacity of 524 K words. A word in memory is 44-bits, of which 36-bits are data bits and the remaining eight bits are utilized for Error Correction Code (ECC) check bits and parity bits. Each Bank 40 is arranged for receiving four words W1, W2, W3, and W4, labelled 42 for writing, and four such words labelled 44 when read out.

The memory Banks 40 include the addressing circuitry, the storage cells, the timing circuits, and the driver circuits, and can be constructed from commercially available components, it being understood that the accessing rate must accommodate the interface rates with the attached units.

The heavy lines indicate directions of data flow, and the single lines indicate control flow.

At the input, the HPSU has an IOP interface 46 which can accommodate up to four IOP units, at the four IOP ports labelled IOP0 through IOP3. It also has an IP interface 48 which can accommodate up to four IPs at the four IP ports designated IOP0 through IOP3. The IOP ports 46 and the IP ports 48 each operate on a two-word interface at a clock rate of 60 nanoseconds.

The HPSU also has an input SP interface 50 which can accommodate two SPs at the two ports labelled SP0 and SP1. The SP ports each function with a four-word simultaneous interface and operate at a clock rate of 30 nanoseconds.

The request and control signals from the IOP ports 46 are passed to the IOP Priority 52, which functions to select the particular IOP to be given priority of access to the memory system. The selection is passed on line 54 to the IOP MUX 56 which functions to select the appropriate data and address information to pass on line 58 to the Bank Priority and Selector (MUX) 60. The control signals provided on control path 62 drive the Bank Decode 64 for selecting one-of-eight control lines 66 for providing control signals for making Bank selection.

In a similar manner, the IP ports 48 provide control signals to the IP Priority 68, which provides control signals on control line 70 to the IP MUX 72 for selecting the data and address signals that will be provided on path 74. Similarly, the control signals on line 76 to the Bank Decode 78 results in signals being provided to select one of eight lines 80 for controlling Bank selection.

The two SP ports 50 are each arranged to store requests in Stack 0 labelled 82, and in Stack 1 labelled 84. SP requests and data are temporarily held in Stack 0 and Stack 1 awaiting availability of the memory system. In essence, Stack 0 and Stack 1 are each a first-in-first-out (FIFO) circulating buffer. The request information feeds out of Stack 0 on line 86 to the Bank Decode 88 which provides a one-of eight selection and data passes on line 92 to the Bank Priority Selector 60. Similarly, request information passes on line 94 to the Bank Decode 96 for making selections on lines 98, while the data passes on line 100.

The Bank Priority and Selector functions to select between the IOP, IP, and the two SP requests presented to it for accessing memory. It also functions to control the Output Selector 102 when reading is to take place. The HPSU has an IOP output 104 capable of handling four IOP ports IOP0 through IOP3. It also has an IP output 106 capable of handling four IP ports labelled IP0 through IP3. Finally, it has an SP output 108 capable of handling two SP output ports (from the HPSU) labelled SP0 and SP1. Data rates and timing at the output ports 104, 106, and 108 are similar to those for the input ports previously described.

The HPSU is described in detail in one or more of the identified co-pending applications.

D. Multiple Adapter (MUA)

Figure 3:
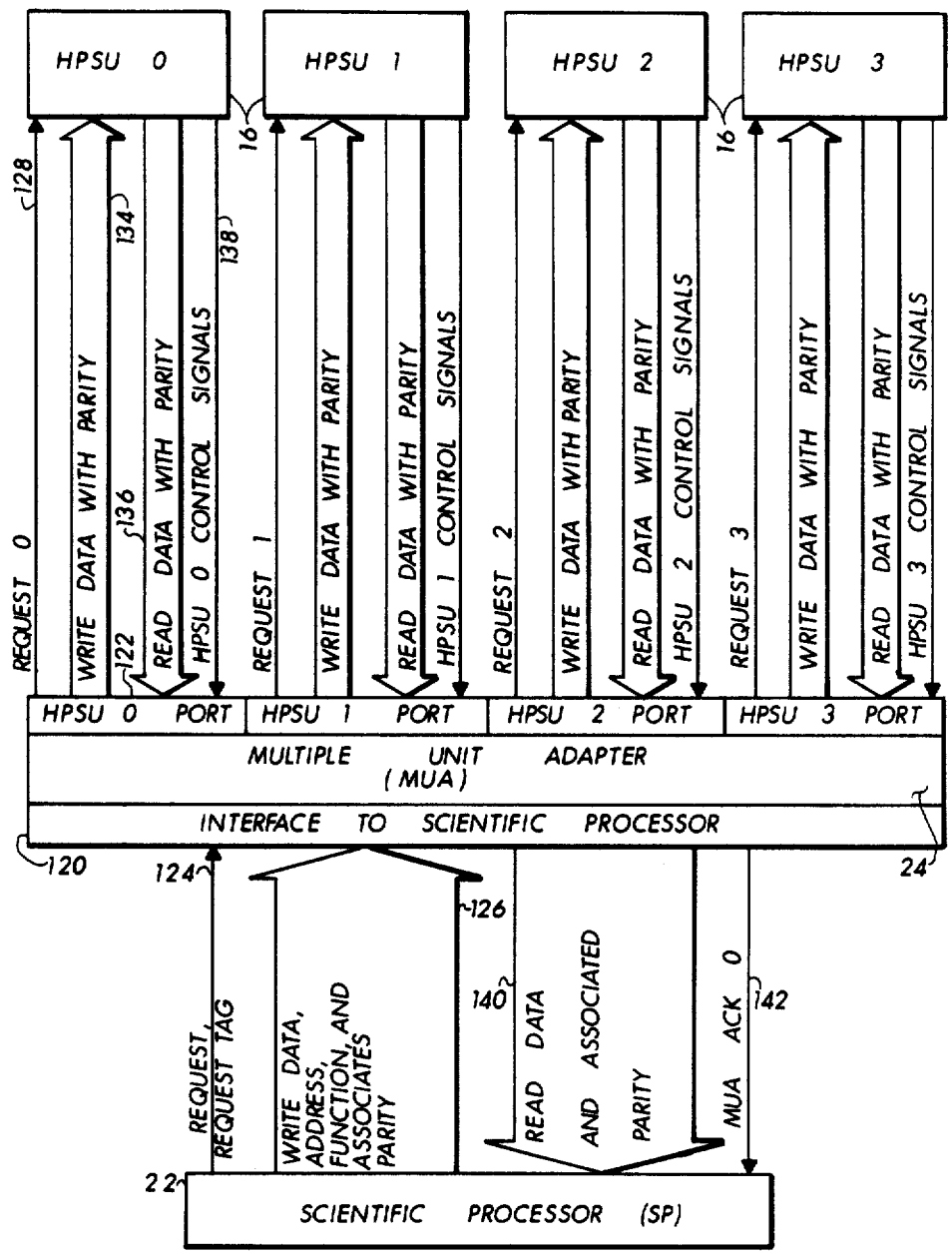
FIG. 3 is a simplified block diagram of the Multiple Unit Adapter (MUA) for providing selective interconnection of a Scientific Processor to one of up to four High Performance Storage Units.

FIG. 3 is a simplified block diagram of the Multiple Unit Adapter (MUA) for providing selective interconnection of a Scientific Processor 22 to one of up to four High Performance Storage Units 16.

The MUA 24 has an Interface 120 to Scientific Processor (SP) 22 and up to four HPSU ports 122, each adapted for interconnection to an associated HPSU 16.

A Scientific Processor (SP) 22 issues Request signals on control path 124 to the MUA. For a write operation, the write data, address, function, and associated parity is provided via cable 126. The MUA can accumulate up to eight requests from the SP without acknowledgement, and the requests and the associated data are stored in a first-in-first-out (FIFO) stack (not shown). This accumulation can be considered as pipelined or queued requests.

For purposes of example, if it is assumed that the SP has designated HPSU0, and the request is determined by the MUA to be the next request to be processed, a Request 0 will be provided on control path 128 to HPSU0. Recalling that this will be only one of several requests that can be provided to HPSU0, it will be honored when its priority is selected. If the function is write, the write data with parity will be provided on cable 134. If the function is to read, the read data with parity will be passed from HPSU0 on cable 136 to the MUA. Upon completion of the requested function, the HPUS0 control signals will pass via control path 138 to the MUA. When the MUA establishes that the current request is a read, the read data and associated parity will pass on cable 140 to the SP. As each request is passed on to the selected HPSU, an MUA Acknowledge 0 (ACK 0) signal will be passed on control path 142 to the SP, thereby indicating that the stack has room for one more request.

When the MUA has passed eight requests to an HPSU without acknowledgement the MUA ceases requesting until an Acknowledge 1 (ACK 1) control signal is received in control cable 138.

The control and data path lines for HPSU1, HPSU2, and HPSU3, would function in a similar manner. When the SP requests access to a different HPSU, all outstanding requests to the first HPSU must be serviced prior to the MUA processing requests to a different HPSU.

All data and control signals from the SP are passed on to the HPSU, with the exception of a few special control signals, and all data and control signals from the HPSU are passed on to the SP. The SP data word is four 36-bit words wide. Along with the data field, an address field of 22-bits and a function field of 6-bits are sent with the request. Odd parity is provided for every 9-bits of data, making the SP data word transmission a total of 160-bits, the address field a total of 25-bits, and the function code field a total of 7-bits.

The MUA is described in detail in one or more of the identified co-pending applications.

E. Scientific Processor (SP)

Figure 4:
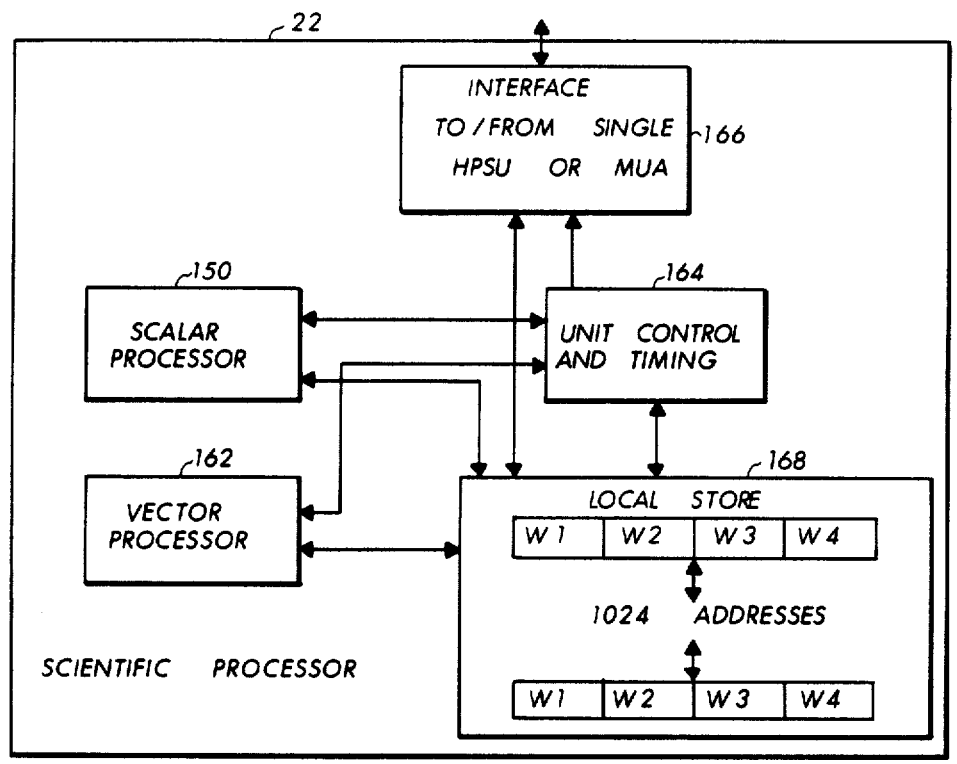
FIG. 4 is a simplified block diagram of the Scientific Processor (SP)

FIG. 4 is a simplified block diagram of the Scientific Processor (SP).

Basically, the SP 22 is a subsystem defined as an attached processor of the host system. The SP has been optimized for the high speed execution of floating-point vector arithmetic operations. It is intended to execute user code only and is not intended to run an executive program. It does not require a control program nor does it have any priviledged modes of operation. The SP includes distinct modules, the Scalar Processor Module (SPM) 150, the Vector Processor Module (VPM) 162, the Unit Control Timing 164, the Interface 166, and the Local Store 168.

The Vector Processor Module 162 performs vector calculations. The Scalar Processor Module 150 performs scalar operations, and also has the over-all control function, including instruction fetch and issue. Generally speaking, the Scalar and Vector processor instructions require both modules to execute.

The Local Store 168 in the preferred embodiment comprises a high speed random-access memory (RAM) 4,096 words. The arrangement is such that four words W1 through W4 are accessed simultaneously, yielding an addressable range of 1,024 addresses. The Local Store 168 is used primarily for the storage of frequently used scalar variables, and it should be noted as distinguished from the relatively large dedicated memory sections in prior art support processors, the minimal storage being rendered sufficient through the coupling to the plurality of HPSUs.

The general system environment and background described with regard to FIG. 1 through FIG. 4 is set forth to indicate the complexity of the data processing system in which the subject invention may be utilized.

The Scientific Processor (SP) 22 is part of a tightly coupled multiprocessor system. The primary purpose of the SP is the high speed execution of vector floating-point arithmetic. As described with reference to FIG. 1 two new units have been designed to allow operation of SP(s) in the 1100/90 multiprocessor system. They are the High Performance Storage Unit HPSU(s) 16, and the Multiple Unit Adapter MUA(s) 24.

Each SP only runs user programs that are set up in an HPSU by one of the IPs. Programs and portions of programs set up for execution on an SP are called activities.

In a minimum mutiprocessor system configuration utilizing an SP, the HPSU is central to the system. The SP, the IP, and the IOP all interface to the HPSU. The SP has one special port that allows requests each clock cycle, while other ports only accept requests on a two clock cycle basis. Multiple requests for the same module address range within the HPSU are honored on a certain priority basis and in that case, some of the requesters must wait their turn.

The System Clock Unit (Clock System 36) provides logic clock signals to the HPSU, the SP, the IP and the IOP. Each System Support Processor (SSP) 34 has its own clock source (not shown). The SSP is directly connected to the HPSU, the IOP, the IP and to the SP. It is also indirectly connected to the System Clock Unit 36 and to the Instruction Processor Cooling Units (not shown).

1. Interfaces

Figure 5:
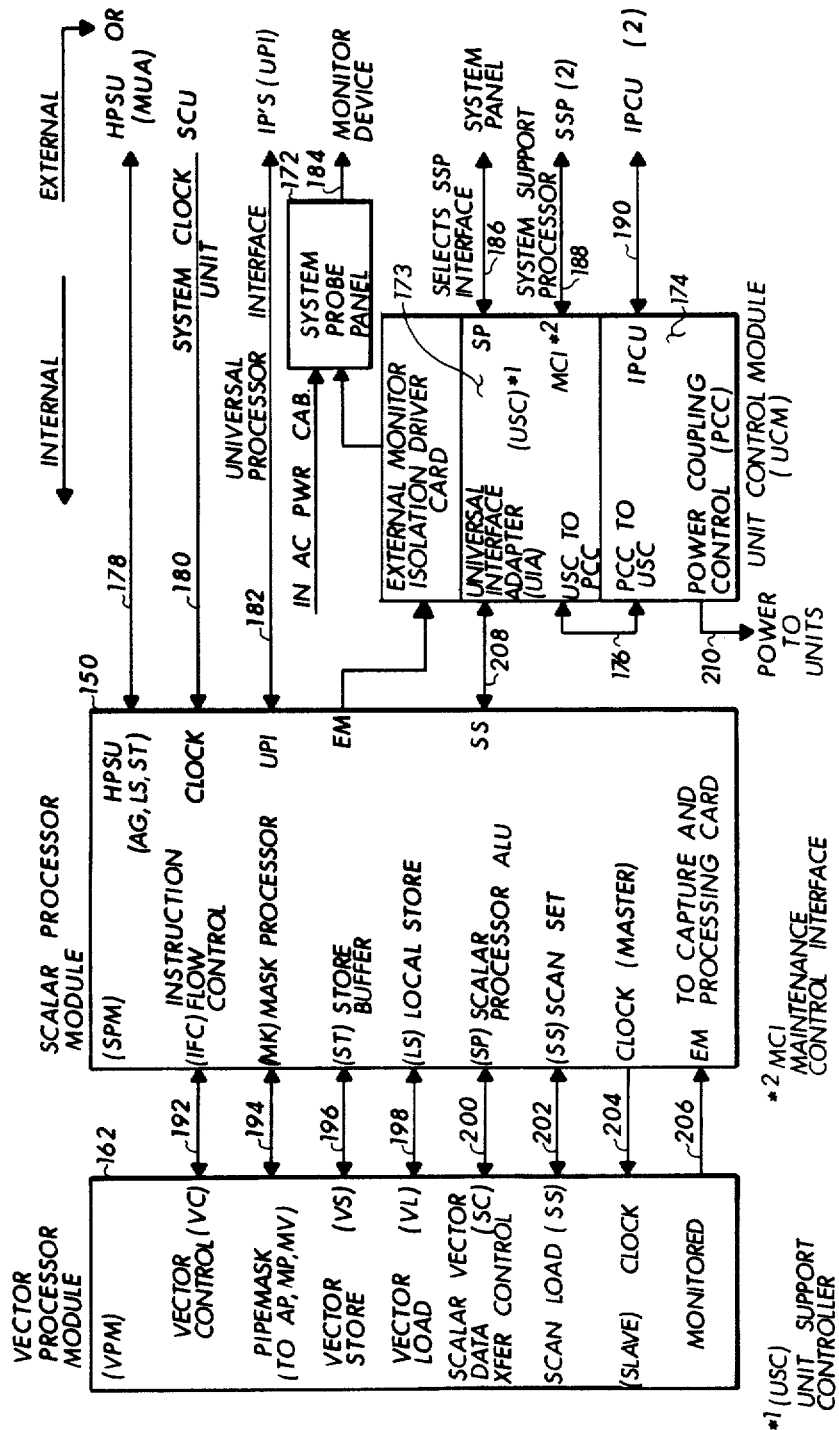
FIG. 5 is a block diagram of the Scientific Processor (SP) Internal and External Interfaces.
Figure 10A:
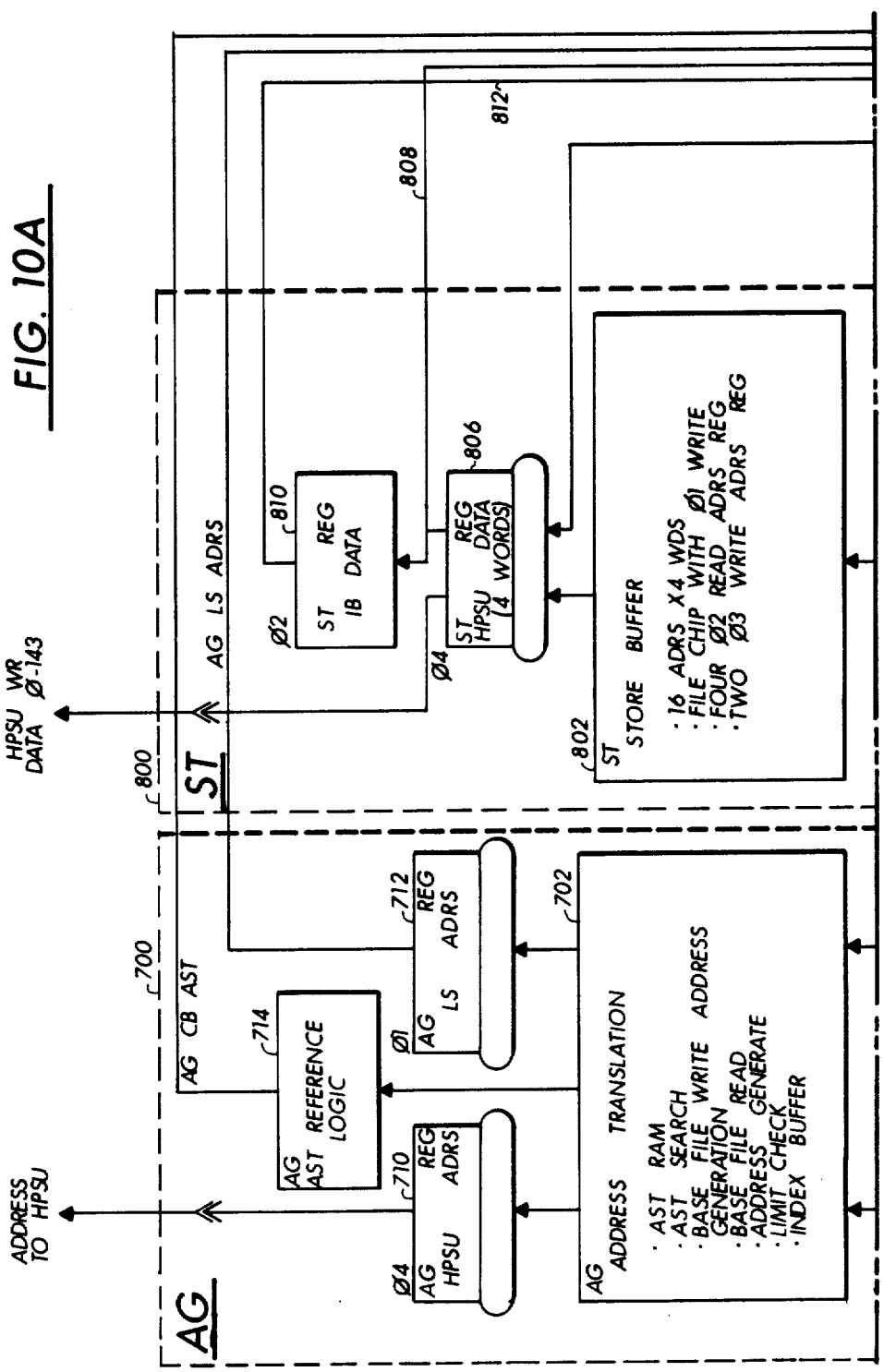
Figure 10B:
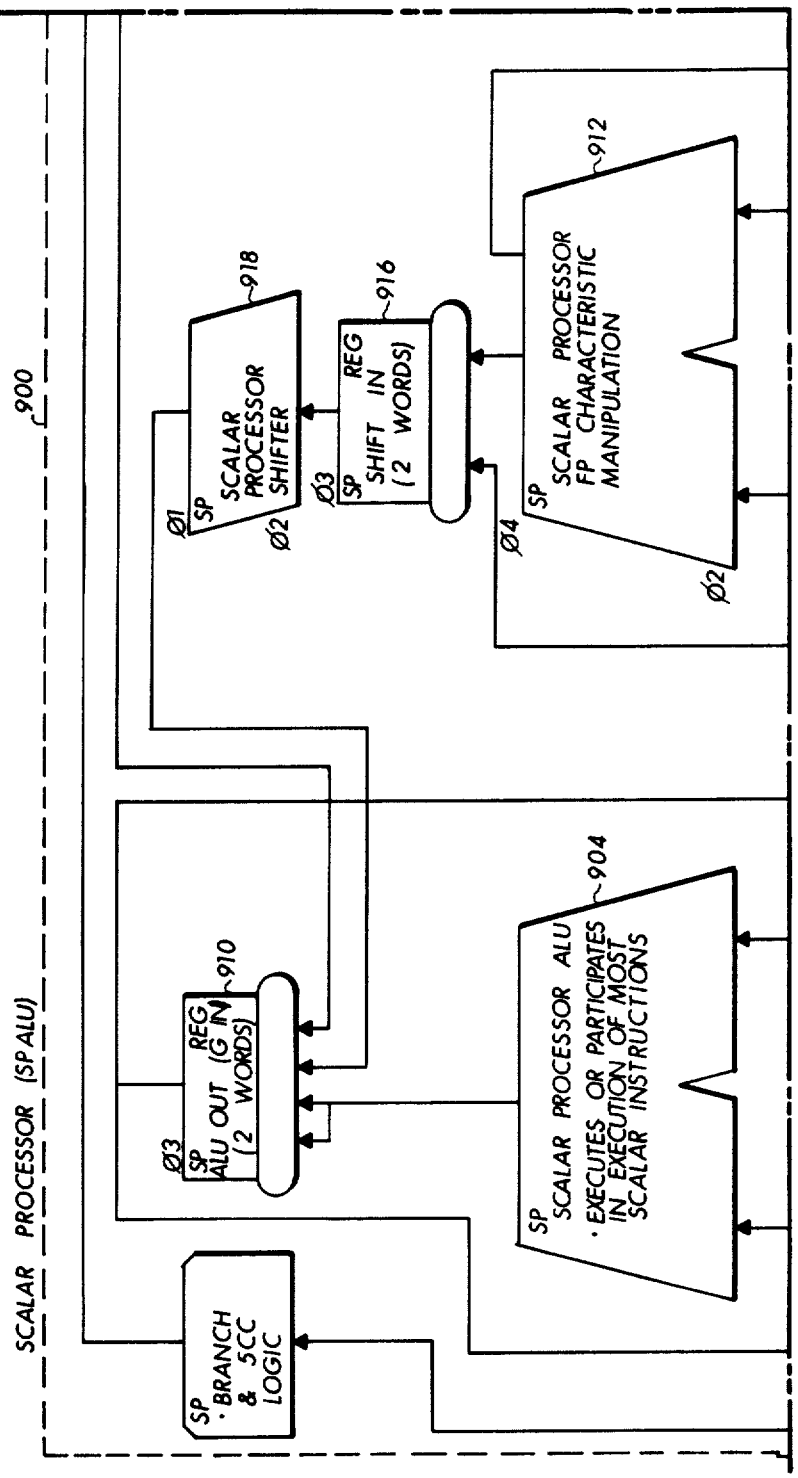
Figure 10C:
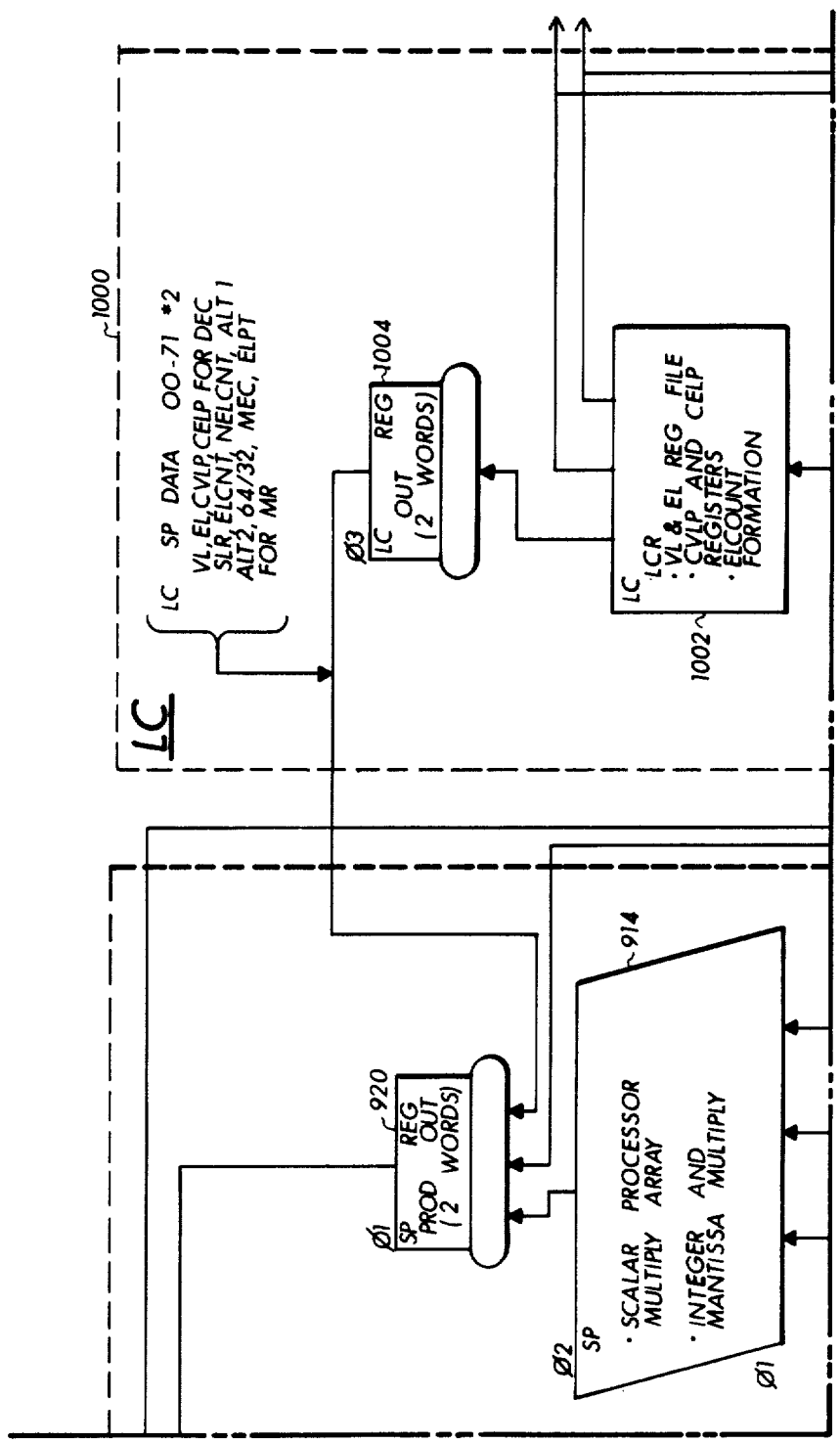
Figure 10E:
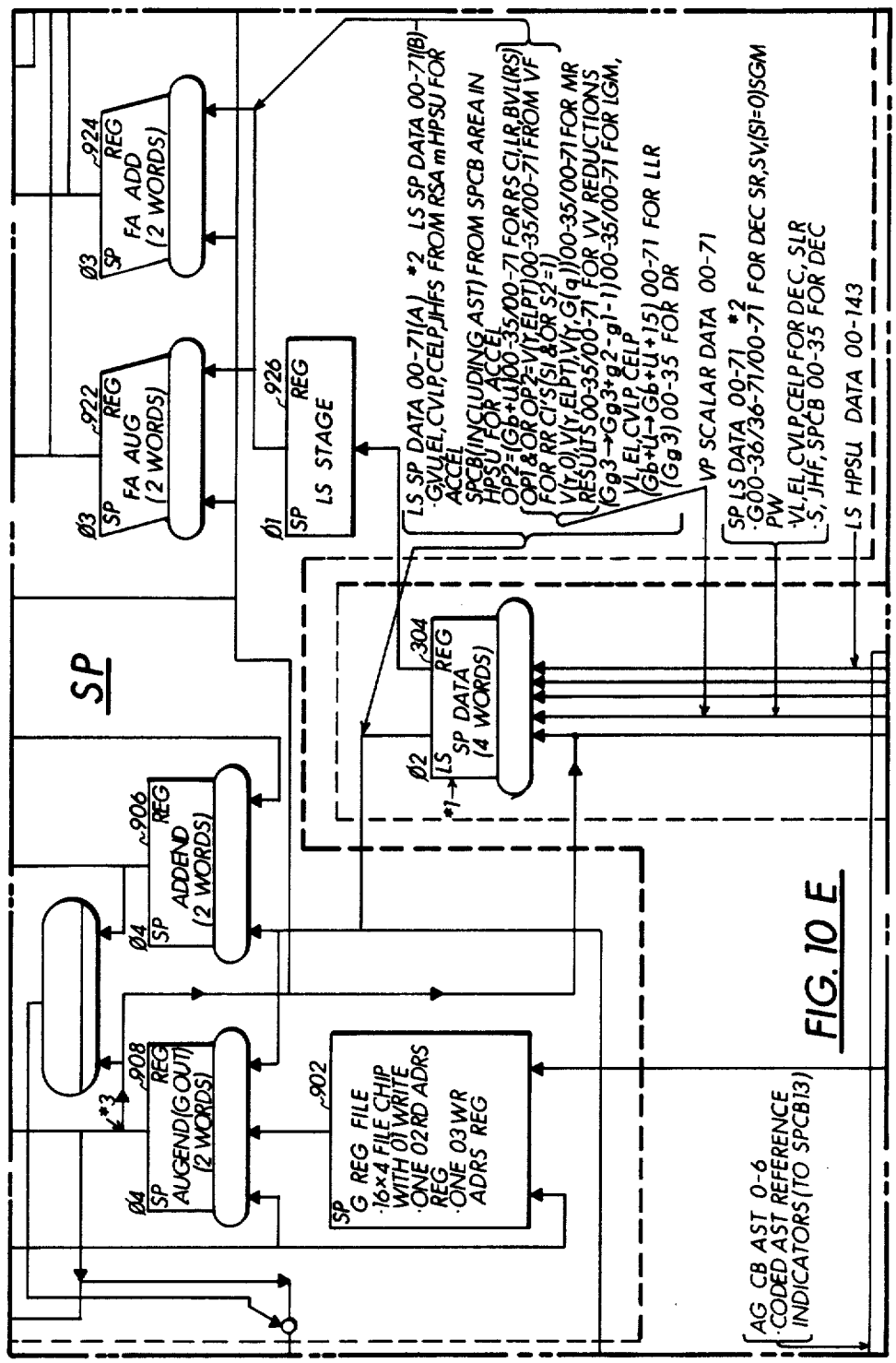
Figure 10F:
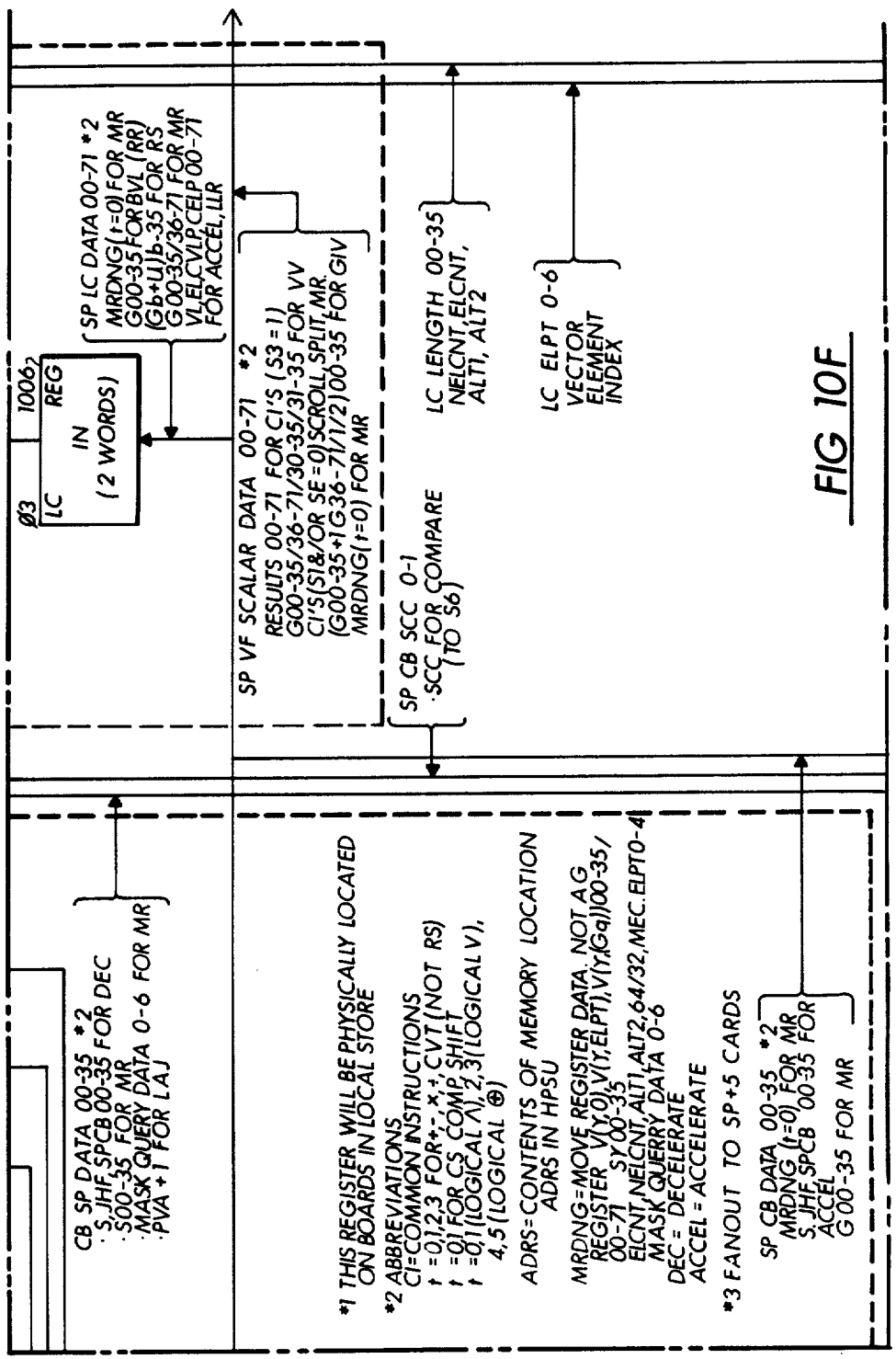
Figure 10G:
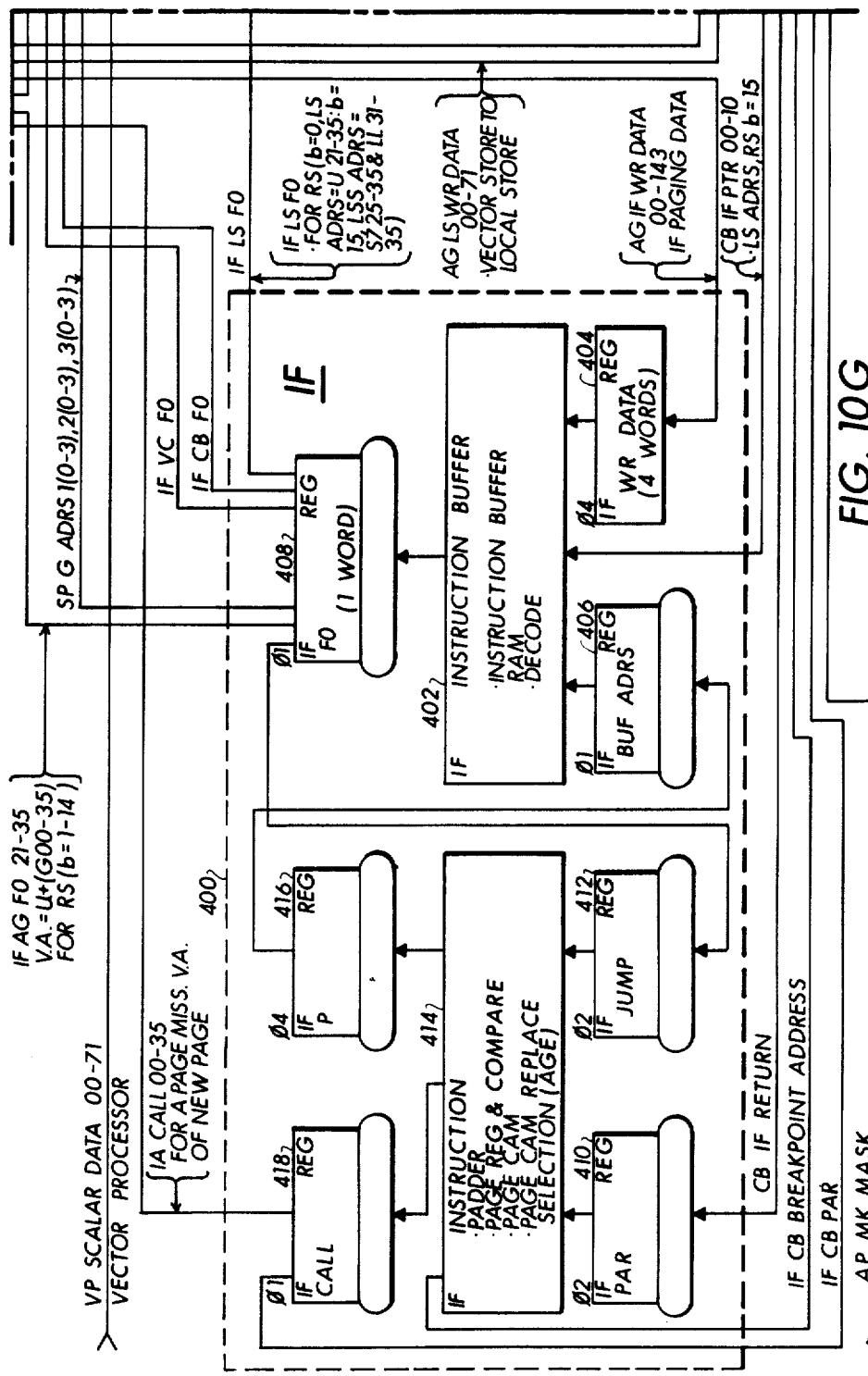
Figure 10H:
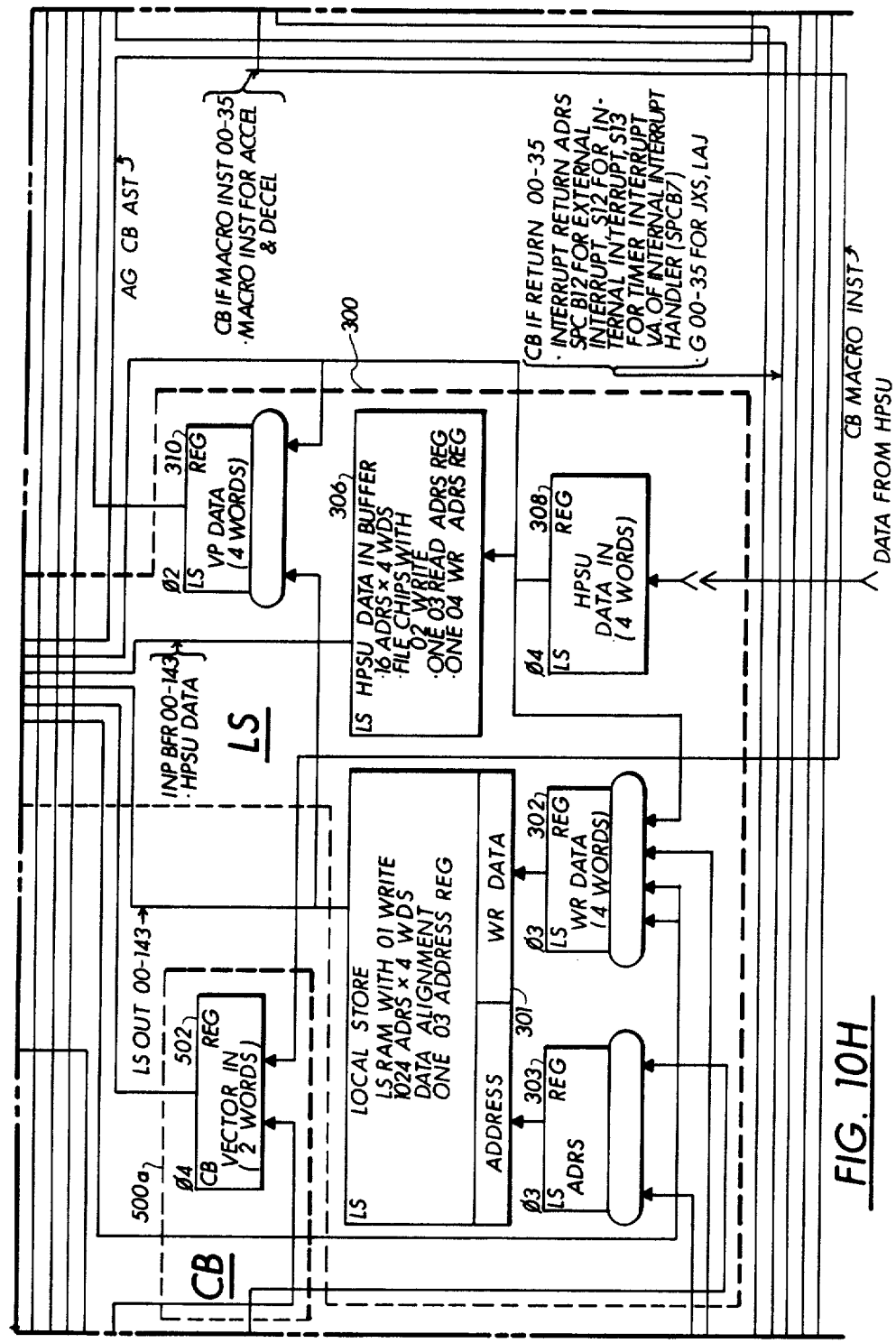
Figure 101:
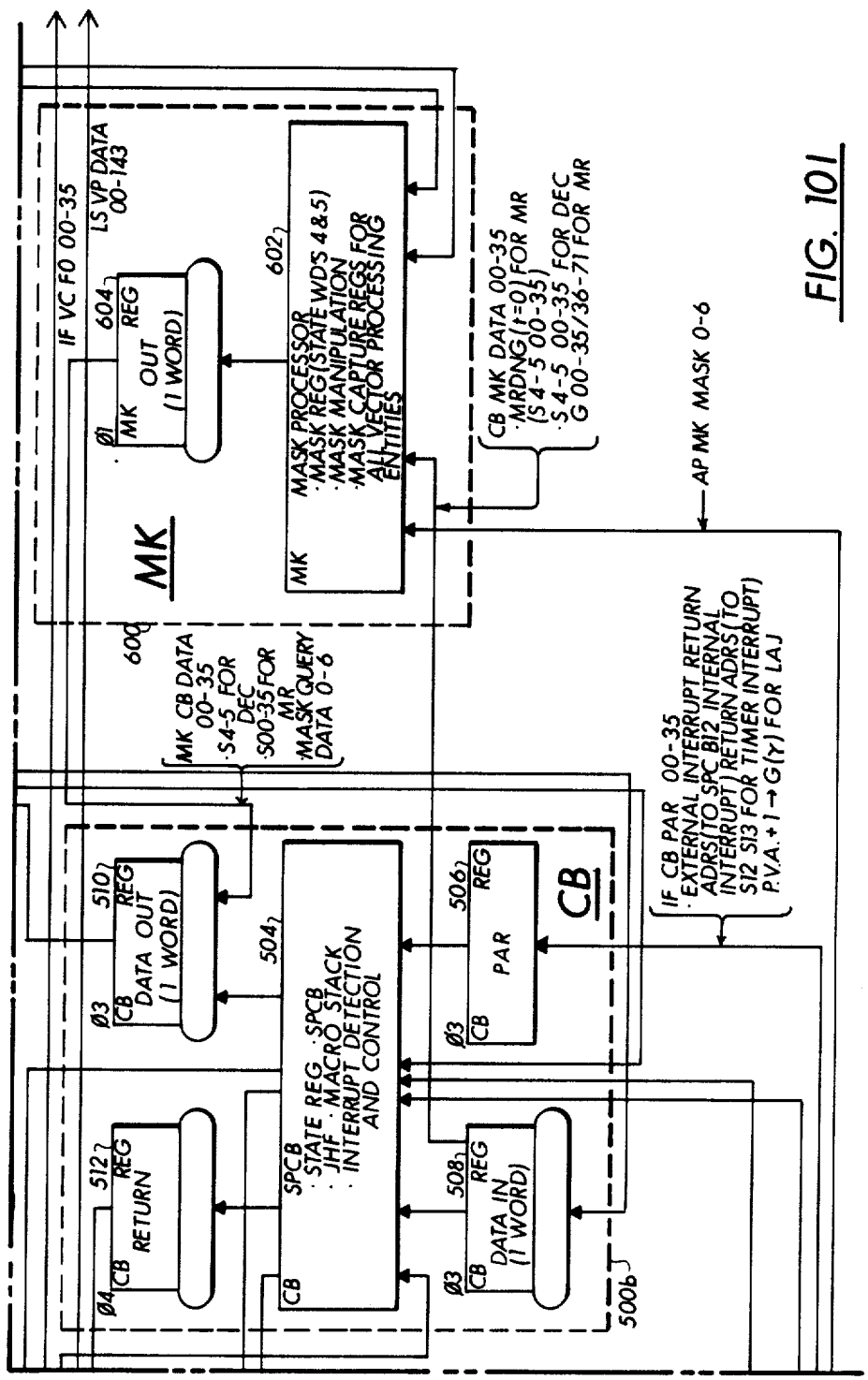

FIG. 5 is a block diagram of the Scientific Processor (SP) internal and external interfaces. In the Scientific Processor, which is designated as a Type 3068-0 unit available from Sperry Corporation, there are four internal units or modules, namely the Vector Processor Module (VPM) 162, the Scalar processor Module (SPM) 150, the Unit Control Module (UCM) 170, and the System Probe Panel 172. The Unit Control Module 170 is further partitioned into two logical entities, the Unit Support Controller (USC) 173 and the Power Coupling Controller (PCC) 174. The USC-to-PCC 176 is an internal interface.

The interfaces are shown as lines, but it should be understood that this is illustrative only, and that physically there may be multiple conductors and circuits utilized. The external interfaces, are the interfaces to other units within the central complex, and are listed down the right hand side of the FIG. 5. The read/write data interface via line 178 to the HPSU or MUA interfaces with the SPM 150. The System Clock Unit (SCU) interfaces via lines 180 with the SPM 150. The Universal Processor Interface (UPI) and the Instruction Processor(s) is interfaced via line 182. The interface at the System Probe Panel 172, to the Monitor Device is via line 184. The input from the System Panel selects the SSP interface and interfaces with the Unit Support Controller 173 of the Unit Control Module 170 via line 186. One of the things that this interface does is to select the next interface. There are two interfaces via line 188 to two different System Support Processor 34 which interface with the Maintenance Control Interface (MCI) of the Unit Support Controller 173. The last external interface 190 is from the Power and Cooling Controller 174 to the Instruction Processor Cooling Units (not shown). It selects one of the two cooling units and monitors environmental condition.

The internal interfaces are the interfaces going between the VPM 162 and the SPM 150. The instruction interface 192 is from the Instruction Flow Control (IFC) logic section of the SPM to the Vector Control (VC) section of the VPM. The mask interface 194 is from the Mask Processor (MK) of the SPM to the Add Pipe (AP), the Multiply Pipe (MP), and the Move Pipe (MV) in the VPM. These will be described in detail below. The Vector Store (VS) interface 196 provides information stored in the Vector Files to the Store Buffer (ST). It also provides information from main storage, or HPSU or Local Store. The Vector Load (VL) interface 198 transfers data from the Local Store (LS) section to the Vector Load (VL), from where it is transferred into the Vector Files. The source of the data in this case is from the HPSU or from Local Store. The Scalar Vector Data Transfer (SC) interface 200 transfers data from the SPM to the VPM. It also writes Scalar instruction into the Vector Files or broadcasts G operands. Further it transfers data in the opposite direction from the VPM to the SPM. This data could be elements from Vector Files or results or reduction instructions. The Scan Set (SS) interface 202 couples the master Scan Set card in the SPM to the slave Scan Set card in the VPM. The clock interface, 204 is from the master clock card in the SPM to the slave clock card in the VPM. The last interface shown is the External Monitor (EM) interface 206. It involves a collection of key logic signals in the VPM. These signals are routed to the SPM and ultimately they go out of the external monitor interface of the System Probe Panel 172.

There is another internal interface 208 from the SPM to the Unit Support Controller 173. This is the universal interface adapter interface from the Unit Support Controller and connects to the Scan Set card of the SPM. An interface 210 is provided between the Unit Control Module 170 and the power and cooling units (not shown).

2. Clock Distribution and Timing

FIG. 6 is a block diagram of the Clock Distribution System. The System Clock Unit (SCU) 36 provides multiple drives, with a separate drive for each IP, IOP and HPSU in the system.

The interface 180 from the System Clock Unit SCU comes into the Master unit Clock card 220 in the Scalar Processor Module (SPM) 150. From there, clock signals are sent to the Slave Unit Clock Card 222 in the Vector Processor Module (VPM) 162. The unit clock cards 220 and 222 serve their respective modules. The lines 224 and 226 emanating from the unit clock cards represent the drive to remaining logic cards within the associated module. Typical logic cards 228 and 230 in each module receive the clock drive from the System Clock unit, and utilizes two Clock Pulse Generator (CPG) Gate Arrays (GA) on each card to derive the four phase clock signals identified as phases 1, 2, 3, and 4 ($\phi 1$, $\phi 2$, $\phi 3$, $\phi 4$) for distribution on that logic card. In other words, each logic card has its associated CPG circuits.

FIG. 7 is a timing diagram of the Clock Phases. The clock phases illustrated occur at the output of the two Clock Pulse Generators on each logic card. The low portion of each clock pulse is the active level. The time that the clock phase is low is the period of the clock pulse that is considered its active time. Four clock pulse phases are generated. The times shown are common to all four phases. The clock cycle is 30 nanoseconds from start of one clock pulse in a phase to the start of the next occurring pulse in that phase. The clock pulses are nominally $5\frac{1}{4}$ nanoseconds in duation. The time duration from the beginning of a clock signal in one clock phase to the beginning of a clock signal in the next subsequent clock phase is nominally $7\frac{1}{2}$ nanoseconds.

3. Technology

While not illustrated, some of the features of the high performance technology utilized to construct the SP will be described. Emitter coupled subnanosecond circuits including gate arrays and Small Scale Integrated (SSI) circuits, known in the industry as the 100K family are used. The gate array circuits have 168 logic gates, 48 logic pins and power dissipation of up to 5 watts. The SSI packages, or chips as they are called, have 21 logic pins and power dissapation of up to a quarter to a watt. Most of the IP gate arrays plus 13 additional types that were designed specifically for this SP are used. The printed circuit cards have space for a maximum of 227 SSI circuit packages. Gate arrays require two SSI locations. The printed circuit cards are never fully populated with gate array circuit packages or chips, since a certain number of spare circuit locations for possible logic changes were provided. A pair of card pins for logic changes, check out and modifications are also reserved. In some instances power distribution pins on a card are the limiting factor for the necessary interconnections. The printed circuit cards are 11.3 inches wide by 10.8 inches deep, with logic, power, and ground connectors on three edges. Connectors on the rear edges of the cards plug into a back panel of the module through use of a conventional connector. The two side edges of the cards connect to the side panel to the module with Zero Insertion Force (ZIF) connectors. The cards are paired together and have two connectors for logic signals between the cards of the pair. These circuit packages are water cooled by a cold plate between the cards of the pair. Two cards of a cold plate are molded together into a subassembly part for insertion into the card module. Each module has room for a maximum of 52 cards or 26 card pairs. The SPM has 48 cards and the VPM has 52 cards. Ribbon cable and coaxial cable are used for logic interconnect between the SPM and VPM.

4. Major Sections

FIG. 8 is a block diagram of major sections of the Scalar Processor Module (SPM) of the SP. FIG. 9 is a block diagram of the major sections of the Vector Processor Module (VPM) of the SP. These two drawings taken together illustrate the machine organization at the major section level. First, as to the section block diagrams in general, there are a total of sixteen major logic sections with eight sections in each of the SPM and the VPM. Several additional auxiliary sections are present, such as the Scan Set and the external monitor however, these will be referred to only briefly since they are not necessary for a complete understanding of the invention. Each section has a character identifier. This identifier is also used as a prefix for exchange for all logic signals originating in that section. In the SPM (FIG. 8), break-out to the eight logic sections is on a functional basis. These sections provide architectually required functions. In the VPM (FIG. 9) the sections are designated to accommodate explanation of the parallel pipelined operations of the vector processing sections.

The sixteen logic sections mentioned for FIG. 8 and FIG. 9 indicate their relative positions on the later detailed block diagrams. Referring now to the SPM block diagram of FIG. 8, there is illustrated the Instruction Flow Control (IF) section 400; the Local Store (LS) section 300; the Control Block (CB) section 500; the Mask Processor (MK) section 600; the Address Generation (AG) section 700; the Store Buffer (ST) section 800; the Scalar Processor Arithmetic Logic Unit (SPALU) 900; and the Loop Control (LC) section 1000. These sections will be described in detail below.

The VPM sections are shown in FIG. 9, and again the relative positions of the various sections are indicated as they will be related to more detailed block diagrams. These major sections include the Vector Control (VC) section 1100; the Vector Load (VL) section 1200; the Vector File (VF) section 1300; the Scalar Vector Data Transfer Control (SC) section 1400; the Vector Store (VS) section 1500; the Add Pipeline (AP) section 1600, which includes an Arithmetic Logic Unit (ALU); the Multiply Pipeline (MP) section 1700; and the Move Pipeline (MV) section 1800. A special control section Conflict Detection and Resolution 1900 is utilized to resolve conflicts between the various pipelined sections.

5. Scalar Processor Module Block Diagram

FIG. 10a through FIG. 10i, when arranged as shown in FIG. 10, comprises a logic block diagram of the Scalar Processor Module (SPM) illustrating in more detail the logical arrangement and functioning of the sections illustrated in FIG. 8.

In the more detailed logic block diagrams, activating clock phases are identified adjacent the block symbols.

a. Instruction Flow (IF)

The Instruction Flow (IF) section is enclosed in dashed block 400, and includes the Instruction Buffer 420, which is a 4096 word RAM organized four words wide, and also contains the instruction decode mechanism which is primarily decode logic. Associated therewith are three interface registers which include the Write Data Register (WR DATA) 404 for the instructions that are written into the Instruction Buffer on a four word basis; Buffer Address Register (BUF ADRS) 406 for receiving the address for instructions which are to be read out of or written into the Instruction Buffer; and the FO Instruction Register 408. The instructions always are read from the Instruction Buffer for execution. The Program Address Register (PAR) 410 holds the Address of the instruction to be executed and the Jump Register 412 holds the jump-to Address. These addresses are translated by Instruction translate circuitry 414, where a virtual Address is determined. The P Register 416 holds the 36-bit virtual address, and the Call Register 418 holds the Control Block program Address.

The Instruction Buffer 402 is organized into sixteen pages of 256 instructions per page. The first 256 addresses are page 0, the next 256 addresses are page 1, and so forth. In the Instruction translate circuitry 414, the page Content Addressable Memory (CAM) is fully associative on the page basis. That is, the most significant 28-bits of the address are actually used in a CAM look-up. The architecture does not allow modifying instructions so the instructions within the Instruction Buffer are never sent back to storage, but they are invalidated after use.

Included in the IF section is the page replacement section (see block 414). Normally the replacement algorithm determines that a start is made at the first page, whenever instructions are first brought in for an activity. Any additional instructions that are required for the next page goes onto page one, the next page into page two, and so forth until all of the pages are used up. Basically, if a new page is required, then one page must be invalidated and the select mechanism chooses which one will be replaced based on the Age algorithm. This will be described in more detail below.

b. Local Store

The Local Store (LS) section is shown enclosed in dashed block 300, it includes the Local Store circuitry 301 consisting of a 4096 word RAM organized at 1024 addresses by four words wide, so it is possible to read or write one to four words per reference. A data mechanism for aligning the data is included. It can arrange or interchange the four words in any selectable order. The Address is received in the Address Register (ADRS REG) 303. The write data is held in the Write Register (WR DATA REG) 302, and the read data is directed to the SP Data Register 304, which is four words wide.

The HPSU Data Buffer 306 in the LS section 300 includes memory circuitry organized on a four word by 16 address basis. It is constructed of separate chips to allow concurrent reading and writing. It is first-in, first-out buffer and is used exclusively for the Load Multiple instruction for loading multiple G registers, as will be described below. Data from the HPSU is received by the HPSU Data In Register 308, which is four words in capacity. The HPSU data words are available selectively to the Local Store 301, the HPSU Data In Buffer 306, the SP Data Register 304, or the Vector Process Register (VP DATA REG) 310.

c. Control Block (CB)

The Control Block (CB) section is shown enclosed in dashed blocks 500a and 500b. The scientific Processor Control Block (SPCB) circuitry is shown as block 504 and includes the State Registers which comprise an architectual entity that contain the state of the machine at certain stages of activity execution. Portions of the Scientific Processor Control Block (SPCB) 504 contains information or pointers gated to execute activities. For example, it includes a G op history file which is a record of the pump instructions executed which allows tracing of programs. The Macrostack contains the code used for various internal operations such as acceleration, deceleration, handling interrupts and so forth. The instructions from the Macrostack are actually transferred into the Instruction Buffer just as a page from the instruction storage might be. It is executed from there in a normal fashion. Also included are the Interrupts, and the Interrupt Detection and Control logic. A separate patent application has been filed concurrently with this application on this Macrostack operation and the contents are included herein by this reference.

The Program Address Register (PAR) 506 receives the address, and the data word is directed to the Data In Register 508 for recording the SPCB. Data read out is directed to the Data Out Register 510 (one word), and return addresses are directed to the Return Register 512 for transmission to PAR Register 410 in IF 400. The Vector In Register 502 (in dashed block 500a) receives two words from the Vector Processor Module and is under control of SPCB 540, to transfer received words to the SP Data Register 304.

d. Mask Processor (MK)

The Mask Processor (MK) shown enclosed in dashed block 600 includes circuitry in block 602 that includes the Mask Registers, which actually are State Word Register 4 and State Word Register 5. Masking allows various alterations and calculations of the fan out into the vector processing entities. It is operative in the Vector Processor Module (VPM) in the Add pipe line 1600, the Multiply Pipe line 1700, and the Move Pipe line 1800. Additionally, the mask is provided to the Address Generation (AG), shown enclosed in dashed block 700 for load and store vector instructions. Also it accepts data from the Add Pipeline in the Vector Processor Module for altering the mask for comparison instructions. The MK Out Register 604 provides one word of data at a time to the Data Out Register 510 in Control Block 500b.

e. Address Generation (AG)

The Address Generation (AG) section is shown in dashed block 700, and includes the Address Translation portion 702 which responds to address information derived from a variety of sources. This includes information from the Activity Segment Table (AST) which is in the form of a RAM; from SPCB 504 of Control Block 500b; from Instruction Flow 400; and from Scalar Processor ALU 900. This AST has to do with information for translating virtual addresses into real storage addresses. It consists of up to 32 four word entries and the number is specified in word 6 of the SPCB 504. The first entry is always for the local store segment. Some of the instruction data contained in each of the entries are lower segment name and the upper segment name, the execute, the read and write address and the length of the segment minus one word. Also included are the instructions for doing an AST Search, which is a portion of the address translation mechanism for translating a vitual address into a real address. It also has the Base File write mechanism as well as the Base File itself. It holds translated real addresses for subsequent usage. There are 16 of these Base Files and they are associated on a one-for-one basis with the 16 general registers or G registers which are architectural entities and will be described more fully below.

In most instances the virtual address for a storage reference is obtained from one of those general or G registers; one of the exceptions, of course, being instruction buffer page misses. In the latter case the virtual address comes from the Instruction Flow 400 section to the ADRS IN Register 704, included in the Address Generation section. There the base files can be read for subsequent usage of a previously translated address. The Address Generation 700 section is where the contents of the base file are passed to form an address to either the HPSU via the HPSU ADRS Register 710, or to the Local Store 300 via the LS ADRS Register 712. Limit check hardware is also included in Address Translation 702 to make sure that the request is within the segment. If the request is outside the segment an interrupt is initiated. It also contains the Index Buffer which is used for the Vector Index Store and Index Load instruction which contains the vector of indexes into the segment. From the HPSU ADRS Register 710, the address is interfaced by cable to the High Performance Storage Unit. If the request was to an address in Local Store 300 then the LS ADRS Register 712 is utilized. The input from the Vector Processor is where most virtual addresses are sent to the Address Translation section 702. The AST Reference Logic 714 provides access (AG CB AST) to the Control Block SPCB 504.

f. Store Buffer (ST)

The Store Buffer section (ST) is shown enclosed in dashed block 800. ST includes the Store Buffer 802 which is a buffer that allows simultaneous read and write of data. It is organized four words wide by 16 addresses. The data coming from the Vector Files of the Vector Processor Module is where a Vector Store instruction is entered into the four word FILE WR DATA Register 804. It is temporarily written into the Store Buffer 802 and from there the data is then transferred out through the HPSU Data Register 806 four words at a time to the HPSU. The HPSU output data register accomplishes the data alignment in that it can rearrange the four words out of the Store Buffer 802 in any arrangement. This section also has an output 808 to the Local Store 300, in case the address that was formed in the Address Generation section 700, was for Local Store rather then for the HPSU. The ST DATA Register 810 provides an output 812 to IF 400 if the words are to be stored in Instruction Buffer 402.

g. Scalar Processor Arithmetic Logic Unit (SPALU)

The SPALU 900 section is enclosed in dashed block 900, contains four major sub-sections. The G Register File 902 is an architectural entity, that includes 16 G Registers constructed of chips to allow simultaneous read and write. It is organized 2 words wide by 16 addresses.

The Scalar ALU 904 is constructed of ALU Gate Arrays and has a capability of doing various arithmetic and logical operations. It is this section that executes or participates in execution of most scalar instructions, however, it doesn't handle scalar multiply, shifts, or floating-point multiply instructions.

The Scalar ALU 904 receives a two-word input from the ADDEND Register 906 and a two-word input from the AUGEND Register 908, and produces a two-word output to the ALU OUT Register 910.

Scalar floating point manipulation is accomplished by the Scalar Processor FP Characteristic Manipulation 912 Gate Arrays, and the Scalar Processor Multiply Array 914, which accomplishes either integer or mantissa multiply operations; and drives the Product Out Register 920.

The Scalar Processor FP Characteristic 912 circuitry drives the Shift In Register 916 which controls the shifting of the Scalar Processor Shifter 918.

The floating point Augend is provided through the Floating point Augend Register (FA AUG) 922, and the addend is provided through the Flating Point Addend Register (FA ADD) 924.

h. Loop Control (LC)

The Loop Control (LC) section is shown enclosed in dashed block 1000. The Loop Control Register (LCR) section 1002 generally contains eight Vector Loop (VL) registers, eight Element (EL) registers, the Current Vector Loop Pointer (CVLP) register and the Current Element Pointer (CELP) register. The Current Vector Loop Pointer register selects one of the eight Vector Loop registers from which the Element count is formed for vector instructions. The Current Element Pointer register selects one of the eight Element registers from which the element point is formed. Additionally, there is the element count formation logic and the element point formation logic. Also included is the logic for detecting the element count equal to 0 or the element count or pointer of a given range. LCR 1002 provides output to Register 1004, and receives input from Register 1006. These complex operations will be described in more detail below.

i. Scalar Processor Module Operation

Having described each of the eight logical sections of SPM, the overall operation will be described with reference to FIG. 8 and FIG. 10.

The Address Generation section 700 does all of the address translation and the generation for all references made to memory for operands and instructions as well as for some references to Local Store 300. The Address Generation section contains the Activity Segment Table (AST) 702.

The Control Block (CB) 500 section of the Scientific Processor (SP) contains the state or S registers and the CB registers. It handles interrupt detection and response and essentially provides control to the SP at any given time.

The Instruction Flow 400 Control section is the heart of the machine. It initiates the execution of all of the instructions and includes the Instruction Buffer 402.

The Loop Control (LC) 1000 section contains the Loop Control registers 1002 and does all processing on those registers.

The Local Store (LS) 300 section physically houses the Local Store RAM 301 and also contains the HPSU Data Input Buffer 306 and the HPSU Data Input Register 308.

The Mask Processor (MK) 600 section contains the Mask Registers 602 which are State Register S4 and S5 and it performs all processing on those registers.

The section on the Scalar Processor Arithmetic Logic Unit (SPALU) 900 includes the G Registers 902 and performs all Scalar Processing in the machine.

The Store Buffer (ST) 800 section is the final section and it contains the buffer for the data that is being sent back to memory. It includes the HPSU Data Register 806 for output from the SP.

The functionality of the Address Generation 700 section must accommodate several instruction types. It does the address generation and translation for all format instructions. There are three formats for instructions, one is the RS format, the second is the RR format and the final one is the VV format. The RS format generally means that the operation requires one Register operand and one Storage operand, thus the term RS.

The RR format means that the operands both come from Registers, while the VV format usually means that the operands come from Vector Registers, however the load vector is also a VV instruction.

Turning to the first class of instructions that the AG 700 executes, it accomplishes the operand fetch for all RS format instructions except for the case where the data comes immediately from the Local Store 300. That is the case where the B field of the instruction is 0 or 15 and it has an absolute address less than 4K. As these instructions are explained the complexity of the instructions should be appreciated to understand the difficult tasks that the AG 700 section must perform. On the RS format instruction, for example, it has to, in one instance, get the upper word of the two-word pair, while in another instance it must obtain the lower word of the two-word pair. In still another instance, it must get both words of that pair.

The VV format instruction is involved in many types of vectors. For example, there is the Load Vector, Store Vector, Load Alternating Element Vector, Store Alternating Element Vector, Index Load Vector, Index Store Vector. Further, variables must be dealt with on many of these instructions. These include the stride or index for the indexed loads and stores, the lengthening of an operation. Also, a masking operation might be involved and the type of precision must be determined. The next instruction class includes the Load G Multiple, the Store G Multiple, the Load Control Registers and the Store Loop Control Register. For the Load G Multiple and Store G Multiple there again is a case of single or double precision which is indicated by the t field in the instruction. It will either be a 0 or 1 for single or double precision, respectively. Whenever a page of instructions is not stored in the Instruction Buffer 402, an instruction buffer miss sequence goes into operation and a page load is done primarily by the Address Generation section.

Because of the intimate interaction between the AG 700 section of the SP and the HPSU, it is considered worthwhile to review for a moment the HPSU structure. It has eight (8) banks and four words per bank. One way that this could be diagrammed is to show words 0 through 31 on a line with words 0 through 3 being contained in bank zero, words 4 through 7 in bank one, words 28 through 31 in bank seven, and then words 32 through 35 would end up in bank zero again, words 36 through 39 would end up in bank one, and word 64 again in bank zero. If variables are on these banks and words, N could be assigned to the word in bank M, to bank 1 and to the block address where block is our four across memory. Generally, this formula would have the word in a bank number, the bank number for an address, and the block address. The possible range on these variables is as follows: N is 0, 1, 2, or 3,; M is 0 to 7 from banks 0 through 7 and the block address which would form 0 to 2 17th minus 1, with the largest address being 4 million minus 1. An example of a calculation of the block address, bank address, and word address is helpful. Choosing 1107 as a number, this would be located in the 34$^{th}$ block, in the 4$^{th}$ bank and it would be the third word in that bank.

The HPSU interface is capable of transferring four words per request. The AG 700 section has to send out four requests, the absolute address noted above minus the final two bits of it, so a 22 bit address is created. It is the bank address and the block address combined that is sent out. When it sends out for the four words to be read, not all of the information is there, since the bottom two bits of this address are missing. Those bottom two missing bits are essentially a set of four mask bits in the AGSI function register. The top four bits of this 6 bit register are the write field for the four words sent out by the AG section to the memory.

The functions of the Address Generation 700 section will now be summarized. First, it does an AST lookup. This means an Activity Segment Table lookup and it starts with either a G Register for Base Register or a G Register plus an offset amount from the instruction. The instruction includes a U field and that is the offset field of the instruction. So an AST lookup is done with a U base register or the base register plus offset from the instruction. It then calculates a virtual segment offset and then adds the virtual segment offset to the real base address. The next function that must be performed is link checking to determine whether the references are within the AST entry. It also must do permission bit checking, since each block of memory that the SP can access has three bits associated with it to indicate whether you can read that section, write that section or execute instruction from that section. When the Address Generation section is involved in a Vector Load it has to do a calculation for adddresses. First it calculates the base plus virtual segment offset, so that it is the first clock of four words that it gets back from memory. The next clock it starts with the base plus the virtual segment offset and replace the virtual segment plus base with the new calculation. In the case of an Index Vector Load it would add the index to the base plus virtual segment offset. There is a new calculation going on for a Load Vector. The same thing applies to a Store Vector.

The next function that the AG 700 section performs is the control of the data path for operands returning from the HPSU. There are essentially two buffer areas where these operands may be sent. One is in the Vector Processor Module, and the other is in the Scalar Processor Module. The buffer in the Vector Processor Module is in the Vector Load 1200 section, while the buffer in the Scalar Processor Module is in the Local Store 300 section.

The AG section also maintains shadow G Registers. These are registers that accelerate the acquisition of operands from HPSU. They are translated G Registers or base registers located in the Address Generation 700 section.

Another Address Generation hardware feature that should be pointed out is the Tracking Memory feature. This is the feature that controls the data path from memory (HPSU) for items returning from main memory (HPSU). For every request to main memory there is exactly one entry in the Tracking Memory, and the contests of that Tracking Memory controls the data paths, the selectors and the MUXes for the data path along which the operand travels. The load select memory feeds the Tracking Memory with information for that purpose.

Another memory in the AG section that should be noted is the Source Select Memory. The contents of that memory are not stored anywhere, rather they are used immediately and eliminated. The Store Buffer 800 section contains the HPSU Data Register 806 for transferring the operands to the HPSU.

The ST 800 section contains a Store Buffer 802 for operands being sent to an HPSU. Again this section is primarily controlled by AG 200.

The next section is the Local Store (LS) 300 section. This section is controlled primarily by outside sections. It contains the storage interface to Local Store data array (RAM) 301. It physically contains a 4K Local Store RAM 301, and includes the HPSU Data Input Buffer 306. It is controlled by the Instruction Flow 400 section and the Address Generation 700 section. The Address Generation 700 section operates in conjunction with the Store Buffer (ST) 800 and Local Store (LS) 300 sections.

The next section is the Scientific Processor Control Block (CB) 500 section. Following is a list of the instructions in which it is involved. First, it is used in the Move instruction. It is also involved in an Advance Local Store Stack instruction, and a Retrack Local Store Stack instruction. It should be recalled that it contains the CB section which includes the State Registers 504 (S Registers). One of the S Registers contains the Local Store pointer. The CB section controls acceleration and deceleration and it has macro codes for that purpose. The macro code looks very much like normal instructions and it operates very much like a normal instruction. However, the machine is put into an acceleration or a deceleration mode when these instructions are executed. The Control Block is involved with every instruction that has a possibility of a fault. Those instructions are the Floating Point Add and Subtract, the Integer Add and Subtract, the Floating Point and Integer Multiply and Divide; and any RR format instruction where a Vector Register length can occur. This includes every RR format instruction and similarly every VV format instruction. The Control Block section is also involved in the Load Address and Jump instruction of the Jump External Segment instruction. CB controls registers S6, S7, S11 and S14. The S6 Register has the Scalar condition code bits. The S7 Register contains the pointer to the Local Storage stack. The S11 Register can change the mode of the machine to and from slow mode to fast mode.

The SPALU 900 section is involved in all RS format instructions as well as the RR format scalar operations. Those instructions include the Add, Subtract, Multiply, Divide, Conversions, Sign calculations, Absolute Value, Shift and Compare, as well as logicals and scalar loads and stores. The SPALU section is involved in all moves except Loop Control internal moves. The SPALU 900 contains the G Registers 902. Other instructions that would access a G Register, for example, are VV format instructions that require one or more G Operands instead of Vector Operands. Also any instruction that accesses the HPSU needs a Base Register which all come from the G Register file 902. The SPALU is involved in all but six instructions in the machine.

The SPALU section contains the G Registers 902 and it resolves Read/Write conflicts and also Write/Write conflicts. The ALU Out Register 910 is a very important register in the SPALU section. It is important because most of the traffic in SPM goes through that register.

The Mask (MK) 600 section contains the Mask Processor 602, which includes the Mask Registers used for holding the State Words S4 and S5. In fact it is the top 32 bits of S4 Register and the top 32 bits of S5 Register. The Mask Processor is involved in almost all VV format instructions because those require masks. A list of these instructions are: the Add/Subtract; Multiply/Divide, Absolute Value, Move and Move Negative, Shift Count Leasing signals, Logical, and Compare. In the Compare instruction, the Mask is set out at the beginning of the operation and the Mask is changed during the operation. In other words, the Mask is both the source and a destination in this operation, i.e. the Compare puts results back into the Mask Register.

The Mask Processor sends mask bits to the Add Pipe 1600, to the Multiply Pipe 1700, and to the Move Pipe 1800. It has three interfaces to the Vector Processor and it sends the full Mask to the Address Generation 700 section. The Loop Control 1000 (LC) section contains Loop Control Registers 1002, including the Vector Length Registers and the Element Length Registers, the Current Vector Loop Pointer, and the Current Element Loop Pointer. It also contains shadow Loop Control Registers.

The term "shadow" is used herein to define a group of additional backup registers. They are used in very much the same sense that the Loop Control (LC) registers are, but they are additional registers which are only used during acceleration and deceleration operations. The Loop Control 1000 section is also involved in RR moves, and it does Loop Control moves internally to increase the speed. It performs the processing for the Begin Vector Loop instruction, Jump Vector Loop instruction, Begin Element Loop instruction, Jump Element Loop instruction, the Adjust Current Vector Loop Pointer instruction, the Adjust Current Element Loop Pointer instruction, and the Adjust Both Vector and Element Loop Pointer instruction. It is also involved in an additional Jump. So there are actually four instructions where the Loop Control section is involved in Jump operations.

The last section to be discussed is the Instruction Flow (IF) section, 400 which is essentially the heart of the machine. It contains the Instruction Buffer 402 and initiates execution of all instructions. It does most decode operations. It sends out control words to the various other sections of the machine like the SPALU 900 section, the VC 1100 section in the VPM, and it sends out instruction valid bits. Of course, it does all of the Jumps, and the final execution of the Jumps. At this point the functionality of each logic section of the Scalar Processor Module has been described.

The data flow portion of the Scalar Processor Module are the paths on which data travels when instructions are executed. Some examples will be described.

First, consider the path on which the data travels for a Move, namely a move from S3 Register to G4 Register, although the specific numbers of these registers does not matter. The data will start in the CB 500 section. From there it will go to a register in the SPALU section. This would be the register in which multiple results are placed when a Multiply is done, however, it is used also for transferring operands on many of the Move instructions. It goes from there to the SP ALU Out Register 910. The SP ALU Out Register 910 is essentially the Write Data Register for the G Register File 902. It is the path for the Move from S3 Register to G4 Register. If the Move were from S4 Register to G4 Register, then the data would start in the Mask Processor 602 and would leave the Mask Processor to the MK Data Out Register 604. From there it goes to the CB 500 section as selected by the CB Data Out Register 510. Thereafter it follows the remainder of the path that the previous Move discussion covered.

In a Move from G5 Register to S4 Register there will be an Address sent to the SPALU 900 section from the Instruction Flow 400 section. This will go into the SP G Register File 902 in a Read Address Register. From there it will be read out to G5 Register from the G RegisterFile 902, where it will go into the SP Augend Register 908 and from there it will go down to CB Data In Register 508. Finally, it will be transferred over to the Mask Processor and will enter through the MK Data In Register (not shown).

6. Vector Processor Module Block Diagram (VPM)

Figure 11H:
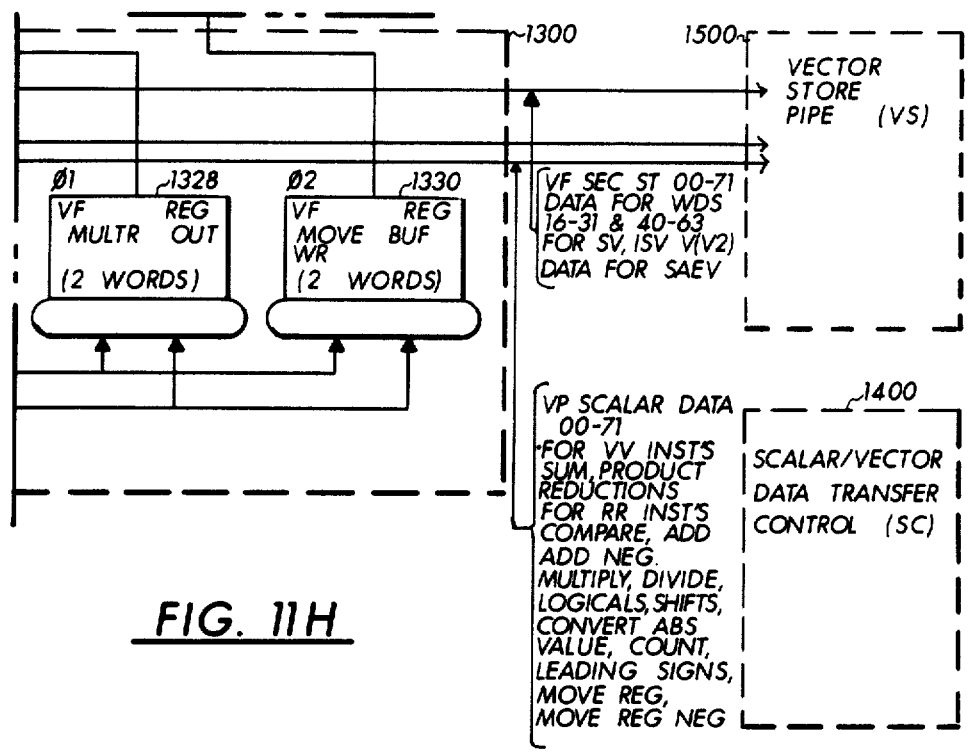
FIG. 11A through FIG. 11H, when arranged as shown in FIG. 11, comprises a logic block diagram of the Vector Processor Module (VPM) illustrating in more detail the logical arrangement and functioning of the sections illustrated in FIG. 9.
Figure 11:
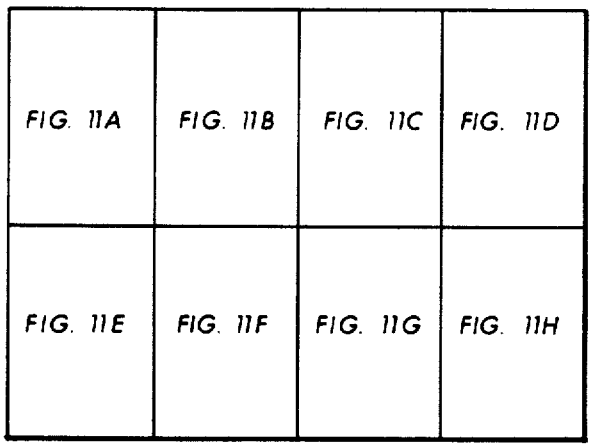
Figure 11A:
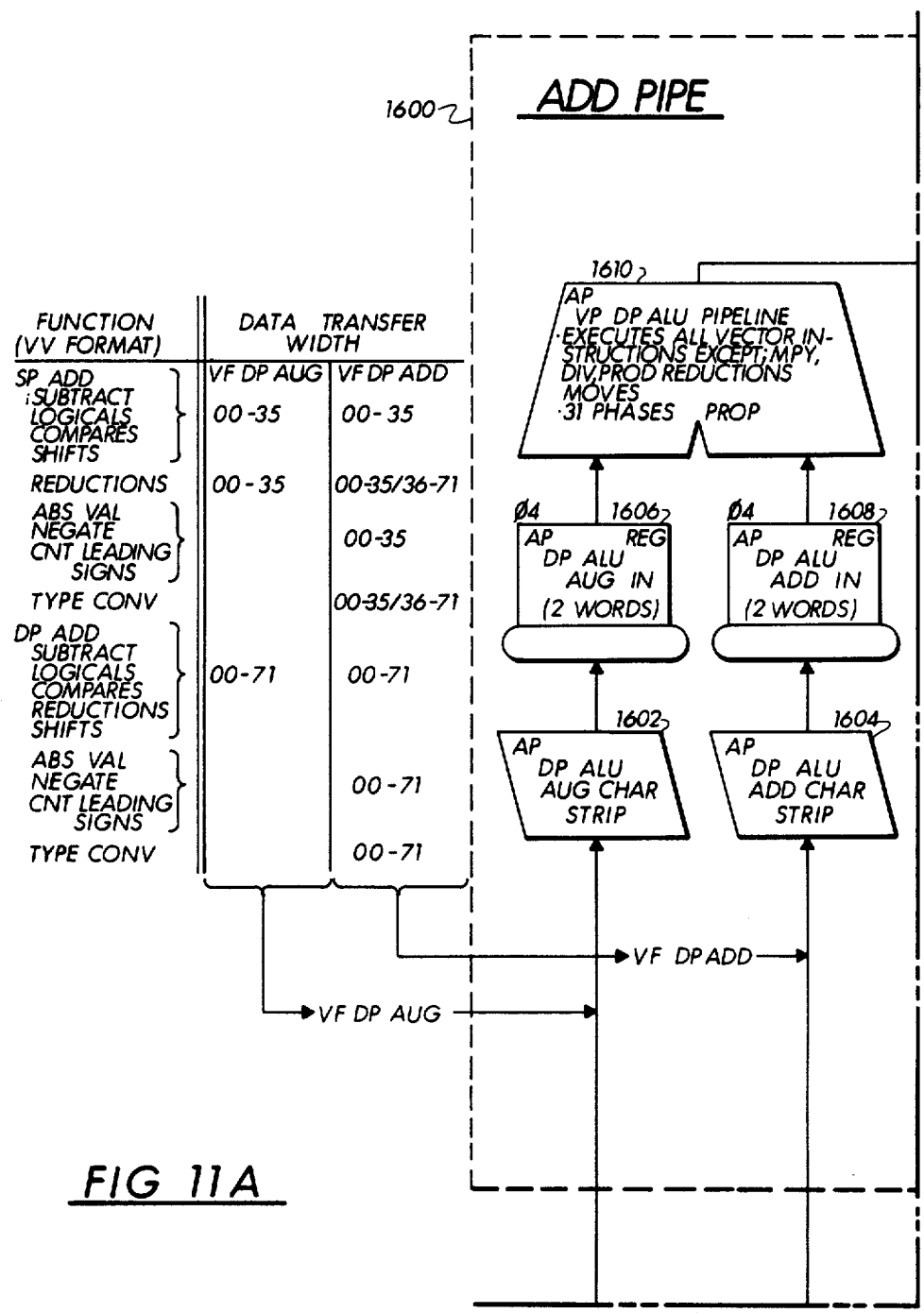
Figure 11B:
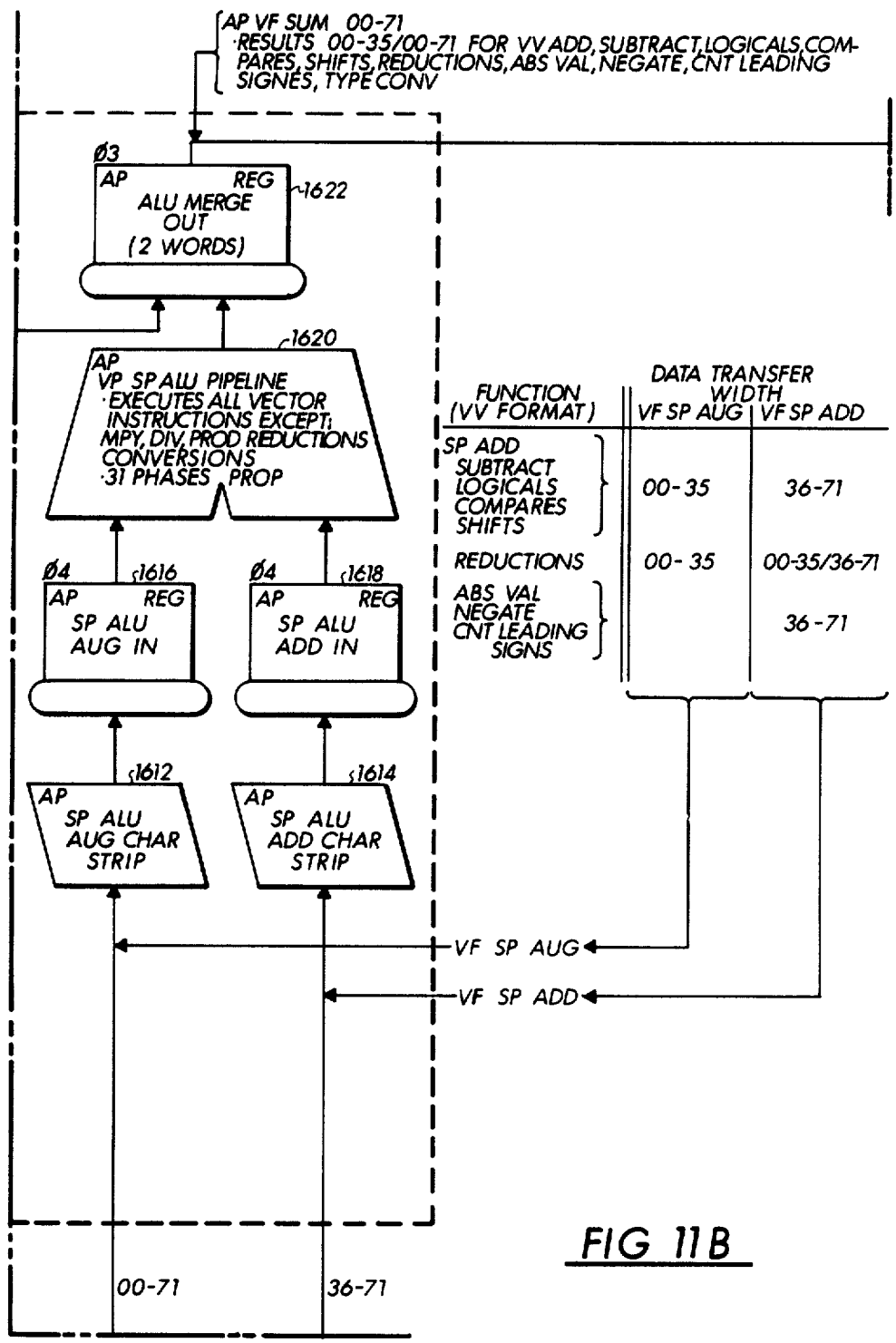
Figure 11C:
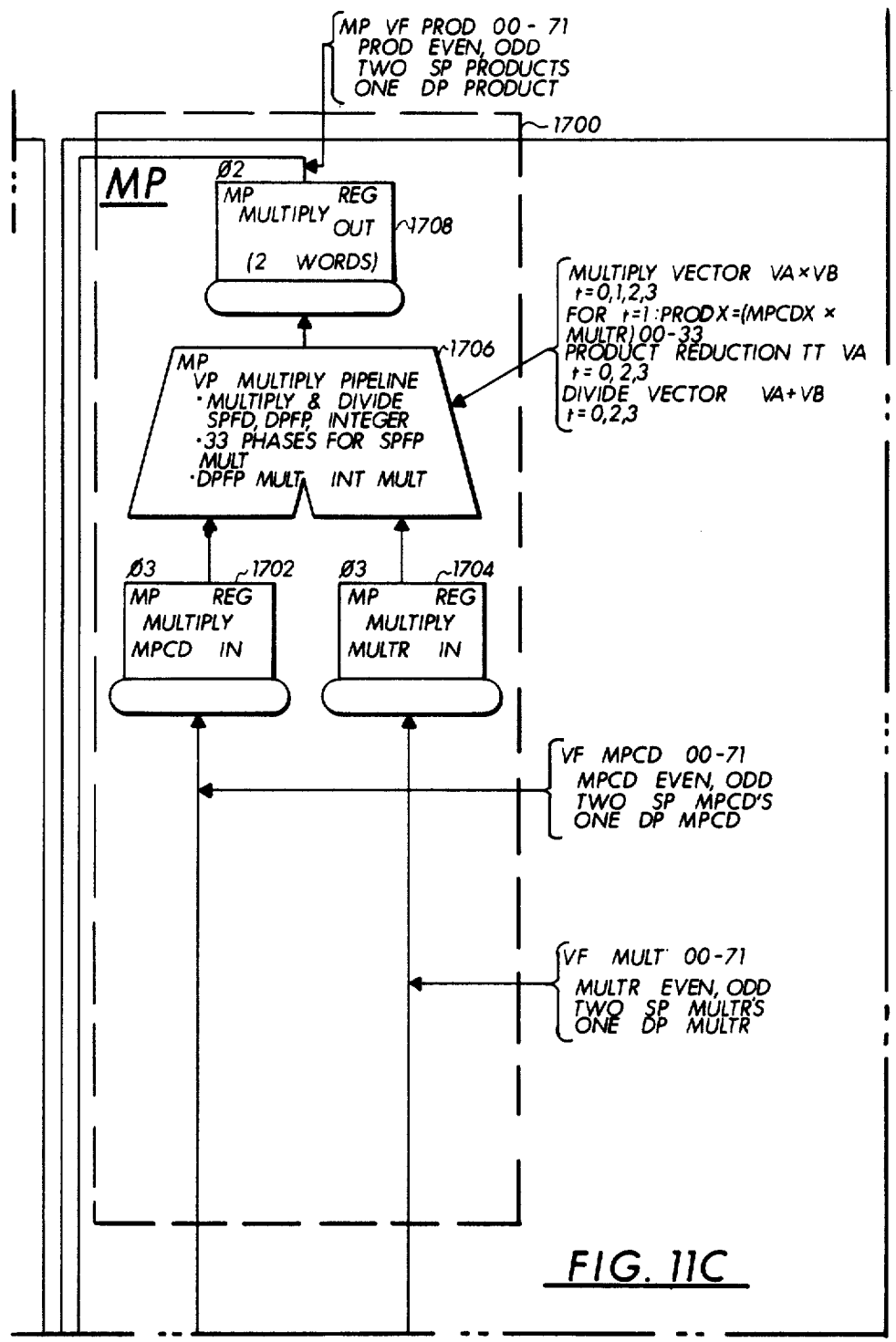
Figure 11D:
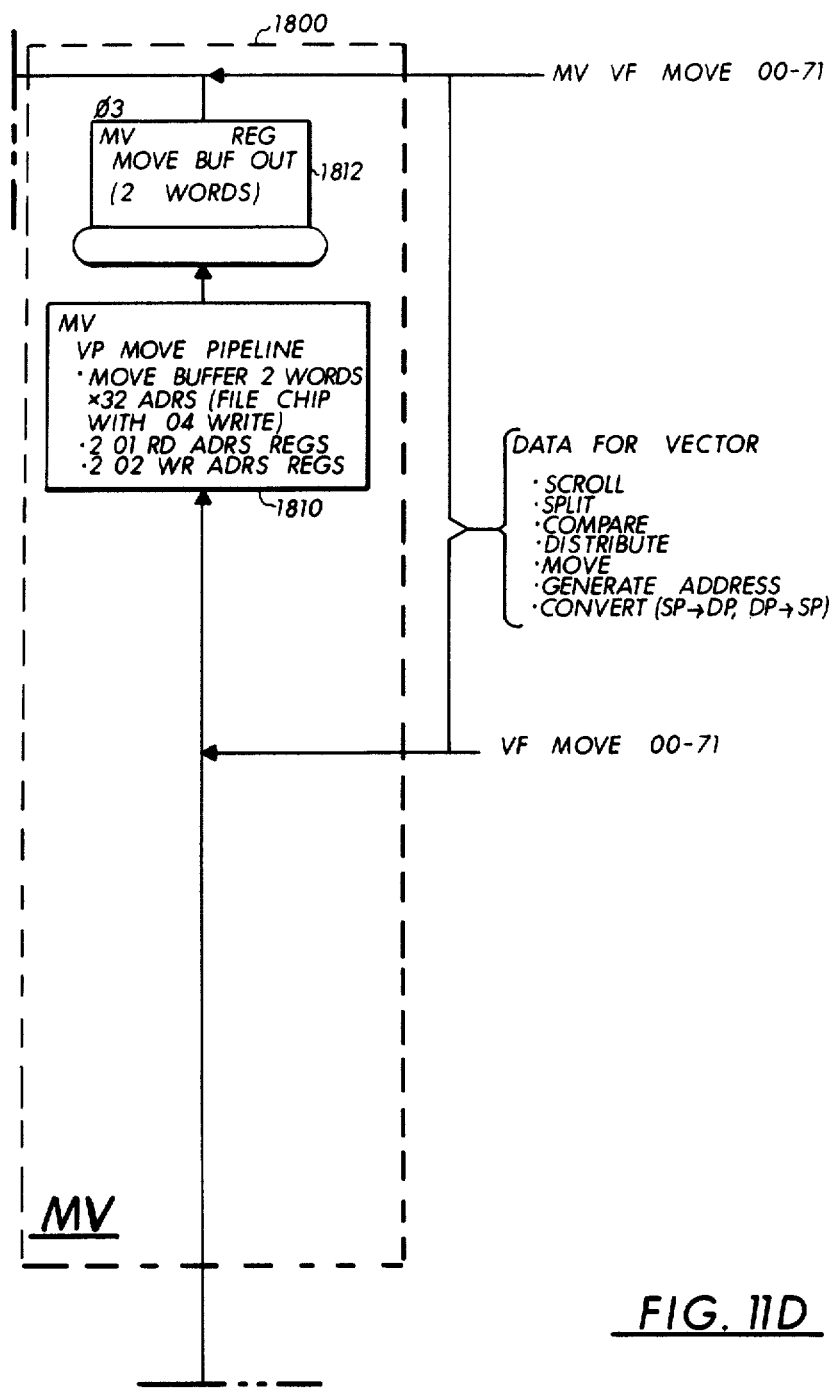
Figure 11E:
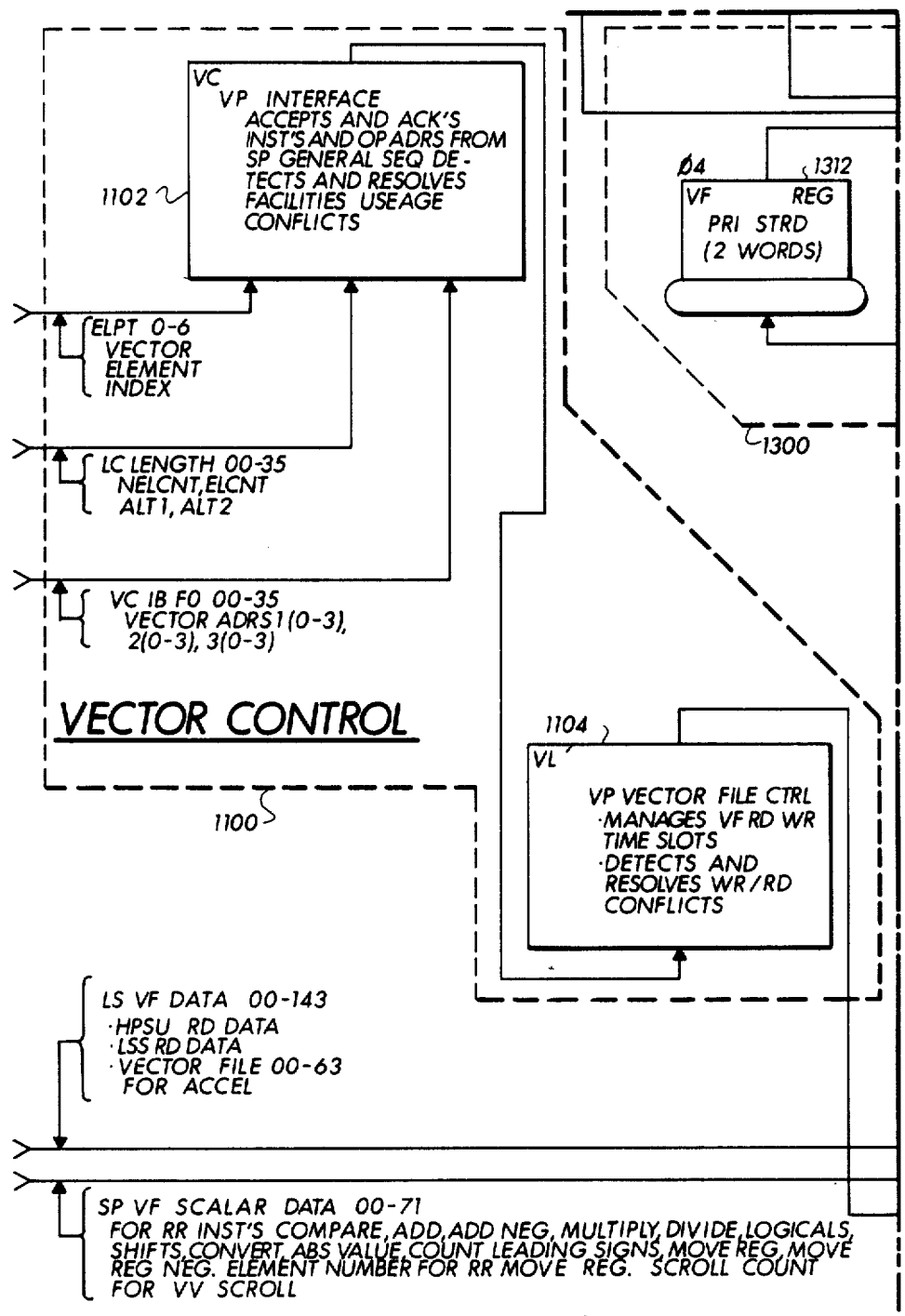
Figure 11F:
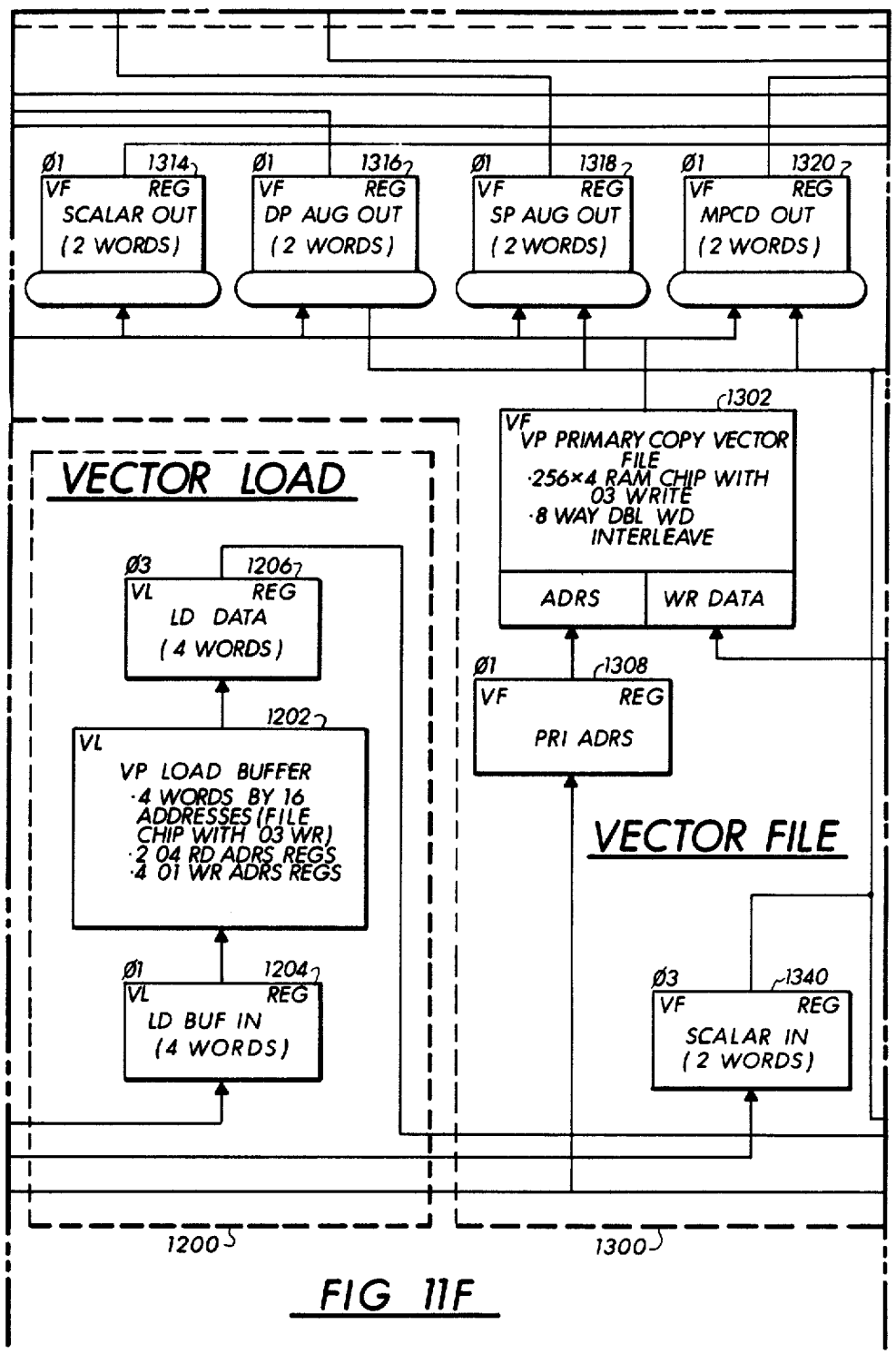
Figure 11G:
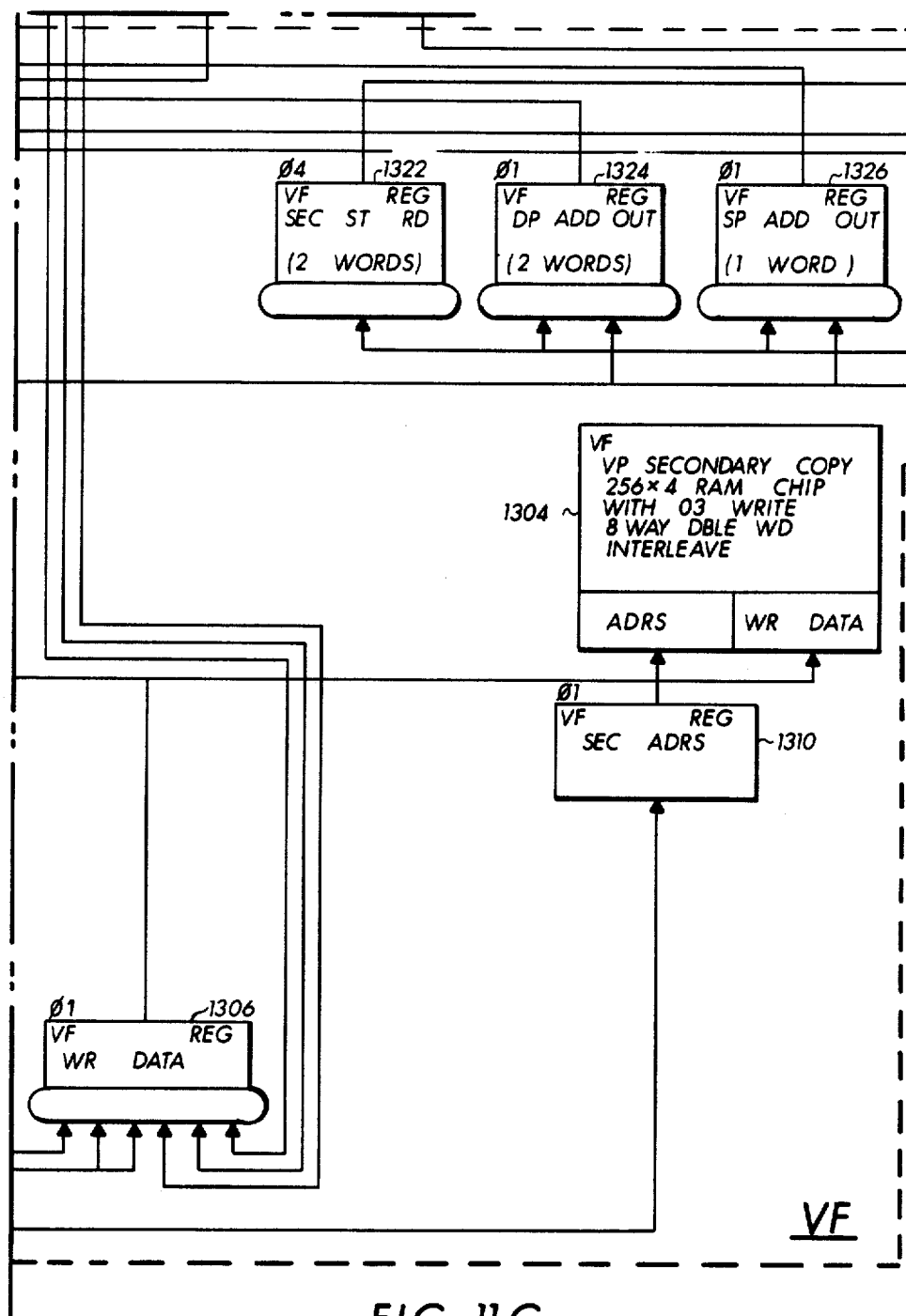

FIG. 11A through FIG. 11H, when arranged as shown in FIG. 11, comprises a logic block diagram of the Vector Processor Module (VPM) illustrating in more detail the logical arrangement and functioning of the sections illustrated in FIG. 9.

a. Vector Control (VC)

The Vector Control (VC) section is shown enclosed in dashed block 1100, and includes the VP INTERFACE 1102 circuitry which accepts instructions and Element Pointer, Element Count and Abort information from the Scalar Processor Module 150, the Instruction Flow (IF) 400 and the Loop Control 1000. It also acknowledges instructions when they are placed into execution. The VP INTERFACE 1102 also forms the second instruction for multiple-pipe instructions where two pipelines participate in execution of certain instructions, such as single precision conversions or the indexed Load Vector. The Vector Control (VC) section 1100 also includes the VP Vector File Control 1104 which reserves the Vector File time slots that are required for instructions. The pipelines themselves are released when the instruction is finished. It selects Vector File address per time slot management assignments and detects logical data usage conflicts.

b. Vector Load (VL)

The Vector Load (VL) section is shown enclosed in dashed block 1200, and includes the VP Load Buffer 1202; Load Buffer in Register (LD BUF IN) 1204 capable of handling four words; and a Load Date Register (LD DATA) 1206, also capable of handling four words.

c. Vector File (VF)

The Vector Files (VF) section is shown enclosed in dashed block 1300, and the storage is implemented from 256 by 4 RAM chips. They are organized on a word-pair basis with an 8-way double word interleave, such that during any clock cycle up to eight (8) Reads or Writes are being accomplished.

The VP Primary Copy Vector File 1302 and the VP Secondary Copy 1304, each selectively receive data from the WR Data Register 1306, and are provided addresses from Primary Address Register (PR1 ADRS) 1308, and Secondary Address Register (SEC ADRS) 1310, respectively. The VP Primary Copy 1302 provides operands for the Primary Store Read (PRI STRD) Register 1312; the Scalar Out Register 1314; the Double Precision Augend Out (DP AUG OUT) Register 1316, the Single Precision Augend Out (SP AUG OUT) Register 1318, and the Multiplicand Out (MPCD OUT) Register 1320. The VP Secondary Copy 1304 provides operands for the Secondary Store Read (SEC ST RD) Register 1322; the Double Precision Addend Out (DP ADD OUT) Register 1324; the Single Precision Addend Out (SP ADD OUT) Register 1326; the Multiplier Out (MULTR OUT) Register 1328; and the Move Buffer Write (MOVE BUF WR) Register 1330. For example, as will be later discussed the VP Primary Copy 1302 provides the operands for the Add Pipe 1600, the Multiplicand for the Multiply Pipe 1700, and the Scalar Data Out, which is data going to the Scalar Processor Module. It also provides the primary store data for Vector Stores. This is routed to the Store Buffer 802 in the Scalar Processor Module.

The purpose of two copies in the VP Primary Copy 1302 and the VP Secondary Copy 1304 is to enable the simultaneous reading of two operands. For example, the VP Primary Copy provides the Augends for the Add Pipe 1600 and at the same time the Addends can be read out from the VP Secondary Copy. Likewise for the Multiply Pipe 1700, the Multiplicand is read from the VP Primary Copy 1302 of the Vector Files, while the VP Secondary Copy 1304 provides the Multiplier. Additionally, data is provided to the Move Pipe 1800, which only gets one operand, and also to the Scalar Primary or Secondary Store Vector instructions. The data is routed from here to the Scalar Processor Module into the Store Buffer 802. This works in conjunction with the Primary Store Data Register 1312 so that data can be transferred at a rate of four words per clock cycle. There are really eight (8) copies of this Write data, one of them being associated with each of the 8 blocks of the primary and secondary RAMs. Both the Primary and the Secondary copies of the Vector File are always written at the same time. That is, the same file, or elements of the same file, are always written at the same time, so that they contain identical data. The source of operands for writing into the Vector Files is, of course, in the Scalar Processor Module. This may well be the result of an RR format instruction. As will be discussed later, there are two inputs coming from the Load Buffer 1202. This Buffer is loaded by Load Buffer Input register 1204 and executes the Vector Load instructions and represents the fact that there are four word transfers per clock cycle. There is input to VP Primary Copy and VP Secondary Copy from the Multiply pipe 1700, and there is also an input from the Move Pipe 1800 and from the Add Pipe 1600.

d. Add Pipe (AP)

With reference to the Add Pipe 1600, there are both single precision and double precision arithmetic operations performed by this Arithmetic Logic Unit (ALU). Consider the double precision ALU pipeline first.

The double precision pipeline includes an Augend character Strip (DP ALU AUG CHAR STRIP) Register 1602 which receives its input from the Double Precision Augend Output Register 1316 of the Vector File and a corresponding Double Precision Addend Character Strip (DP ALU ADD CHAR STRIP) Register 1604, which receives its input from the Double Precision Addend Output Register 1324. The output of registers 1602 and 1604 are respectively sent to the DP ALU AUG IN Register 1606 and the DP ALU ADD IN Register 1608, which provide inputs to the VP DP ALU PIPELINE 1610. It executes the majority of the vector instructions except for Multiply, Divide, Product Reduction, Moves, Vector Load and Vector Store instructions. The double precision pipe is used for both double precision and for single precision operand types, both floating point and integer. It is capable of accepting operands each clock cycle and it provides results starting 31 phases later. Each clock cycle thereafter, one result per clock cycle is provided, either single precision or double precision.

A similar single precision pipeline includes a Single Precision Augend Character Strip (SP ALU CHAR STRIP) and Single Precision Addend Character Strip (SP ALU ADDEND CHAR STRIP) Register 1614. Also there are corresponding Single Precision Augend In 1616 and Addend In 1618 input Registers which enter the VP Single Precision ALU Pipeline 1620. Vector File Output Registers SP AUG OUT 1318 and SP ADD OUT 1316 provide the inputs to the Character Strip Registers 1612 and 1614, respectively.

The outputs of the Double Precision and Single Precision ALU Pipelines 1610 and 1620 are merged in the 2 word ALU Merge Output Register 1622 which provides the final input to the Write Data Register 1306. As to the single precision operation, it is similar in operation to the double precision pipe but its instructions are of the single precision data type. The single precision pipe also produces one result per clock cycle.

Both the single and double precision pipelines accept data and both produce a single precision result each clock cycle. When operating on double precision data types only, the double precision pipeline is executing and it accepts on pair of double precision operands each clock cycle. Of course, it can produce only one double precision result per clock cycle and this is always stored in the Vector Files at the rate of two words per clock cycle.

e. Multiply Pipe (MP)

The Multiply Pipe 1700 executes Multiply, Divide, and Product Reduction instructions with single precision floating point, double precision floating point and single precision interger data pipes. Note that the double precision integer type is missing. That it because the propogation time from the receipt of operands to results of the operation is the same as that for the Add Pipe, namely 31 phases. In the Vector Files the propagation time is 9 clock cycles from the reading of the operands to the writing of the results of that particular pair of read operands. The Multiply Pipe produces one double precision result per clock cycle or two single precision results per clock cycle. The Multiplicands and the Multipliers are received from the MPCD OUT Register 1320 and the MULTR OUT Register 1328, respectively, via MULTIPLY MPCD IN Register 1702 and MULTIPLY MULTR IN Register 1704, and enter the VP MULTIPLY Pipeline 1706. The Multiply Output Register 1708 provides the signal to the Write Data Register 1306.

f. Move Pipe (MV)

The Move Pipe 1800 (MV) is constructed such that concurrent Read and Write operations are allowed. It is organized two words wide by 32 addresses. The Move Pipe executes Move, Compress, and Division distributed instruction. It also participates in single to double and double-to-single precision conversions. The Add Pipe 1600 actually does the execution of the conversion portion and the Move Pipe 1800 participates in proper storing into the input of the Vector Files 1300. The VP Move Pipeline 1810 is basically a Move Buffer two words wide times thirty-two addresses long. It operates with a Move Output Buffer Register 1812 to provide a further input to the Vector File Write Data Register 1306.

g. Vector Store (VS)

The Vector Store (VS) 1500 section is primarily control logic so there is only an entity shown as such on FIG. 11. It controls the movement of data from the Vector Files 1300 to the Store Buffer 802 in the SPM. It executes Store Vector, Index Store Vector, Store All Writing Elements, and participates in the execution of the Index Load Vector instruction. It is also capable of transferring data at a rate of four words per clock cycle. It is capable of reading two words each clock cycle and providing a total of four words per clock cycle. The Vector Store 1500 section provides and controls the interface into the Scalar Processor Module. The Store Buffer section essentially controls the writing of the data that is being transferred into the Vector Files and also controls the writing of it into itself. The Store Buffer 802 logic in the Scalar Processor Module, then reads the data from the Store Buffer and transfers it to the High Performance Storage Unit or the Local Store whichever the destination might be.

Referring back to the Vector Load section 1200, the VP Load Buffer 1202 is organized into four words by 32 addresses. It is constructed of circuit chips to provide the concurrent reading and writing of data. Data from Local Store 300 section and Scalar Processor Module originates from either the High Performance Storage Unit or the Local Store, and data is transferred into the VP Load Buffer 1202. During any given transfer from one to four words can be transferred, and transfers, of course, can occur in every clock cycle. Data from the Load Buffer is transferred into the Vector Files 1300 in four word wide segments, hence it is capable of transferring four words per clock cycle into the Vector File. The purpose of the VP Load Buffer 1202 is to match the data transfer rate into the Vector File. Therefore it can be accepted at any rate from one to four words per clock cycle. The Vector Load 1200 section also executes Vector Load Index Vector instruction and also the Load Alternating Elements Vector instruction.

h. Scalar/Vector Data Transfer Control (SC)

The Scalar/Vector Data Transfer Control (SC) section 1400 is the Scalar/Vector Data Transfer Control logic that is primarily the control logic so there is only an entity shown on the block diagram of FIG. 11. The Scalar/Vector Data Transfer Control section controls the moving of G Register operands for vector format instructions. It can specify G Register operands and controls the transfer of that data to and from the interface to the Vector File 1300. The data comes from the Scalar Processor Module into this section and from there it can be routed to any of the pipelines. For example, assume that the Multiplicand for the Multiply instruction is specified as a G Operand and the data is to be transferred into this Multiplicand Register. By holding this data there for the duration of the Multiply instruction, the contents of the G OP Register is replicated into a vector. The Scalar/Vector Data Transfer Control controls the reading and the writing of Vector File operands for RR format scalar instructions that specify the elements within a Vector File. The data transfer path for data going from the Vector File into the Scalar Processor Module travels from the Vector File via the SC. This interface is directly to the Scalar Processor Module. If the results of an RR format scalar are to be written into a Vector File the data would come by this interface. In that case, the data would be read into the appropriate element as specified into both the Primary 1302 and Secondary 1304 stores of the Vector File 1300. An additional instruction that the Scalar/Vector Data Transfer Control participates in is the Generate Index Vector. This is where data for the Index is generated in the SPALU within the Scalar Processor Module. This data is transmitted over this interface and ultimately written into the VP Primary Copy Vector File 1302 and VP Secondary Copy Vector File 1304 sections.

7. Operation

Examples of several types of operations will be described.

a. Acceleration/Deceleration

Initialization of the logic of the SP will be described and an example activity will be given. An activity is a basic unit of work for the Scientific Processor 22. An activity is started by the Host Instruction Processor 10 preparing for an activity. The Host will usually only prepare an activity once but it may get involved again because the activity may not be completed on the first time that it was active on the Scientific Processor. The Host has to alert the Scientific Processor of the existance of that activity each time the activity is made active. This initiation of an activity is called "acceleration". The term "acceleration" means bringing to the Scientific Processor Control Block 500 all the necessary information about an activity contained in the High Performance Storage Unit 16 into the Scientific Processor. After describing initialization, the execution of some of the instructions of the example activity will be discussed, and finally several example instructions will be described to illustrate how the Scalar Processor Module 150 and the Vector Processor Module 162 work alone or together to execute such instructions. The reasons to terminate that activity will be noted. Basically, an External Interrupt initiates such a termination. The activity may or may not be completed at the point of interrupt. Finally, "deceleration" or terminating an activity of an activity will be described. The term "deceleration" is just the reverse of acceleration. During deceleration all of the data is returned from the Scientific Processor back into the High Performance Storage Unit.

b. Power On

DC power on is initiated from a System Support Processor (SSP) 34. This is the normal method of turning on the DC power, however, power can also be controlled locally at the Scientific Processor. The path by which the SSP initiates this is by the Maintenance Control Interface of the Unit Control Module 170 including the Power Coupling Control 174 and the Unit Support Controller 173, and Cooling Control which actually controls the power supplies. As a portion of the power up sequence, the power up master clear is issued from within the Scalar Processor Module and the Vector Processor Module. This places all the logic in a known condition. For example, all logic circuits are cleared. This master clear single places the SP in a dormant state. This dormant state is also entered with a power clear signal.

c. Processor States

There is a total of eight (8) Scientific Processor states. Each of the eight (8) states will be described. Only certain actions are allowed within states and only certain transmissions between states are allowed. The state is maintained in a Register within the Control Block 500 section in the Scalar Processor Module. The dormant state is the first state during which initialization takes place. The second state is from power up master clear, when the only function or activity going on is that a certain interrupt state is made. This is the focal point for most states in which the decision is based upon what the previous state was and the type of interrupt that occurred. Receipt of an external interrupt causes the machine to enter the third state, herein called the acceleration state. The acceleration state loads the activity from the HPSU into the SP. After loading the activity, the normal or usual next step is to the execution state, herein, the fourth state. It must be noted here that a major difference exists between an internal and an external interrupt. If the interrupt is internal the SP itself can take the necessary actions to resolve the interrupt (the fifth state), whereas an external interrupt means that the SP must be exited and the host IP must take the necessary action to act upon the interrupt (the sixth state). The suspend state is the switch state and is entered from the acceleration, deceleration or execute states even if an initial program load occurs. Of course, some other system action is necessary to exit this state. Finally, there is the inoperative state or eighth state, which is entered upon the occurrence of certain hardware errors referred to as fatal errors. An example might be a parity error in the instructions from the instruction translation logic.

d. Initialization

Initialization is done by the SSP (See FIG. 5). It is done by the maintenance control interface of the Unit Support Controller and from there the path is to the Scan Set logic within the Scalar Processor Module and from there, of course, to the Vector Processor Module. One of the functions accomplished during initialization is the writing in all of the RAMs within the VPM and SPM of a correct parity. For example, all O's with correct parity are written into the RAM's. Some of the internal memories are constructed of file chips and those are master cleared by the power up master clear. They do not require any initialization because they are already cleared to a correct state. The microcode is also loaded into the microcode RAM's of the Add Pipe (AP) 1600 section, the Multiply Pipe (MP) 1700 section, and the Move Pipe (MV) 1800 sections. RAM chips are used for all microcodes so they must be reloaded upon each power up. The macrostack is also loaded. This is in the Control Block 500 section of the Scalar Processor Module. It is similar to the microcode in that it uses RAM chips. The macrocode is used for performing state transitions and many of the actions the code is actually transferred from the macrostack RAM (See 504) in the Control Block section to the Instruction Buffer 402 within the Instruction Flow 400 section. From there it is executed in the normal fashion just as any code would be.

Part of the initialization load includes the Mailbox Pointer Register 716 shown in FIG. 12 in the Address Generation 700 section. This is the real address of the Mailbox which is actually located in the High Performance Storage Unit. Also, the initialization switches the logic to Normal mode from the Maintenance mode. It also raises the available lines which allows or enables interfaces to other system units such as the HPSU. Note that at this point the processor is still in the dormant state.

Considering an example activity, the first step is for the Host IP to prepare the activity. The Host IP does this once for each activity. If the activity is completed on the first pass or the first time that it is active on a Scientific Processor then the SPCB may be altered for subsequent passes. One of the steps in building the activity is to build a Scientific Processor Control Block (SPCB) (See FIG. 12) for an activity into the HPSU. The SPCB contains either the information or the necessary pointers to the actual information necessary to execute an activity on the Scientific Processor. Also, the Host alters Mailbox word 2 shown in FIG. 12 to the SPCB that it has just constructed. It sets the bit O of FIG. 12, which is the valid bit (V) to indicate that there is a valid SPCB available and then it writes the Link Address (bits 6–35) which is the first address of the SPCB. After having completed that, it next sends an interrupt signal to SP by the Universal Processor Interface to alert the SP of the existence of this activity. The SP thereafter receives the Universal Processor Interface Interrupt from the Host IP. The SP CB 504 section in the Scalar Processor Module monitors the Universal Processor Interface Interrupts. Upon receiving a UPI, the microcode is transferred from the macrostack in the SP to a page of the Instruction Buffer 402 of the IF 400 section, and the necessary execution is started to handle the UPI interrupt. One of the first steps is to switch the SP from the dormant state to an external interrupt state. Next, the Mailbox word two is read from the HPSU. The word two contains the valid bit that was just read, indicating the existence of a valid SPCB. It also contains the linking address referring to the real address of the SPCB. A test is then made on the valid bit to determine if it equals 1, and a test on the linking address to determine if it is on a sixteen word boundary. The UPI is acknowledged if the results of these tests are satisfactory. The contents of Status Registers 0 to 3, which are SPCB words 8 through 11, are transferred to words 4 through 7 of the Mailbox and broadcasts a UPI to the Host. Next the UPI is acknowledged and then the Mailbox word 3 is written to contain the same data as the Mailbox word 2. Also the hardware Status Registers 0 to 3 are cleared which are SPCB words 8 through 11 and words 4 through 7 of the Mailbox. Then a switch is made to the acceleration state.

FIG. 12 shows how the SPCB was located. Register 716 represents the Mailbox Pointer Register in the Address Generation section of the Scalar Processor Module. It was initialized by the SSP 36 during the initialization sequence. The Mailbox Pointer Address is used to locate the Mailbox in the HPSU. The Mailbox has 8 words in it (0-7). Here, for example, interest is in word 2. Bit O of Word 2 is the valid bit (V) and the remainder of Word 2 is the link address which locates the Scientific Processor Control Block which is also in the HPSU. During the sequence just completed, the contents of word 2 were transferred to word 3. In this case, the bit O of word 3 is referred to as the Executing bit and, of course, this address is then a link so that the Host knows the exact location of the Scientific Processor at this point.

There exists in the SPCB in the HPSU important information that is required at this time. For example, the SPCB has up to 144 words in it, words 0 through 15 are various pointers and registers and words 16 through 143 comprise the Activity Segment Table (AST). First entry in the AST are four words which are the Local Store segment of the Activity Segment Table, and additional entries are defined by the AST length which defines how many entries there are, up to the total maximum of 32. In word 5, are the real addresses of these Register Save Areas. The real address of this RSA in the HPSU will be discussed in a moment.

Next, consider the steps of acceleration. Now that the SPCB has been located, the first step is to read words 8 through 15 and place them in the hardware Status Registers 0-3 which correspond to SPCB words 8 through 11 and are available immediately. Proceed next to read words 0 through 7, and word 6 is then tested for specifiying the length of the AST. The SP entries, which are SPCB words 16 through 143 are then read. The SP specifies the number of four word AST entries. Next the Register Save Address Pointer, which is SPCB word 5, is tested to see if it is on a 16 word boundary. The Register Save Area Pointer is the Real Address of the Register Save Area and the High Performance Storage Unit. Next reading of the Register Save Area data from the HPSU into the registers and files within the Scientific Processor is started. The Register Save Area contains the Vector File data which are Vector Files 0 through 15. They are located in the Vector File 1300 section of the Vector Processor Module. The G Registers 902, that is G Registers 0 through 15 are two words wide. They are located in the SPALU of the Scalar Processor Module. The Vector Length (VL) and Element Length (EL) Registers 1002, of which there are eight (8) each are located in the Loop Control 1000 section of the Scalar Processor Module. Next are the State (S) Registers, of which there are sixteen in all which are located in the SPCB 504 of CB 500 section of the Scalar Processor Module. The Mask Register (See 602) includes words 4 and 5 of the State Registers and both words 4 and 5 go to the Mask Processor 602 and the Jump History File (See 504). This Jump History File contains 32 files and it goes to the SP CB 504 for Control Block 500 section. Next, the Local Store segment address base, which is found in AST (See 702) word 0, is tested to see if it is on a 16 word boundary and the length to see if it is on a 32 word boundary. Then up to the first 4K of the Local Store segment of the HPSU is sent to the actual Local Store 300. The Local Store segment can be less than, equal to, or greater than the 4K words, however, only up to the first 4K words are transferred.

Now the switch is made to the execution state. At the start of execution for the sample instruction, the first step is to transfer the SPCB word 12, which is the Program Address Register (PAR) to a hardware Program Address Register 410 in the IF 400 section of the Scalar Processor Module. This is actually accomplished by a Jump to an External Segment instruction. Next, an attempt is made to read the instruction in the Instruction Buffer 402 that was pointed to by the PAR. In this case, a "page miss" is received because there are no instructions currently resident for this program or activity that caused the present acceleration. The 16 pages of instruction in the Instruction Buffer 402 are always invalidated prior to accelerating an activity. Therefore upon starting execution of any activity a "page miss" is generated. The mechanism for generating the "page miss" is a "page miss" sequence provided for the acceleration. Upon receipt of a "page miss", the Instruction Flow (IF) 400 section sends the virtual address of the instruction to the Address Generation 700 section. The instruction addresses in the Instruction Buffer are all on a virtual address basis. The only time that real addresses are dealt with is when pages of instructions are fetched from the HPSU. The Address Generation section searches the Activity Segment Table (AST) 702 and translates the virtual address to a real address. Basic execution consists of examining each AST entry in order starting with the first entry. A hit is made on the segment name, when the eighteen (18) most significant bits of the virtual address is equal to or greater than the Lower Segment Name (LSN) and less than or equal to the Upper Segment Name (USN) within the AST entry. The LSN and the USN are contained in word 0 in each AST entry. Once a hit is made, the rest of the translation is completed. Once the address is translated a stream of requests are issued at the rate of four words/block or four instructions/request until a total of 64 requests pass into the High Peformance Storage Unit for a page of instructions. When the data comes into the Scalar Processor it is routed to and written into the Instruction Flow Buffer (IFB). In this case, the instructions are loaded into page 0 which is the address range 0 through 255 of the Instruction Flow Buffer. The next page that is loaded, would go into the next sequential page which would be page 1 that is addressed. This sequence would continue. Next, the Content Addressable Memory (CAM) 414 would be updated. The CAM entries are associated with each page, and include setting the valid bit and writing the most significant 28 bits of the instruction virtual address into the search field entry into the CAM. Since this address is now in the CAM, any request to read out this address will now be successful. The first instruction is looked at next.

e. First Instruction

If it is assumed that this first instruction is an RR instruction, then it has an RR format as shown in FIG. 13. This is a 36-bit format with the various fields illustrated. The f field is the OP code field and it would be equal to 142 which is the OP code for an RR format add. The t field is three bits long. For the example, t is equal to 0 and this specifies a single precision integer data type. Other values that this might have is a 1 which would denote double precision integer data. A 2 would specify single precision floating point data type and a 3 would specify double precision floating point data. Value 4 through 7 are reserved. The r1 field for our example instruction is the Operand number 1, and Augend Register, for the instruction example, is equal to 1. This is G Register Number 1. The r2 field, which is 4 bits long, specifies one of the 16 G Registers. This is for Operand Number 2 which is the Addend and, for example, this might choose G Register Number 2, the next two bits are unused in this format. The r3 field is 4 bits long and is the Operand Number 3 field. It is the subregister where the result of the add will be placed. For example, if G Register number 3 is used, the next 5 bits are unused. The next bits are the S1, the S2, and the S3 bits. If it is assumed that they are all equal to 0 then this specifies that the data is to be read from the G Register and the result written into a G Register. A value of 1, in any of these cases, would indicate an output from the Vector Files of the Vector Processor Module. That is the format for the first instruction.

To follow through with its execution, the instruction is issued from the FO Register of the IP section. This is the first function execution station in a decoded form. For the example instruction, the SPALU 900 of the Scalar Processor Module completely executes such an instruction and no other section participates. In fact, they are not even aware of its existence. Next look at FIG. 14 which shows the execution of the first instruction. It depicts the SP ALU 930 which represents the combination of ALUs utilized by the Scalar Processor Module. Operation is started by a reading of the Operands. For a Read address, the Addend is read first, so the r2 field address is applied to the G Register read address. This address is controlled by the Scalar Processor ALU 900 (See FIG. 11) which sequences the logic. The address for r2 is then applied from the r2 field. This is the Addend address and it is passed to the G2 Register. The data and the address register are clocked on a phase 2, so two phases later on phase 4, the Addend data is clocked into the Augend Register 932. From there it is passed through the SP ALU 930 section. This SP ALU is constructed of the ALU gate arrays and they have a capability of passing data through them undisturbed. So, the data is passed through to the SP ALU Output Register 910. It is clocked there on the following phase 3. Meanwhile, sequencing logic for the SP section has moved the read address for r1, which is the augend, into the G Register 1. On the second clock phase 4, the Addend which was up in the SP ALU Output Register 910 is passed down into the Addend Register 934. At this point the SP ALU function code is changed to indicate an Add function. These two quantities are then added together and the sum is clocked on the next phase 3 into the SP ALU Output Register 910. From there the data is applied to the Write Data input of the G Register file and the write address is sequenced to the write address input of the G Register file 902.

f. Second Instruction

While the first instruction was being read, the program address to the G Register was incremented by one, addressing the next sequential address. When the first instruction is issued, the second instruction is being read and the next sequential program instruction, in this case the second instruction is passed into the FO Register 408 in the IF 400 section. If it is assumed that the second is the same type as the first instruction then the format for the first instruction will be the same for our second instruction except that the S3 bit will be set to a 1. For the first example S1, S2, S3, were all 0's, however, for the second instruction only S1 and S2 will be equal to 0 while S3 will equal to 1. Continuing with the execution with the second instruction, the S3 bit is equal to 1, and the result of the Add operation is sent to the Vector Files 1300. The result is sent to the Vector File into the element selected by the Element Pointer. The instruction is then decoded and issued to the Loop Control (LC) 1000 of the SPM. It is also sent to the VC 1100 section of the Vector Processor Module. The functions that are performed are specified by the Loop Control (LC) section of the Scalar Procesor Module, which selects the Element Point,. This element data is from one of the eight (8) EL registers which has been selected by the Current Element Pointer Register, the CELP see 1002. The SP ALU section forms the sum and just as it did for the first instruction it sends it to the G Register 1. G register 2 also forms a sum and sends its sum to the Vector Processor Module via the Augend Register. Referring back to FIG. 14, it is seen how the data is routed. In FIG. 13, for execution of the first instruction, it was seen that the sum was formed with the Augend while the Addend was actually formed in the SP ALU. It is then transferred to the SP ALU Output Register and, in this case, because their destination is to be the Vector FIles, the data path is via the Augend rather than through G Register file. The output of the Augend Register is a direct path to the Vector Processor Module.

Continuing on with the second instruction, the Vector Control (VC) section of the Vector Processor Module receives both the decoded instructions and the Element Point data at the same time. Usually the instruction is issued to both the Scalar Processor Module 900 section and to the Vector Control 1100 section of the Vector Processor Module at the same time. However, in some instances, the instructions are received in a displaced or asynchronous manner. In this case, the VC section then proceeds to search for a time slot and assigns it to the SC pipe to allow it to gain access to the Vector Files during that period. The Vector Files can be doing up to eight (8) Read and/or Write operations simultaneously. However, when an instruction is received by the Vector Control section, usually both the Read and the Write time slots are reserved for a given operation. The time slot mechanism keeps track of the particular pipes to which the slots are assigned. Also, whether this particular logic is used for a Read or for a Write operation, they are also used to select the appropriate Read or Write address and for applying this to the addressing mechanism within the Vector Files. The VC section also establishes the Vector File addressing for this particular operation on behalf of the SC pipe. File number 3 indicates where the sum or result is to be written. The decode instruction is sent to the SC section and when the VC section reserves a vector file time slot the operation is started. Whenever the SC 1400 pipe is not busy, and it so signifies, it starts by acknowledging the Vector Control section. For example, it may be started immediately when none of the time slots are in use or able to reserve first available ones and the SC pipe 1400 is inactive. When the Vector Control 1100 section receives the acknowledge from the SC pipe it, in turn, acknowledges receipt of the instruction to the IF 400 section of the Scalar Processor Module and terminates itself. At this time it is ready to accept another instruction from the IF section of the Scalar Processor Module. If that instruction were for a different pipe then it could also be immediately started. When the SC pipe has started it will write the data into the Vector Files when the sum data from the Scalar Processor Module is available and the Vector File address is equal to the address specified by the Element Pointer. The Vector File proceeds on down through the address sequentially i.e. elememt 0 and 1 during the first clock cycle, and elements 2 and 3 through the second clock cycle, and so forth. When the SC has successfully written the data, it acknowledges this to the Scalar Processor Module. It then releases the Vector File time slots, the time slots are always reserved for a pipe by the Vector Control section and released by that pipe whenever it is completed with the operation and the SC pipe 1400 then terminates itself and at that point it would be ready to accept another instruction or operation.

The block diagram shown in FIG. 15 shows the data transfer from the Scalar Processor Module to the Vector Files. FIG. 15 shows the passages of data. The input represents the data from the Augend Register of the Scalar ALU. The data is then transferred into the Vector File Scalar Input Register 1340 and from there into the Vector File Write Data Register 1306. It is then written into the VF Primary RAM 1302 and the VF Secondary RAM 1304 at the same time.

g. Third Instruction

The third instruction is started while the second instruction was being read again, the address in the G Register is incremented by 1. At that point the next sequential instruction is ready to be read. This would be the third instruction. When the second instruction is issued by the Instruction Flow section, the third instruction is read into the FO Register 408. As an example, assume that it is a Vector Vector (VV) format Add instruction as shown in FIG. 16. The basic operation of the Vector Vector Add instruction is to add the first element of the vector specified by the V2 Register to the first element of a Vector File specified by the 1 Register and take the sum of that and write it into the first element of the Vector File specified by the V3 Register. Referring to FIG. 16, the f field is equal to 042, which is the Operation code for a Vector Vector Add. Next, the t field, which is three bits long, will be assumed to be equal to 2, which specifies single precision floating point data operation. The other possibilities are for the t field to be equal to 0 which would specify single precision integer data operation; a t field equal to 1 which would specify a double precision integer data operation; or a t field equal to 3 which would specify a double precision floating point data operation. Fields 4 through 7 are reserved. The V1 field specifies one of the 16 Vector Files. Assume, for example, a Vector File four (4), which is the Augend file. The V2 field is 4 bits long. It also specifies any one of the 16 Vector Files. In this case assume a five (5) for the Vector File Register. This is the Addend file. Next, is the 1 or left field. It is a two bit field which specifies the Element Count, and is the number of elements to be processed for a given Vector instruction. The L (left) specifies where or how the Element Count is to be derived or selected. A zero (0) means that the L (left) count is from the Remaining Length (RL) field of one of the eight (8) VL Registers in the Loop Control (LC) section of the Scalar Processor Module. If the RL field is equal to or greater than 64, the Element Count selected is 64, but if it is less than 64, then the Element Count is whatever the RL field specifies. Some of the other possibilities are for L (left) to equal 1, which specifies the next Element Count (ELCNT). This is formed by subtracting the strip size, which, in this case, is 64 from the number remaining in the left field. The value of two for the L (left) field would specify the alternate (alt) 1 field of the VL Register while a L (left) value of 3 specifies the alt 2 field of the VL register. The V3 field is a four bit field which also specifies one of the 16 Vector Files. For this example assume a Vector File six (6). This is the location into which the resulting sum of the addition is written. The S1 and the S2 fields, are for this example assumed both to be equal to one (1). This specifies that the data is to be read from the Vector Files. In other words, the Augend and the Addend are coming from the Vector File 1300 rather then from the G Resiters 902. A value of 0 for S1 and S2 denotes G Register data. The C field is 2 bits in length, and assumed to be a value of 3 for this field example. It specifies that the elements of the Vector should be processed with ones in the Mask Register. Other values that the C field may be are zero (0), which specifies that all elements in the Vector should be processed; a one (1) which indicates that only those elements whose corresponding position is at 0 in the Mask Register should be processed; and C field equal to 2 and 3 which have already been discussed.

Next, consider the execution of the third instruction. First, the Instruction Flow 400 mechanism issues an instruction to the Loop Control (LC) 1000 section and to the Mast Processor (MK) 600 section. Both of these sections are in the Scalar Processing Module. The instruction is also sent to the VC 1100 of the Vector Processor Module. The function that the loop Control section performs is to take the Element Count from the Remaining Length (RL) field of the EL register selected by the Current Vector Element Pointer (CELP). If the RL field is equal to or greater than 64 then the Element Count is 64, otherwise it uses the actual value of the RL field. The Mask Processor selects the first two mask bits of the Mask Register and presents them to the Add Pipe interface. These first two mask bits are associated with the first two elements of the Vector File. Continuing along with third instruction then, the VC section receives the decoded instruction and the Element Count at the same time. The VC section searches for and reserves a vector time slot for the Add Pipe (AP) 1600. The pattern is two adjacent slots, first the Read and then the Write time slot. If the pipe is unable to start because it is busy then the time slots just reserved are cancelled and the process is repeated by reserving and cancelling until the pipe is able to start the execution of an instruction. The VC section also establishes the necessary address information on behalf of the Add Pipe for the reading and writing of operands from the Vector File. For example, this would be V4 and V5 for the two read operands, the Augend and Addend respectively. V6 is the destination location for the result of the Add operation. The VC section also loads these file numbers V4, V5, and V6 and initiates a Conflict Detection Operation for the Add Pipe. The Conflict Detection Operation consists of testing to see if any earlier instruction is using the same files. It also tests to determine if it has completed its operation on the elements that are in process. The effective result that the Conflict Detection and Resolution Mechanism (see 1104) produce is to indicate the completion of execution of each instruction prior to the start of the next instruction. Continuing with execution of the third instruction, the Add Pipe starts operation when the Vector time slot is reserved and the pipe itself is not busy. It sends an acknowledgement signal to the Vector Control section. Upon receipt of the acknowledgement, the VC clears the busy designator and terminates itself. At this point, it is ready to receive another instruction from the IF section of the Scalar Processor Module. Meanwhile, the Vector Files are reading two elements each from file V4 and V5 during each clock cycle. The operands from V4 are read from the VP Primary Copy Vector File 1302 and the V5 is read from the VP Secondary Copy 1304. The data is then routed to the Add Pipe 1600 by the Vector File Addend and Augend output Registers. The Add Pipe sequences the Mask Register and decrements by two the Element Count during each clock cycle. When the Add Pipe started execution of the instruction, it also received a copy of the Element Count, which it keeps decrementing until the instruction is terminated or completed. The Mask bits are provided for Mask Processor, 602, two bits at a time and they are necessary to sequence each clock cycle until the instruction is completed. The Vector File writes 2 sums into the V6 Register each clock cycle, starting 9 cycles after Vector File Read operation. When the Add Pipe decrements the Element Count equal to 0, the instruction is completed. At this point, it releases the Vector File time slots, notifies the Mask Processor to switch to the next instruction, and terminates itself. It is now ready to start a new instruction. At this point all of the Augend and Addend Read operands have been read from the Vector Files and provided to the data path of the Add Pipe. The operands for the last 9 cycles, that is a total of 18 Augends and 18 Addends, are still progressing through the various stages of the Add Pipe and will continue writing results into the Vector Files for 9 additional clock cycles. The pipe actually could start another instruction if the operand for this new instruction follows along behind the operands of our first instruction.

h. Four Instruction

For the example, assume that the fourth instruction is the same as the third except that the S2 bit is 0. This specifies that the OP 2 source is a G Register rather than a Vector File. In this case it would be from G Register G5 and the value is replicated to form a vector. This operation is referred to as a G OP and its transfer is shown in FIG. 17. Referring again to FIG. 16, remember that the bit that is different is the S2 bit. In the third instruction is was said to be equal to a 1, now it will be equal to 0, which as noted, will denote data from a G Register. Returning to the execution of the fourth instruction, the Instruction Flow 400 section issues the instruction in a decoded form to the Scalar Processor section, to the Loop Control section, to the Mask Processor and to the Vector Control section and the Vector Processor Module. The Scalar Processor is reading the contents of the G5 Register, sending it to the SC 400 section of the Vector Processor Module. This is the same data path which was used for writing the sum of the second instruction, which had an RR format, into an element of a Vector File. Meanwhile, the Loop Control section forms the Element Count in the same manner as for the third instruction and the Mask Processor selects the first two bits of the Mask Register and presents them to the Add Pipe. The Vector Control 1100 of the Vector Processor Module receives the decode instruction and the Element Count at the same time. The SC section also receives the decoded instruction, essentially in parallel with the VC section, and it recognizes the existence of a G OP and therefore sets what is known as G OP wait designator. This designator prevents the Add Pipe from starting the instruction and the Vector Control 1100 section from acknowledging an instruction. If necessary, the SC pipe then waits for the G OP data, the arrival of which is asynchronous with the instruction in that the G OP data could have arrived before or after the arrival of the instruction. When the data is available, the SC section transfers the G OP to the Vector File double precision and single precision Addend Registers 1324 and 1326.

FIG. 17 shows the data path of the G Register data. G OP data from the Scalar Processor section of the Scalar Processor Module enters the Vector File Scalar Input Register 1340. From there the data is routed to the Double Precision Output Register 1324 and Single Precision Output Register 1326 of the Vector File. It is transferred by the SC section when the Clock Enable (CE) signal is applied to both of these Registers. This data is held within these Registers by setting the Clock Enable designator. Ultimately, the Add Pipe 1600 will clear or release that designator when it is done executing this Add instruction. A further Clock Enable (CE) input is applied to the Scalar Input Register 1340. This is necessary because the data arrives asynchronously. If the SC Pipe has the instruction prior to the time that it is told what to do with it, the instruction is held until it is given directions. Next, the SC Pipe clears the G OP Wait Designator and terminates itself. The G OP Wait clearing operation allows the Vector Control and Add Pipe to proceed. Basically the rest of the instruction is similar in execution to the third instruction, the Vector/Vector Add instruction. To accomplish the execution of the fourth instruction; the Vector Control section searches for and reserves a Vector time slot until such time as the Add Pipe itself is ready to start. The Vector Control 1100 section also establishes addressing for the Vector File, 1300 as well as the Reading and Writing of the operands for V4, which is the Augend. Notice that V5 is missing because the V5 operand is already locked up in the Addend Output Registers. V6 of course, is the destination where the sum is sent. The VC section also loads the V4 file number for the Read operand and again for the V6 file numbers for the Write or destination operand. The Add Pipe starts when the Vector File time slot is reserved and when the pipe itself is not busy with another instruction. It signifies that it has started its acknowledge signals to the Vector Control section. In turn, the Vector Control section acknowledges the receipt of the instruction by clearing the Wait Designator and terminates itself. Meanwhile, the Vector Files have been reading two elements from Vector File V4 during each cycle. This V4 data is the Augend data and is read from the VP Primary Copy Vector File 1302. In this example, the VP Secondary Copy, 1304 is not needed because the Addend operand has already been derived from the G5 Register. The Add Pipe sequences the Mask each clock cycle and decrements the ELCNT by two each clock cycle. The Mask essentially accompanies the associated element through the various stages of the Add Pipeline. Meanwhile, the Vector starts writing two sums in the Destination Register each clock cycle and it starts time cycles after the first operands are read from the Vector Files. It represents the length and time slot of the data path. The Mask bits are used to control writing of the associated elements into the Vector File at this point. The Add Pipe performs an operation whether or not the Mask bit orders it and the Mask bit is only applied when the data is to be written into the Vector File. When the Add Pipe decrements the Element Count to 0, it releases the VF time slots and the Clock Enable signal that was holding the G OP in the Vector File single precision (SP ADD OUT) 1326, double precision (DP ADD OUT) 1324 Add output Registers is removed. The Mask Processor is switched to the next instruction and it terminates itself. Finally, the operands to the last 9 cycles are still progressing through the various stages of the Add Pipe and will continue writing results into the Vector File for the 9 additional cycles.

i. Activity Stop

The stopping of an activity will be discussed and is best begun by an explanation of interrupt signals. They are basically of two kinds of interrupts internal and external. An external interrupt means the Host processor must take some action, since the Scientific Processor itself does not have the capability of handling these interrupts. There are two broad categories of external interrupts, those caused by erroneous operations of either hardware or software, and those that are provided for during normal system operation. An example of erroneous hardware operation is a parity error detected on the data transfer between the various registers within the Scientific Processor. An example of a software error might be shown by the Register Save Pointer which indicates that the Register Save Area (RSA) was not on a 16 bit, 16 word boundary when that check was made during the acceleration sequence. The normal system operation external interrupts includes those necessary for system operation and/or those that one might expect during normal operations. An example of normal external interrupt is the Generate Interrupt instruction (GI). The GI instruction is included in code for an activity for one of two reasons. One reason is at the end of an activity when all of the codes have been successfully executed. A second reason is to place calls within the code before this activity is necessarily completed which this code is used to call upon the Host processor. Another example of an external interrupt occurs when the counter counts down or is decremented down to 0. At that time an external interrupt occurs and this is the reason for decelerating an activity. For the example activity, assume that a GI instruction has been encountered.

After the GI instruction is issued the Control Block section which recognized the external interrupt issues a halt to the Instruction Flow section causing it to halt the issuing instructions. Thereafter, enough time is allowed for those instructions already in execution to be completed. Next, the execution state is exited and the external interrupt state is entered. The Instruction Buffer 402 in the IF section 400 is validated and the contents of the micro stack is transferred to one of the pages of the Instruction Buffer. First the program address is transferred from the PAR to the SPCB word 12. Bit 17 in the hardware Address Register 0 is also set and this denotes that the source of the external interrupt was a Generate Interrupt instruction. The external interrupt state is exited and the deceleration state entered. Of course instructions from the micro stack code are still being executed in one of the pages in the Instruction Buffer. The next activity is the storing of the Local Store state data into the High Performance Storage Unit along with the address where the data is to be transferred. This is done by the Local Store Segment Address which can be found in the ASTO entry, i.e. the word 0. Next all of the Register data is stored in the HPSU via the Register Save Area Pointer, which is located in SPCB word 5. The datathat is stored in a Register Save Area is the Count in the Vector File. In addition, the contents of the eight (8) vector left and eight (8) Element Pointer Registers from the Loop Control section of the sixteen (16) State Registers and this includes the Mask Registers from the Control Block section as well as the 32 Jump History File entries from the same section, are written into the Register Save Area Address in the High Performance Storage Unit. Next, the SPCB words 8 through 15 are sent to the HPSU via the Mailbox Link Address Pointer. Next the executing bit is transferred. This is bit 0 of the Mailbox word 3 in the HPSU. It is located by the Mailbox Pointer Register in the Address Generation section. When the status registers 0 through 3 are transferred into Mailbox words 4 through 7 again stored in the HPSU, then a broadcast is made via a Universal Processor Interface interrupt to the Host processor and a switch from the dormant state is accomplished and the deceleration of the activity has been completed.

To recap the description thus far, the Host processor has been preparing an activity for execution on a Scientific Processor. The Scientific Processor has been alerted by the Host of the activity by the UPI interrupt. Next, the Scientific Processor received the Universal Processor Interrupt and started acceleration of the activity by transferring data into the internal register files of the Scientific Processor. For example instructions were followed through execution showing how the Scalar Processor Module executed instructions. The Vector Processor Module was also described with an example given of how it executed a Vector/Vector Add basically by itself. Further, a variation to those two instructions was described using both the Vector and the Scalar Modules in the execution of instructions. Finally the reasons for terminating an activity were described, followed by the explanation of the deceleration of an activity back to the High Performance Storage Unit.

F. Scientific Processor Detailed Description

Having described the functional subsections of the VPM and the SPM, and having described over-all functional interrelationships and operations, each of the functional subsections will be described further as to operation and structure. In the follow descriptions, reference numerals will be related to the ranges for each functional subsection, as set forth in FIG. 8 and FIG. 9.

1. Scalar Processor Module in Detail a. Instruction Flow (IF)

(1) Overview

An overview of the general operation of the IF 400 section will be presented initially with block diagrams and later operations and controls will be reviewed in detail. FIG. 18 is a simplified block diagram of the Instruction Flow (IF) 400 section of the Scientific Processor. The IF logic section consists of three subsections. They are: (1) IFA 420, which is the Instruction Flow Address subsection; (2) IFB 422, which is the Instruction Flow Buffer; and (3) IFC 424, which is the Instruction Flow Control.

The address usually comes to the Instruction Flow Address 420 section on line 426 from the Control Block (SPCB) section, the data to IFB section from the Instruction Buffer comes on line 428 from the Storage Buffer section; and finally the Control from the IFC 424 section is sent on line 430 throughout the whole machine. In the IF physical partitioning there are four circuit cards, F4, F5 F6, and F7. The F4 card is called the Program Address card and it contains Program Addressing logic, a Content Addressable Memory (CAM) addressing logic and also Control logic. Card F5 is called Program Address Capture card and it contains Program Address Registers, Address Registers and a Comparator. The F6 card is called Instruction Buffer Word 0 and 1 card, and it contains an Instruction Buffer for Word 0 and Word 1 and associated Address Input and Output Registers, Illegal Instruction Check Memory, Translate RAM (XRAM) and associated XRAM gate arrays. The F7 card is called the Instruction Buffer Word 2 and 3 card. It is almost the same as the F6 card except for some control logic.

(2) Program Addressing

Figure 19A:
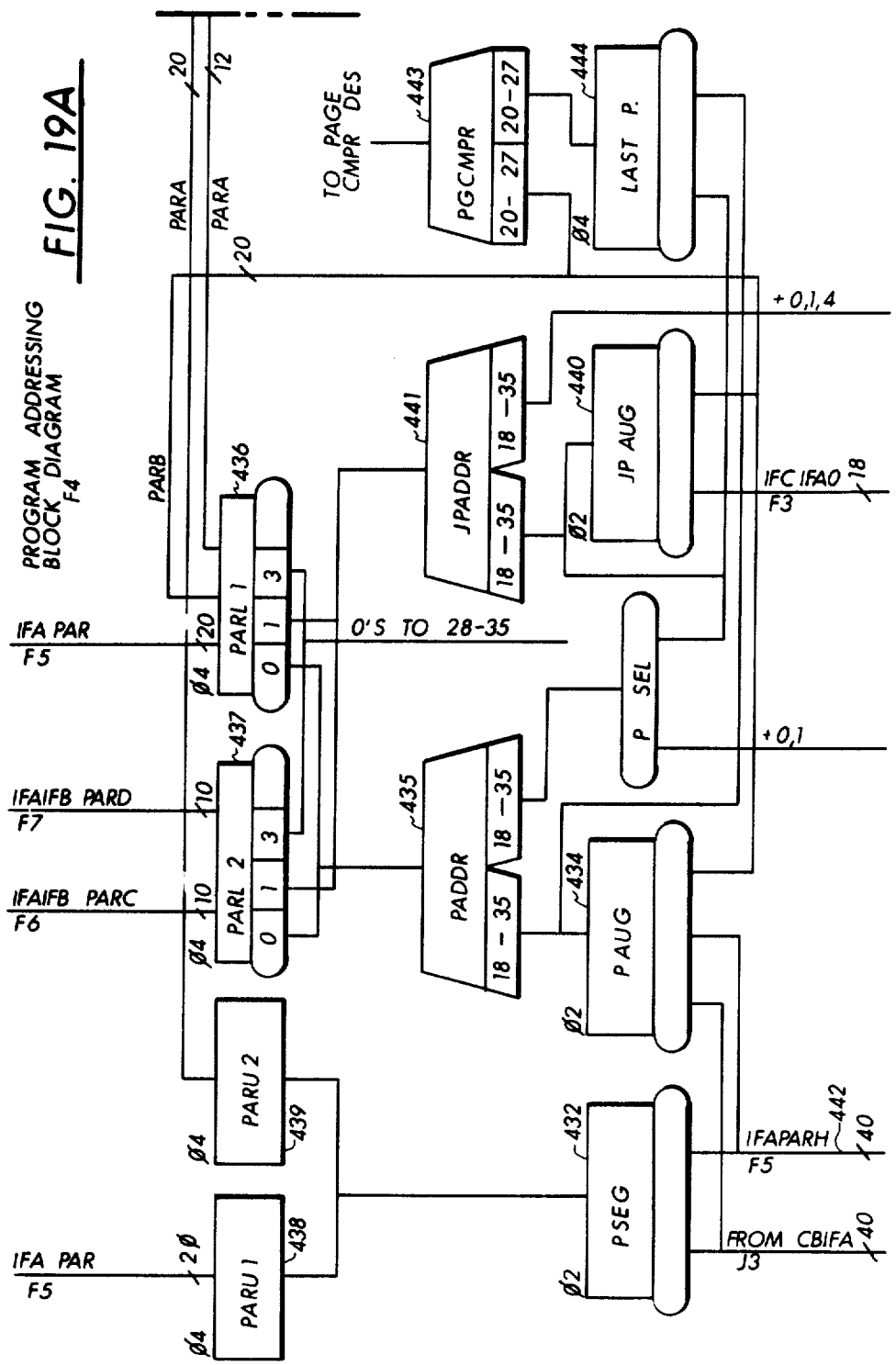

FIG. 19A and FIG. 19B, when arranged as in FIG. 19, is a logical block diagram showing the addressing portion of the Instruction Flow section. The Program Addressing circuit contains normal instruction addressing and includes a Program Segment Register (PSEG) 432 and a Program Augend Register (PAUG) 434. The instruction address arrives first from the Control Block section. A Program Adder (PADDR) 435 is where the decision is made whether a 0 or a 1 is added. The Program Address Register, which is really two registers PARL 1 436 and PARL 2 437. PARL 2 is really a copy of PARL 1 and it contains bits 27 through 35, while PARL 1 contains bits 18 through 35. On the left is the PAR buffer, which includes a PARU 1 438 and PARU 2 439. Normal addressing then is for the Augend to go through the PADDR 435 to the PARL 1 436 and PARL 2 437, and then from the PARL 1 and PARL 2, goes back to the PO again. After that it returns to the PAR again plus 1 to PARL and so on. The upper address, bits 0 through 17, remain the same throughout the task. All the addressing instruction for Jump External Segment or Interrupt does is to change the upper address.

The next item is Jump instruction addressing. Near the bottom of FIG. 19A is the Jump Augend register (JP AUG) 440. The Jump Address itself is 16 bits wide, and is the U portion of the instruction itself. The Jump Address initially enters the Jump Augend Register and is set at 0. It goes from the Jump Adder (JPADDR) 441 to the PARL 1 and PARL 2, and then back for another Jump. It does this twice and then normal addressing starts.

The Retry Address is stored on card 5 and it enters as shown in FIG. 19A as IFA PARH 442 (Program Address Register H) and that is where the Retry Address resides. A Page Comparator (PGCMPR) 443 enables the generation of an Address and an Add instruction every 30 nanoseconds. In this Page Comparator bits 20 to 27 of the Program Address Register are compared with the bits 20 to 27 of the Last Page Address Register (LAST P) 444. This is done every time a transfer is made. If a comparison is made, the instruction can continue at a 30 nanosecond pace. if the comparison is not made then the PARL is blocked. That address in PARL is frozen and it must then be determined if a comparison is made. If comparison is met, then the miss sequence is continued and a 30 nanosecond segment is skipped. If they do not compare, then a miss is generated which goes to IFC section. The IFC section will determine whether or not this Jump will be taken. The CAM 445 shown in FIG. 19B is 16 addresses deep and 33 bits wide. It contains bits 0 through 27 of the Program Address Register plus the four parity bits and the validity bits. It is written into during the miss sequence when a new page is brought into the buffer. The addressing of the CAM 445 is first-in, first-out (FIFO) and the addressing to accomplish this is on the right side of the block diagram of FIG. 19B.

(3) Program Address Capture

Figure 20A:
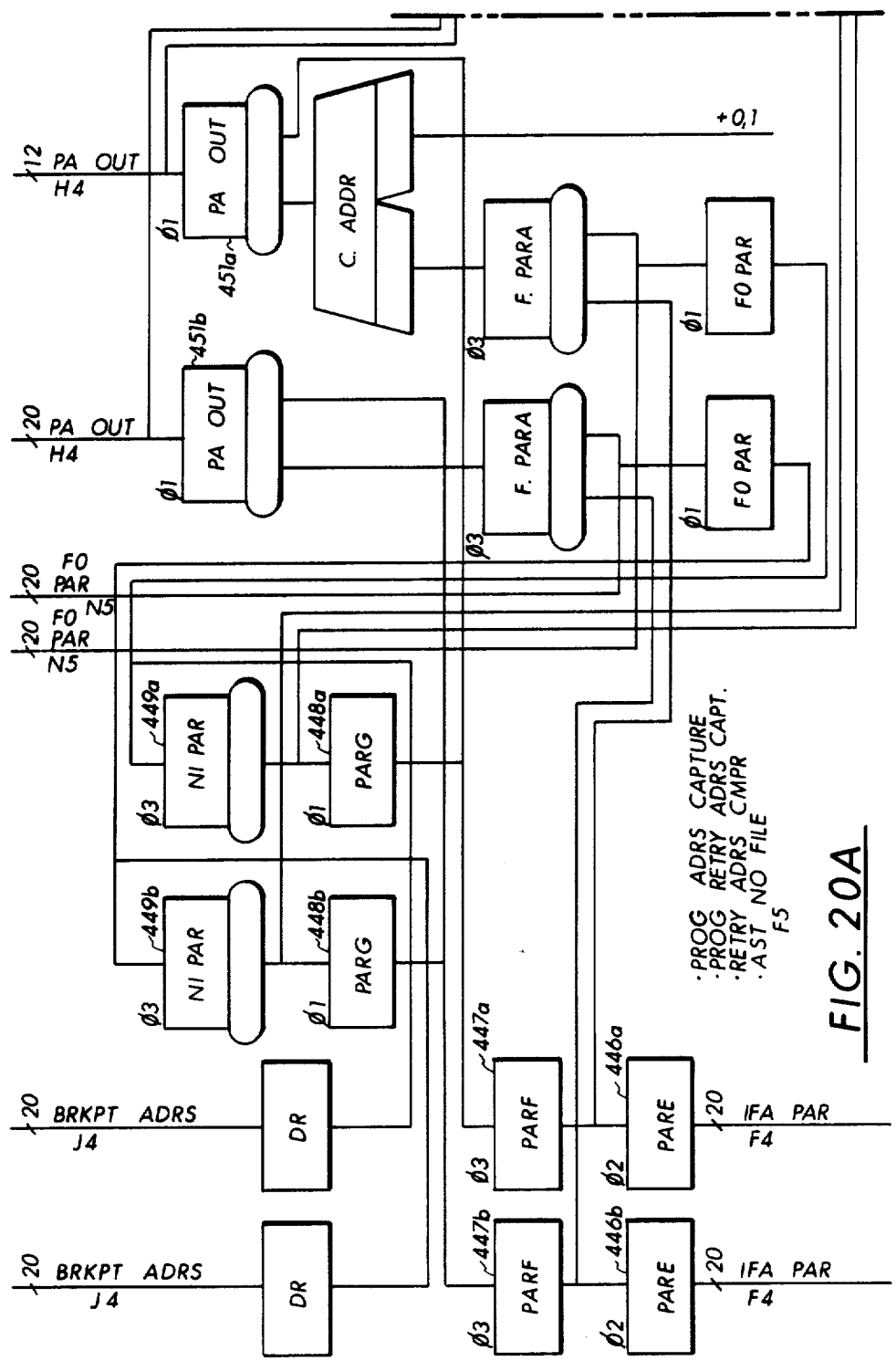

FIG. 20A and FIG. 20B, when arranged as in FIG. 20, is a logical block diagram showing how addresses are captured, and how the Address Segment Table is organized. There are a number of registers needed so that one may keep track of the location of the instruction. For example, Program Address Register E (PARE) 446a and 446b corresponds to a hold register. This is a buffer register and is the first register where the instruction will appear. The path is from PARE to PARF 447a and 447b, then to PARG 448a and 448b, and finally to the Next Instruction Program Address Register (NI PAR) 449a and 449b. At this time the instruction would be issued in IFC but the Address of the instruction appears in this Register, and the Address goes farther to Program Address Register H (PARH) 450a and 450b, and Program Address Register out (PA OUT) 451a and 451b. If, for example, there is a Jump instruction, there is a Jump History File required and the Jump Address must be stored. It would thereafter go to CB section and be placed into a Jump Register File.

There is also a pair of Lost Error Address Registers (LSTER) 452a and 452b. During the time when a parity error occurs in an old register and when a Jump sequence is entered by the Control section, these two registers are compared by E COMPR 453. If a comparison is made, then it is the same Address that has twice failed to the same instruction and this will generate a Halt operation.

The Address Segment Table (AST) 454 number file is used exclusively by the AG 700 section. The data comes from AST IN 455 and returns via AST OT 456 to the AG section.

(4) Instruction Buffer (F6/F7)

Figure 21:
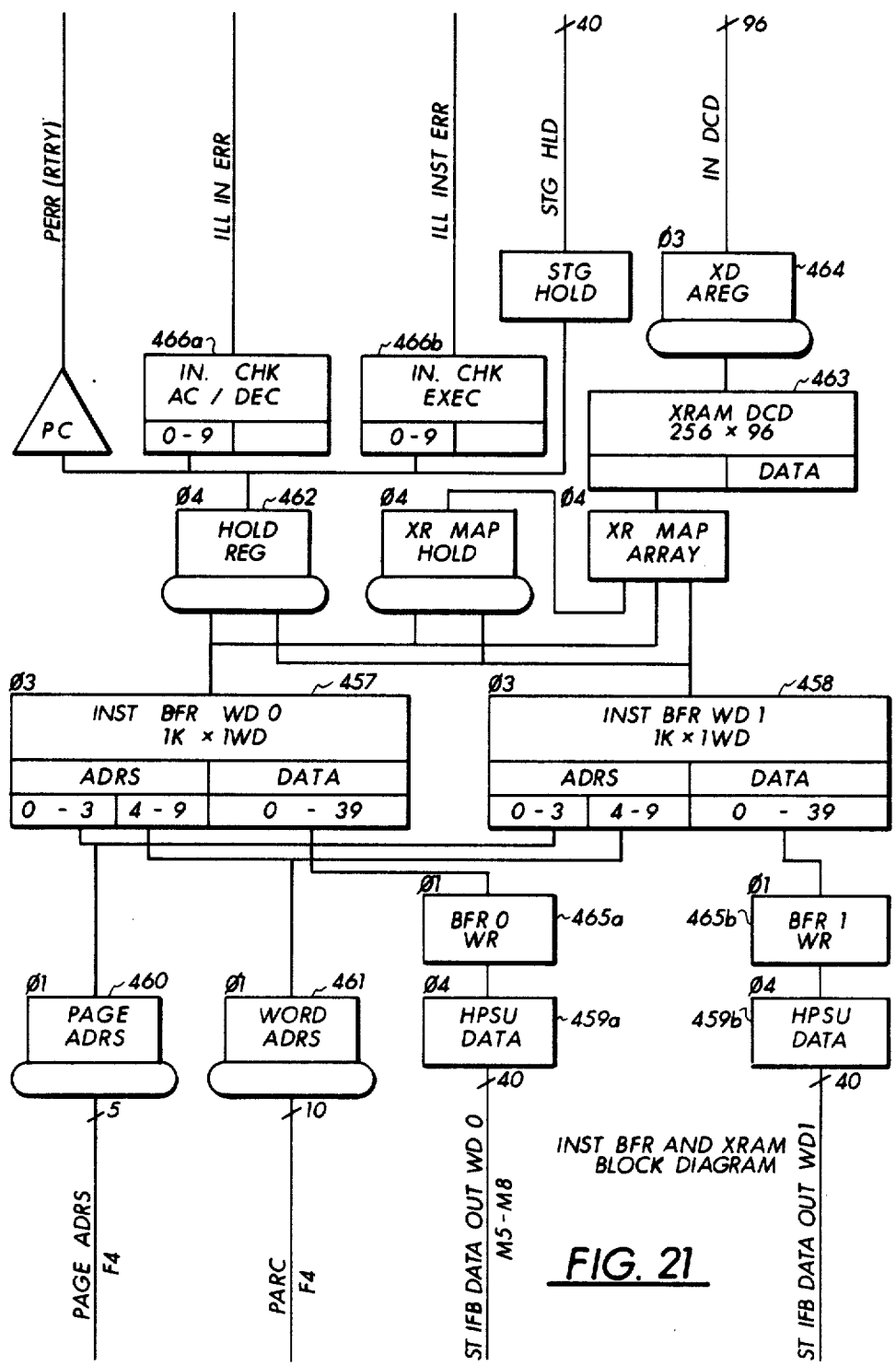
FIG. 21 is a logical block diagram of the instruction buffer and the Translate RAM (XRAM) of the buffer section (IFG) of the Instruction Flow (IF) section of the Scalar Processor Module (SPM)

FIG. 21 is a logical block diagram of the Instruction Buffer and the Translate RAM. There are two Instruction Buffers (INST BFR WD0) 457 and (INST BFR WD 1) 458, and each is a 1K by 40 bit Buffer. There are separate data Input Registers (HPSU DATA) 459a and 459b for each buffer. Both buffers use the same Address Registers (PAGE ADRS) 460 and (WORD ADRS) 461, and both are sharing the same Hold Register 462. There is one Translate 256×96×RAM (XRAM) 463 on each card and one 96-bit Translate Register (XD AREG) 464 on each card.

The HPSU Data registers 459a and 459b receive data from the Store Buffer section. This data is passed into Buffer Write Register (BFR0 WR) 465a and (BFR1 WR) 456b and from there it goes into the Buffers 457 and 458, respectively. The two Instruction Buffers are identical except for the positioning, and of course this positioning determines which Buffer is going to be read into the Hold Register 462, which represents the output register for the two Buffers.

There are also two Instruction Check Memories (IN CHK) 466a and 466b. One is used for acceleration and the other for the normal execution of the instruction. The parity of the instruction is also checked. First if the parity bit fails, then the run sequence is stopped.

(5) Virtual Address (VA)

Figure 22:
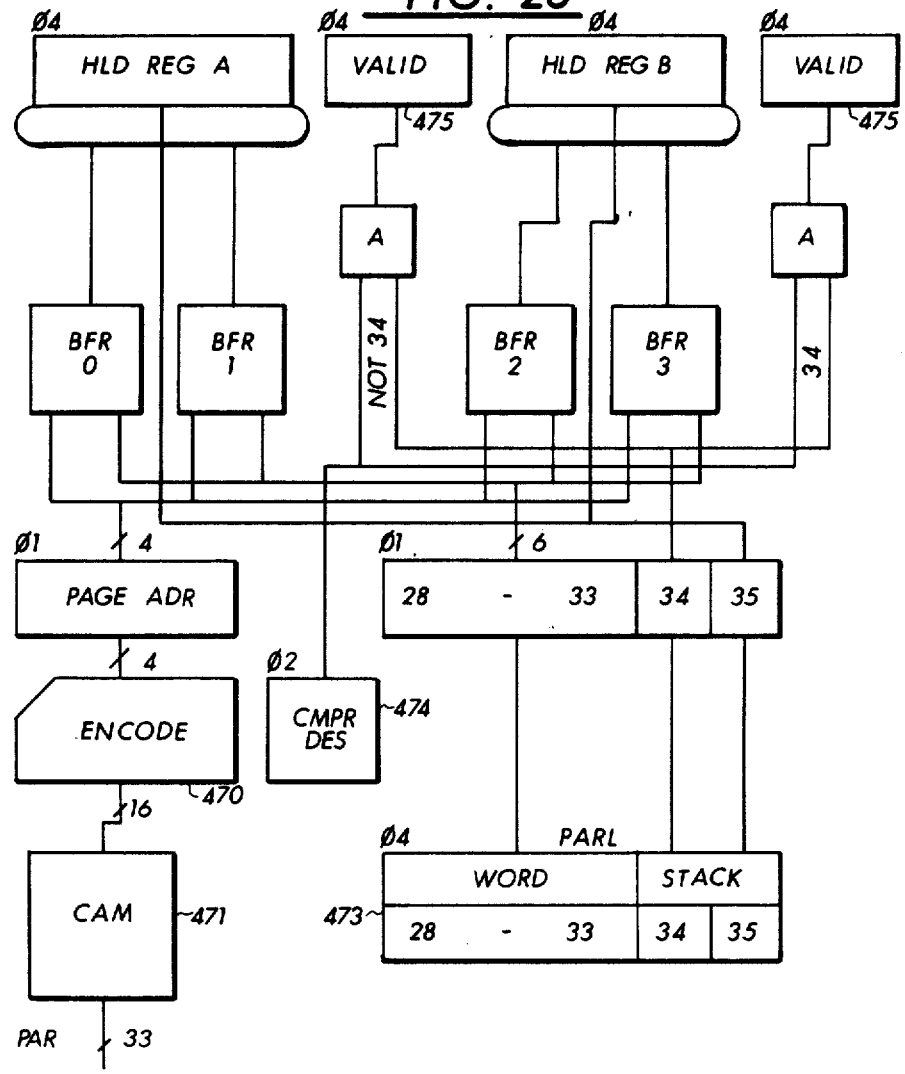
FIG. 22 is a pictorial diagram illustrating the 36 bit Virtual Address format used to reference the IFB portion of the Instruction Flow section of the SP.

A discussion of the operation will be given next. If a Virtual Address (VA) is being used throughout the addressing section or buffer section, it is the 36-bit Virtual Address that is used for Instruction Buffer reference. A format of this address is shown in FIG. 22. The upper 18 bits are called the Segment Address. These are bits 0 through 17. Bits 18 and 19 are always 0, and there is a detection apparatus associated with these bits. If either bit or both become 1 an External Interrupt will be generated. Bits 20 through 27 are the Page Address and they are the bits that are being compared constantly to see if there are still referencing the same page. The Word Address is bits 28 through 33, and these are the bits that are directly transferred to the Buffer Address Register. Bits 34 and 35 are the Buffer Stack Address and they determine which buffer is going to be physically used, since there are four buffers, 0, 1, 2, and 3. Buffer 0 contains word 0; buffer one contains word 1; and so on.

FIG. 23 illustrates the referencing operation of the Instruction Buffer. The Encode 470 logic will encode 16 outputs from the CAM 471 into four bits and, of course, the one that is generated at the time will be the one that will encode into four bits and will represent the page address of the buffer. The buffers are numbered BFR 0, BFR 1, BFR 2, and BFR 3 and represent the word in the buffer. The Word Addresses come from the Program Address Register Lower (PARL) 473 and includes bits 28 through 33. The Stack is represented by bits 34 and 35. The operation starts with a look at the Compare Designator (CMPR DES) 474. If the Compare Designator is set and if, for example, word 2 is being selected, then bit 34 is set, since the Compare Designator 474 with bit 34 represent the Enable signal for the validity bit (Valid 475). Then it would go to the Next Instruction Register and the next instruction is issued.

Figure 24:
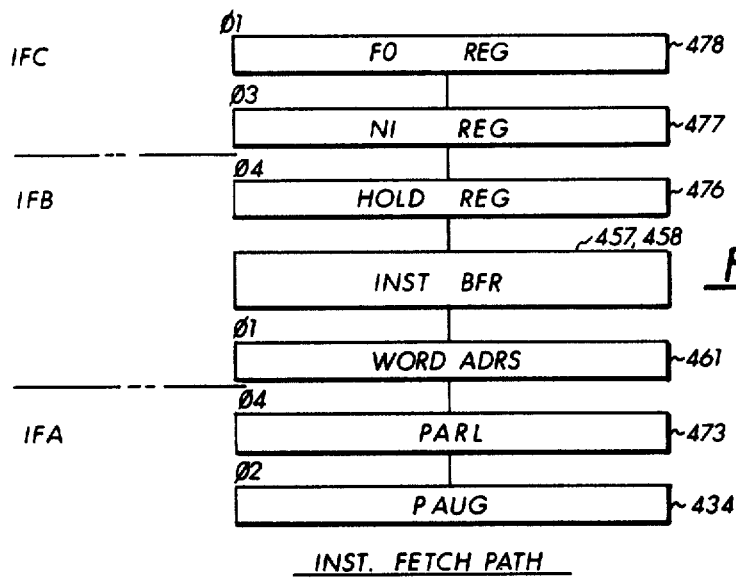
FIG. 24 is a simplified block diagram of the Instruction Fetch path through the IFA, IFB and IFC portions of the Instruction Flow section.

FIG. 24 illustrates the instruction fetch path. Starting with the P Augend Register 434, next go to the Program Address Register Lower 473, that is the Instruction Buffer Word Address 461 of IFA. The Instruction Buffer 457, 458 itself IFB is next, and is where the instruction first appears in the Hold Register 476. From here the instruction goes to Next Instruction Register 477 then to the add F0 Register 478 where it is issued into execution.

Figure 25:
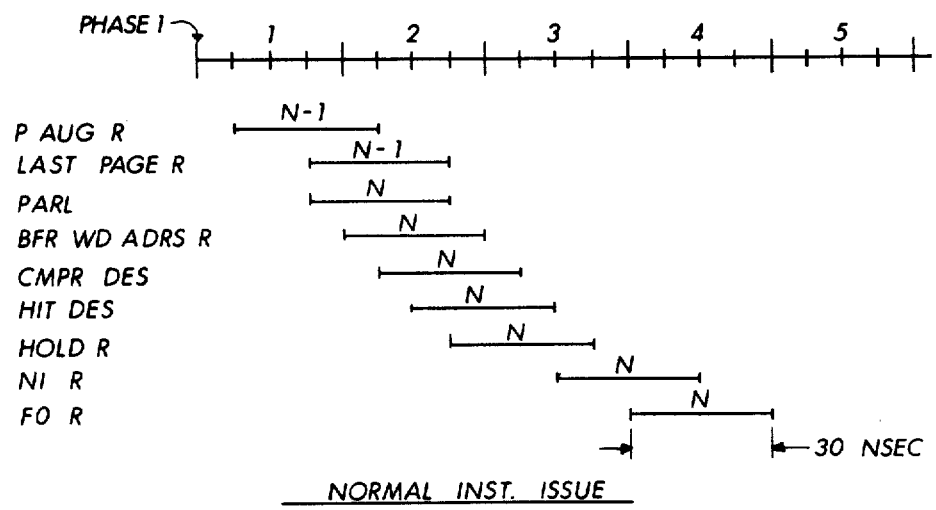
FIG. 25 is the timing diagram used for the normal issuance of an instruction.

The same sequence as in the diagram of FIG. 24 is shown by the timing diagram of FIG. 25. Starting with the P Augend Register, with an address which is N−1 in this case, on phases 2, 3 and 4 the contents of P Augend Register are being transferred into Last Page Register. On the same phase the P Augend plus 1 is transferred into Program Address Register (PAR). One phase later, on phase 1 of the next clock cycle, this address is transferred to the Buffer Word Address Register. But note that on phase 2 a comparison is being done and bits 22 through 27 of the Program Address Register are being registered. Bits 20 to 27 of the Last Page Address Register contains the final address. The instruction waits in the Hold Register at this time. Since the Compare Designator is set, the Validity bit is also going to be set and the instruction proceeds into the Next Instruction Register and from the F0 Register into execution. Each of these cycles represented here is 30 nanoseconds in duration. There are a number of sequences that control the address and Instruction Buffer. They include the New Address sequence, the Miss sequence, the Buffer Load sequence, the Loss sequence, the Buffer Load sequence, the Read/Write sequence, the Abort sequence, the Run sequence and the Jump sequence. All of these sequences except the Jump sequence have a separate timing chain noted herein as TC.

New address timing chain are initiated by the CB section and executed by the IFA section. At this time it brings in the new address for either New Tasks or Internal eEternal Interrupts. These could be used for deceleration or acceleration as well as Load Addressing Jump or Jump to External Segment instructions. If the new address timing chain is used for the first time after the Interrupt Clear or Master Clear signals, it will automatically generate a Miss. If new address timing chain is not used after the Master Clear, it may be used a second or third time. This could be caused by an Internal or an External Interrupt. It then starts a timing chain. The Miss timing chain is initiated by the IFC/IFA Start Miss operation. The code of the Miss timing chain indicates that there was no match made in the CAM. When this happens a New Designator and a Miss Reading Designator is set which tells the Control section that Miss is pending. It is up to the Control section to make a decision as to whether or not a Miss or an Abort operation will be taken. Assuming, in this case, that the Miss is taken, then the timing chain is started. The Miss Address is in the Program Address Register where the Miss is the first to be recognized. Next, bits 28 through 35 of that address are cleared out because the AG section is not required by those bits. It places a Miss Address in the Output Register and it notifies the IFC that the address is ready. Next, it places Program Address Register bits 0 through 27 plus 4 parity bits plus a Validity bit into the CAM and places the PARL into the Jump Augend Register in preparation for the buffer load, which will follow in this sequence.

While the CAM was being loaded it also read out the data from the CAM via the CAM Output Register and the parity was checked. If the parity is satisfactory it will continue, but if not, an interrupt is generated. The upper four bits, bits 0 through 3 of the buffer are on cards F6 and F7.

The next sequence to be followed is the Buffer Load sequence, which is initialized by an AG IFA Data Acknowledge Designator. Now it will load the Miss sequence in Buffer Load sequence. Everything is stopped and awaits the receipt of an Acknowledge by the AG section from the HPSU. Loading is started once the Acknowledge signals are generated. The loading start causes the address in the Jump Augend Register to be incremented by four (4) and sent to the PARL. This operation is repeated 64 times. On cycle 64, the AG 700 section comes up with the AG IFA last acknowledge signal and this signal will start an Acknowledge sequence. An End Buffer Load sequence places the P Augend Plus 0 into the PARL. The PARL augend contains the address of the Miss instruction. Also, this places the P Augend Register into the Last Page Register, allowing the Page Compare sequence to be initiated. An Abort sequence is initiated by the IFC section by sending two IFA Abort signals. The contents of the P Augend Register Plus 0 is the placed into the Program Address Register.

(6) Jump Sequence

Figure 26:
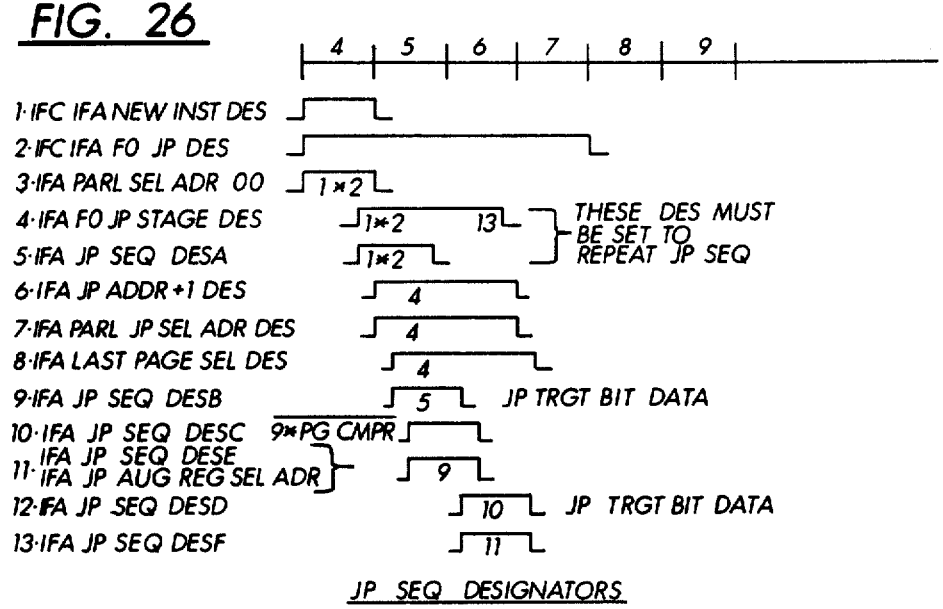
FIG. 26 is another timing diagram used in the IF section showing the Jump Sequence designators.

FIG. 26 is a timing diagram of the Jump sequence. It starts with a clock cycle 4, because it takes about three cycles for the P Augend to get to the Function Register (F0). The Jump instruction first appears in the F0 Register at the time that the Jump sequence is about to start. The IFC IFA New Instruction Designator tells the IFA section that a New Instruction is starting. The next signal IFC IFA F0 Jump Designator tells the IFA section that it is a Jump instruction. The numbers shown inside the clock cycles represent the numbers that appear on the left of the figure, and represent the signal that generates that pulse. For example, the first one is IFA PARL select address 00 and inside the pulse are written 1 and 2. This is the add condition of IFA IFC, IFC IFA New Instruction Designator and IFC IFA F0 Jump Designator, that causes this pulse to occur. Also on the right side there is a note that says these designators must be set to repeat the Jump sequence.

There is also a Last Page Designator which designates a selection switch into the Last Page Address Register from the Jump Augend. Now the data bits 20 to 27 that are being put into Last Page Register are coming from Jump Augend instead of the P Augend Register. The Jump Sequence Designator B is also used as a Jump Target Bit Data, however, if Page Compare is not made on Jump Target Address, then that sequence is repeated for one more cycle. This is the same operation as a normal operation. The CAM is checked to see if the page is in the CAM. If it is, then the sequence continues.

The last Jump Sequence Designator is designator F, and corresponds to the Last Page Designator. When active, the rest of the designators are going to be cleared out, and the Jump sequence is completed.

Figure 27:
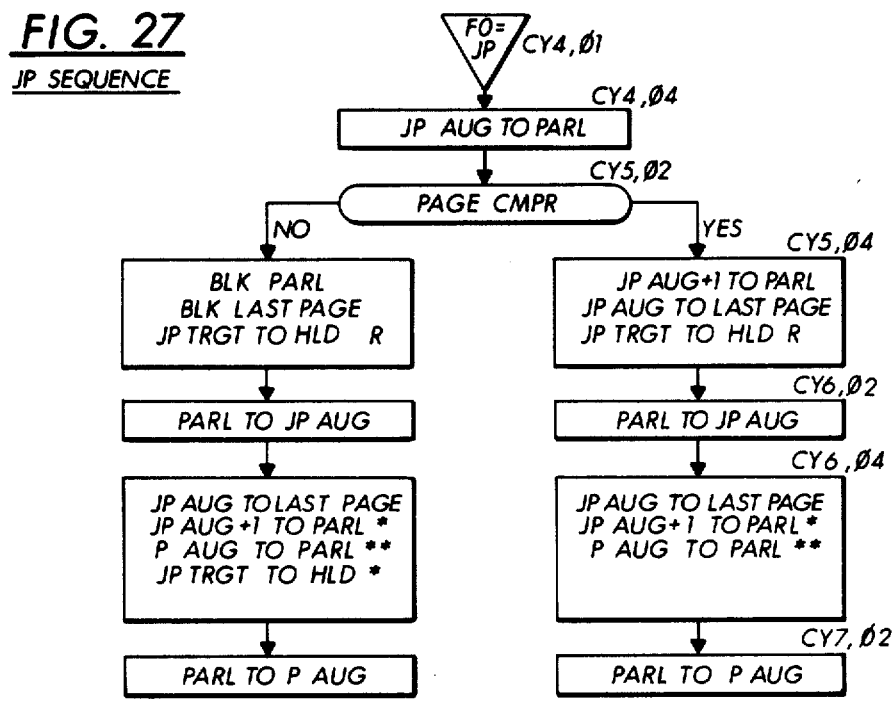
FIG. 27 is a flow chart showing the various steps taken during a Jump Sequence.

FIG. 27 is a flow chart of the Jump sequence. This flow chart corresponds to the timing chart of FIG. 26. On cycle 4, phase 1, F0 is equal to Jump instruction that starts the Jump sequence. After the Jump target Address is received in the Jump Augend Register it is transferred to the Program Address Register (PARL) and that occurs on cycle 4, phase 4. Next, the Page Comparison is done wherein bits 20 through 27 of the Jump Target Address in the Program Address Register is compared with the Last Page Address Register, which contains the address which it receives from the P Augend Register. The star (*) indicates that a Jump has been taken, and () indicates a Jump not taken. On Jump, the Jump Augend Plus 1 address is sent to PARL. If a Jump was not taken (), the P Augend is sent to the PARL. This makes it clear that a Jump is not to occur and the generation of jump addresses ceases. If the Jump is to be taken, then the contents of the Hold Register is transferred to the Next Instruction Register. However, as previously noted if a Jump is not taken then the Next Instruction Register will be transferred to the F Register.

In normal addressing, the difference between the "NO" path and the "YES" path is that in the "YES" path a Jump Augend Plus 1 to is sent to the PARL. Next, the Jump Augend is sent to the Last Page Register. The next step, where the Jump target is sent to the Hold Register, is the same for both the "YES" and the "NO" paths. If it is a valid jump target bit, then the Program Address Register Lower (PARL) is transferred to the Jump Augend and on cycle 6, phase 4, transfer the Jump Augend to the Last Page Register. A Jump Augend Plus 1 to Program Address Register is again the accomplished if Jump is taken, however, a P Augend to PARL is done if the Jump is not taken.

Figure 28:
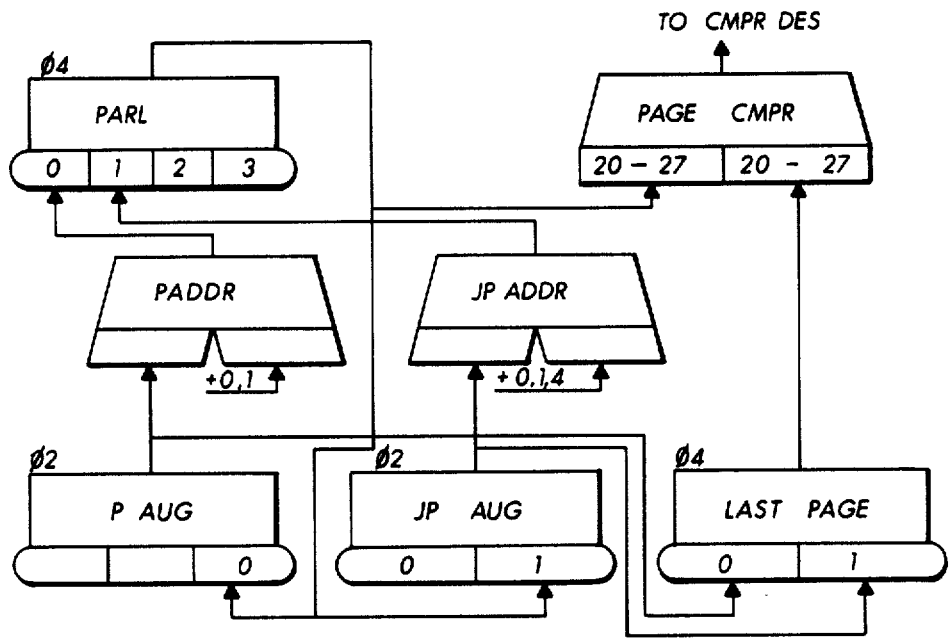
FIG. 28 is a logical block diagram corresponding to the flow chart illustrated in FIG. 27.

The block diagram shown in FIG. 28 shows the sequence of this page comparison. First, the selected P Augend input is sent to both the P Address Register and the Last Page Register. Similarly, the JP Augend is sent to both the JP Address and the Last Page Register. The PARL selects either the P Address or the JP Address to send to the Page Compare register. The Program Address Register (PARL) contents are compared with the contents of the Last Page Register received from the Jump and from the P Augend Register. If the comparison is made, we continue feeding single addresses until we have a Jump Target Address plus 2, which is then transferred into the P Augend Register and we proceed with normal program addressing. If comparison is not made, then we go to the CAM and if we find the address in the CAM, then we just skip one cycle and continue on. However, if it is not found in the CAM, a Miss indication is generated.

Figure 29:
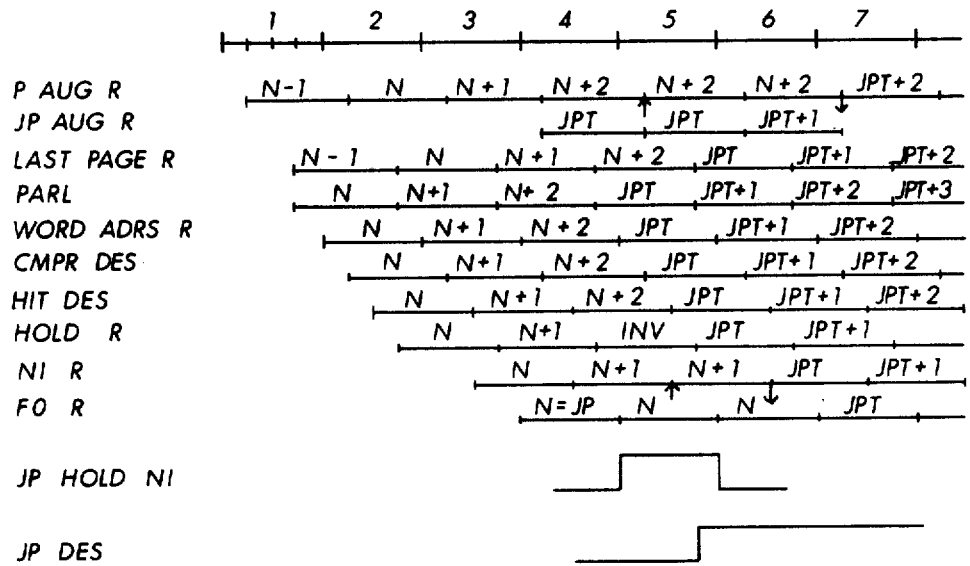
FIG. 29 is a timing diagram of the logical block diagram of FIG. 28 for three cycles when a jump is taken.
Figure 30:
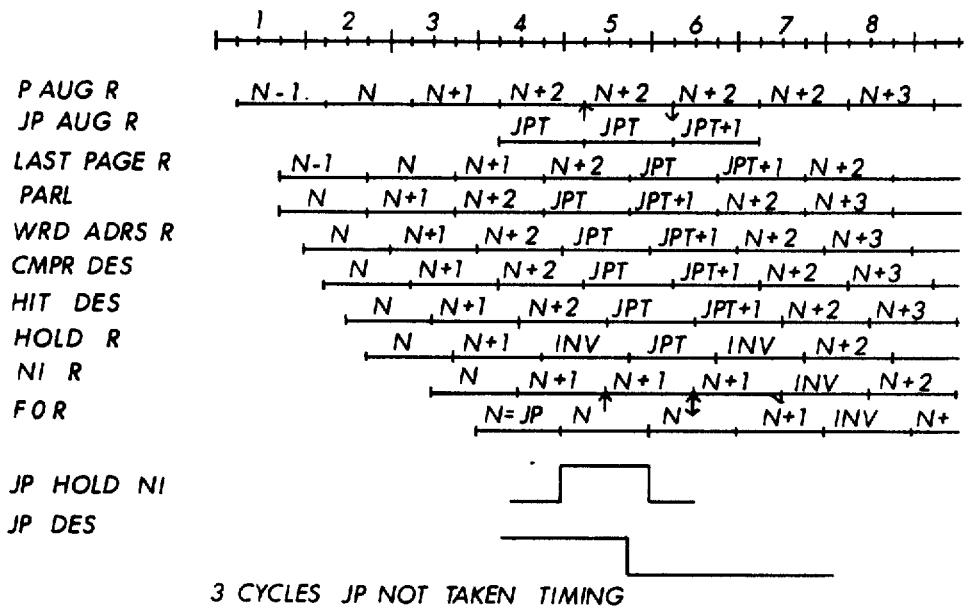
FIG. 30 is a timing diagram corresponding to that shown in FIG. 29 for the same three cycles when the jump is not taken.

Next is the timing diagram of FIG. 29 which illustrates the case where a Jump is taken. We start at cycle 1, phase 2, with the address N−1 in P Augend Register. The add address is transferred to a Page Register on phase 4 and N−1 address is transferred to Program Address Register and also to the Buffer Word Address Register. Then, the comparison is performed on phase 2 and we assume a compare has been made. The Hit designator is then set, and the register receives an instruction which is for the N address. it is called an instruction in this case. It proceeds to the Next Instruction Register and finally to the Function Register. If the instruction happens to be a Jump instruction it is issued. On the following phase 2, the Jump Target Address appears in the Jump Augend Register and it then proceeds to Program Address Register just as a normal instruction would respond to a normal address. Here it would remain for as long as necessary to make the decision for a Jump to be taken or not. Since the assumption was made that the Jump was taken the instruction proceeds into the Next Instruction Register and from there into the Function Register for issuance. Once it is known that the instruction was a Jump instruction, instead of putting in a Hold Register N+2, which could possibly generate a retry, we simply load that instruction, because the address N+2 is being saved in the P Augend Register.

Figure 31:
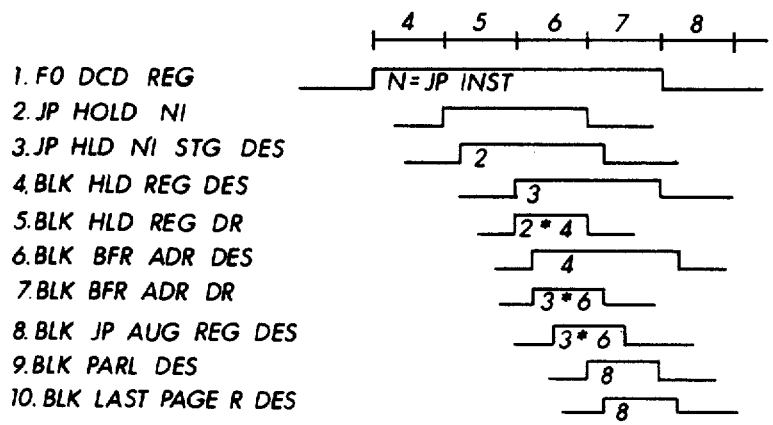
FIG. 31 is a further timing diagram showing designators which are being used for blocking registers for the jump instruction.

FIG. 31, illustrates the case where a Jump is not taken. Here again we start at the N−1 address in the P Augend Register and proceed to the Last Page Register and from there to the Program Address Register, the Word Address Register, the Compare Designator, the Bit Designator, the Hold Register, the Next Instruction Register, and finally, to the F0 Register, where the Jump instruction is issued. Here again there is a Jump Target Address in the Jump Augend Register. It is assumed that the Jump is going to be taken so a Jump Target Address is placed in Program Address Register where a decision is awaited. In this case, the decision is that the Jump is not taken, since the Jump Designator is shown going down. Since the Jump was not taken, the next (N+1) instruction, which was in Next Instruction Register, is preserved in the Next Instruction Register for one more cycle. The N+1 instruction is issued in the F0 Register and instead of putting the Jump Target N+1 in the Hold Register, since the instruction is not going to be taken, the location is invalidated. At the same time, instead of transferring the Jump Target N+2 instruction in Program Address Register as was done in previous timing diagram, the N+2 instruction, which is the next instruction, is executed after the N+1 instruction. That address is placed in Program Address Register and we continue down the line until the instruction is issued.

Consider the designators which are being used for the Blocking Registers for the Jump instruction as shown in the timing diagram of FIG. 31. Also shown are some designators that block the registers during the Jump sequence because it is not possible to pile up address upon address. Operation must await the Jump decision since it cannot be predicted. The minimal time for the Jump instruction is 3 cycles, which is 19 nanoseconds.

The maximum is not specified since it could be many cycles.

The F0 decode register comes with the jump instruction along with a control bit which indicates a Jump hold. This signal causes a block to be placed first in the next instruction. We can then set up a next instruction storage designator. The reasoning for the number inside the clock cycles are the same as before in that they represent the numbers in the left and correspond to a signal name that generates the shifting of that signal i.e. going up or down. First, the Jump Hold Next Instruction Designator is set and this is a result of Jump Hold 9 Designator. That causes the Block Hold Register Designator to go up, but that alone does not block the register, which requires a Jump Hold 9 and Block Hold Register Designator. It is the end condition that produces a block on the Hold Register in this case.

The Block Buffer Address Designator is needed for as a Block Hold Register Designator. Here again to block the buffer address word address on the buffer cards is noted as signal three (3) and signal six (6) which are Jump Hold Storage Designator and the Block Buffer Address Designator respectively. The subsequent one has the same inputs as the previous one. Finally, the last two have as their input the number eight (8), which is the Block Jump Augend Register Designator. This has been prepared for blocks of Jumps which are resolved in four cycles, since if it was for Jumps resolved in three cycles you would not see the single cycle block because they do not appear.

Figure 32:
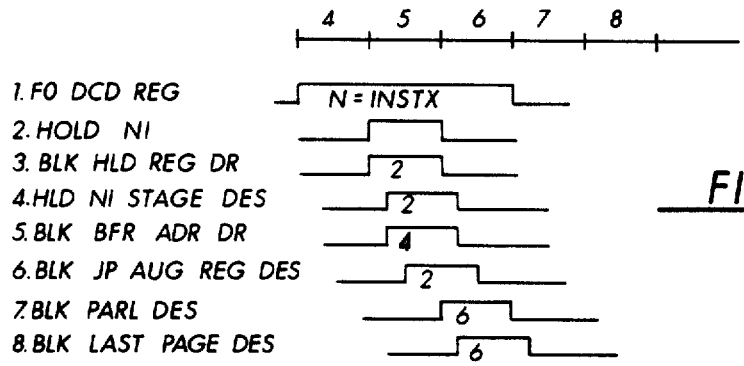
FIG. 32 is also a timing diagram which is practically identical to FIG. 31 except that the blocking starts one cycle sooner in this instance.

FIG. 32 is a timing diagram which is almost identical to FIG. 31 except that the blocking starts one cycle sooner, and is resolved in three cycles. It is started on cycle 4 and it goes to cycle 7, but here the N instruction is in the F0 Decode Register. The shifting of this signal from low to high indicates that the instruction is going to take longer then the usual one cycle, and the registers must be put in order, or it is necessary to start blocking them in order. This, of course, is the same as was described before, when blocking was done in a predetermined order.

(7) Functions

Let us consider next the operations peformed by the Instruction Flow section. The Instruction Flow (IF) issues instructions to the SPM and VPM. As a result, it has to resolve instruction issue conflicts. The IF also sequences the scalar instruction pipeline which includes the F0, the F1, and the F2 Registers. The IF also selects the scalar instruction operand source. In other words, it sets up the Selector Address Register. Other sources that are selected by the IF are the elements from the Vector Files, an operand from the High Performance Storage Unit (HPSU), an operand from the Local Store and an operand from the Data-in Buffer. So the IF determines whether to get the operand from the Data-in Buffer or directly from the HPSU interface. The IF also decodes instructions and it executes Jump instructions. It initiates the Interrupt process by determining when and how the Control Block detects an interrupt. Once an Interrupt is detected, the IF ceases issuing instructions and waits for all of the issued instructions to complete their operation. It then causes the CB to proceed with the Interrupts. Lastly it controls the starting and stopping of instruction execution. These are commands arriving from the SSP or the panel/maintenance operations.

(8) Partitioning

The partitioning of the IF is broken down into three sections as previously noted. The Addressing section or the IFA; the Buffer section, or IFB, where the instructions are held; and the Control and Decode section, the IFC. Primarily, the IFC section will be discussed.

Figure 33:
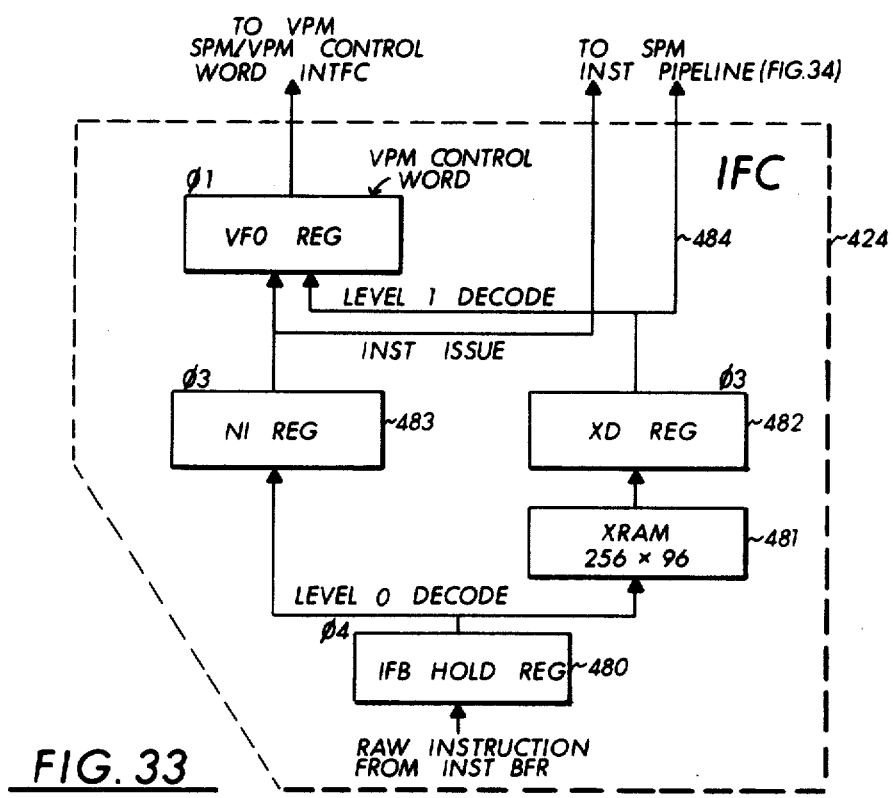
FIG. 33 is a logical block diagram illustrating the path of a raw instruction from the IFB to the VPM and the SPM via the translate RAM.

Consider first, a general overview of the IFC section as shown in FIG. 33. When the raw instruction is read from the Instruction Buffer it is clocked into the IFB Hold Register 480 where the first level of encode is started. This is called the Level 0 decode. An address is generated by a map gate array. This array is called the translate RAM (X RAM) 481 map gate array. The X RAM is addressed and produces 96 bits of information. Twelve of these 96 bits are parity bits. The remaining bits are clocked into the Translate Decode Register (XD REG) 482 as shown in FIG. 33. A raw copy of the instruction is in the Next Instruction Register (NI REG) 483. At this point, the instruction is at Level 1 decode and it must be determined whether to issue the instruction to the Vector Processor Module or to the Scalar Processor Module. If the SPM is selected, the instruction enters the Scalar Processor Module (SPM) pipeline 484. The SPM instruction pipeline is shown in FIG. 34, and starts with the F0 Instruction Register 485, and the F0 Decode Register 485a. When a Level 1 decode instruction is received, the Raw Instruction (RAW INST) is carried along because it is necessary to continue decoding the instruction at the different levels. The Level 2 Decode 486 is started and at this level it is determined where to issue the instruction, that is, whether to issue it to the SP section, the LC section or the CB section. At the F0 level it is also determined if an operand is going to be fetched from the HPSU, or possibly an address translation (AG) is needed. Level 3 Decode 487 is continued and the instruction is dispatched to a F2 Register 488 which all sections have. This is where the actual execution of the instruction takes place, that is in the SPM instruction pipeline. The Level 4 Decode 489 and the F3 Register 490 are internal controls for the IF and they are, of course, in the IF section and are necessary to finish the execution of non-overlapped instructions.

(9) Operation Control

The IF operation control looks at it and how it determines the order of things that must be done. FIG. 35 and FIG. 36 together are a flow chart of events and sequences that occur. IF may have to initiate a Buffer Miss (BUF MISS), or an Interrupt (INT) process, or it may have to stop the machine. First, then, IF determines whether it has an Interrupt (INT) pending or not. If there is an Interrupt pending, the Y path is taken and it determines if there is a Buffer Miss (BUF MISS) outstanding. If there is a BUF MISS outstanding it Aborts that Buffer Miss (ABORT MISS). In other words, it starts the Interrupt process. If the Last Instruction that was executed was a Jump Taken (LAST INST JUMP TAKEN), the Y path is taken and the Return Address (RETURN ADRS=PAR) is the Target Address. In other words, the Return Address is now equal to the PAR. If the Jump was not taken, the N path is taken and the Return Address is PAR plus 1. Now this is for deceleration information or if an Internal Interrupt is to be recognized and it is desired to return to the main line code. If an External Interrupt (EXT INT) is received, the Initiate Macro Code Load is initiated for deceleration. However, if it is an Internal Interrupt, SP transfers the contents of S8 to a Program Address Register (S8 TO PAR), and the Fetch First Instruction is issued. Now referring to FIG. 36, the interconnection with FIG. 35 is points A, B and C. This interconnection forms a continual loop, and the IF is actually in this loop looking all of the time.

At a point after the Macro Code has been loaded an External Interrupt is done. Consider next whether the machine is actually going to stop or if there is an SSP command for the machine to Halt (MACHINE STOP). If not, the N path is taken to go to the next instruction when issued, or the next event is started, whatever the case may be. (see block 491) If it is an Internal Interrupt (the B input) IF checks if there is a Buffer Miss (BUFR MISS), and if so the Y path causes the Initiate Buffer Load, and after initiation, waits for its completion. If the machine is going to Stop, or if it has been commanded to Stop while the buffer was being loaded, of course, the same process is repeated. If the machine has not been commanded to Stop, the next instruction is started and returned to point C.

A general overview of the XRAM 481 will now be given with reference to FIG. 37, where the IFB Hold Register 480 has just received the wrong instruction with a 7 bit OP code entering the XRAM Map Gate Array 492. The OP code is looked at and is mapped directly into the XRAM. Now if this were a valid instruction in the IFB Hold Register 480, then the contents of the XRAM is clocked into the SP Register. However, if it is not a valid instruction, then 0's are clocked in until a valid instruction enters the IFB Hold Register. Now this either means that we have an Instruction Buffer Miss or have just ordered a Jump instruction which was not taken. In this machine it creates a gap, or places an invalid instruction in the pipeline. Now the XRAM is loaded at initialization time by the SSP and it is never altered during actual execution by the machine.

Figure 39:
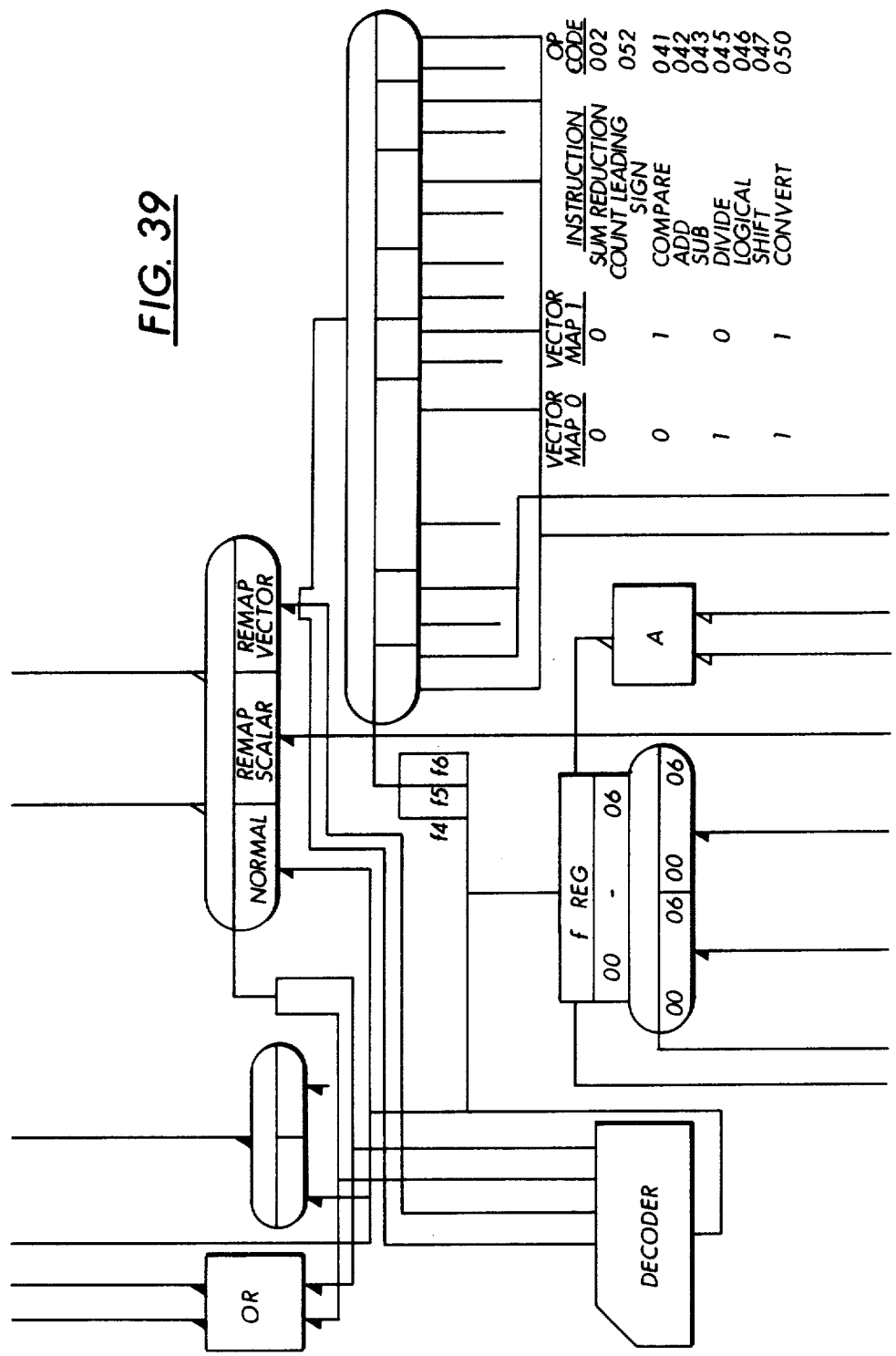
FIG. 39 illustrates a logical block diagram of the SP Control via the XRAM Map gate array.

Basically the XRAM 481 is divided into four sections as shown in FIG. 38. The upper two portions are used if it is desired to use remapped instructions. In other words we go into address 200 and above. If it is desired to use a directly mapped instruction the lower half of the XRAM is used. Directly mapped vector instructions occupy the bottom portion of the XRAM while Scalar instructions occupy the next quadrant. The third quadrant is the remapped vector instructions and there are nine instructions that are mapped and they utilize 58 locations in this quadrant. In the remapped Scalar instruction there are two instructions that are remapped, a move and move negative and all 64 locations are used. The XRAM map gate array is shown as a logic block diagram in FIG. 39.

FIG. 40 is a simplified block diagram showing pictorially the contents of a remapped memory containing the remapped Vector instructions, and FIG. 41 is a table showing the addresses of the remapped Vector instructions. These converted addresses are the result of the translation of the RAM addresses and the generation of the converted addresses by the XRAM Map Gate Array. The Map Gate Array, as previously noted, is shown as a logical block diagram in FIG. 39.

Now look at the interface timing signals illustrated in FIG. 42 between the IF and the Vector Processor Module.

These signals are represented as a timing diagram in FIG. 42. The clock cycles are the top line and they start at phase 1 of clock cycle 1. Each clock cycle has a phase 1 to a phase 4 and then another clock cycle is started on phase 1. One line from the bottom is the IFC VFO Register and it is loaded with the Vector Control word and the issue line is raised as denoted by the filled in square and the Vector Control section clocks it into the receive register if it is available. In other words if there is not a previous instruction being held in there for some reason, it responds immediately with the fact that it has received the instruction by sending back a VC IFC Instruction Receive Designator which is shown on the second line. Now the IF can issue instruction to the vector side at a 30 nanosecond rate. That is, it can fill the pipeline at a 30 nanosecond rate. However, the VC can dispatch these control words at a 60 nanosecond rate. Within the IF there is a designator that detects when that interface becomes busy shown at line 3 of the FIG. 42 and keeps the VFO from being clocked during a period of time until the VC has time to dispatch the control word that it currently has in its Vector Control instruction register. Another condition that can occur during instruction issue time is the entry into a VP issue wait condition. Consider that a vector instruction is issued to the vector side and some conditions are not valid or some values or parameters that are needed by that vector instruction to execute are not valid. If VFO is available, the instruction will be clocked into VFO and the IF will enter the VP issue wait condition. In other words, it will start its VP issue wait timing chain and that timing chain will remain running, holding that control word in VFO until that condition is resolved and then the issue line is raised to the vector side issuing that instruction. Now if the next instruction to Scalar it will continue issuing instructions to the Scalar side, however, if the next instruction is a Vector instruction or a dual module instruction, of course, that instruction is going to be stopped in the NI register and held there in the VP issue wait condition is resolved in the VFO. The VP issue wait conditions will now be described.

As was noted before, a Vector Control word is held in VFO until a condition is resolved and then the issue is raised to the Vector Processor Module. VP issue wait conditions are dependent upon the instruction type, vector instructions, for example, if the L count is not valid and they are using an Element Count (LCNT), or a Next Element count (NLCNT), then they will not issue. But it is possible to go into a VP issue wait condition if the F0 is available. Alt count is another case of a Reduction instruction in progress. If there is a Reduction instruction running in the machine and another instruction is available to be issued, then issue of that Reduction instruction is held up until the first one finishes.

Generally speaking, then the validity of the various parameters in the machine are monitored so that the IF can quickly determine whether to issue the instruction or not.

Additional instruction issue control designators are the mask designators. There is a mask vector busy designator which says that the mask (MK) is being read by some vector instruction or that some pipe is using the mask. The IF sets this when it issues the vector instruction and the MK clears this designator when the pipe is finished with the mask. When a move instruction is issued that sources the mask, the mask is set through the source busy designator.

Figure 45:
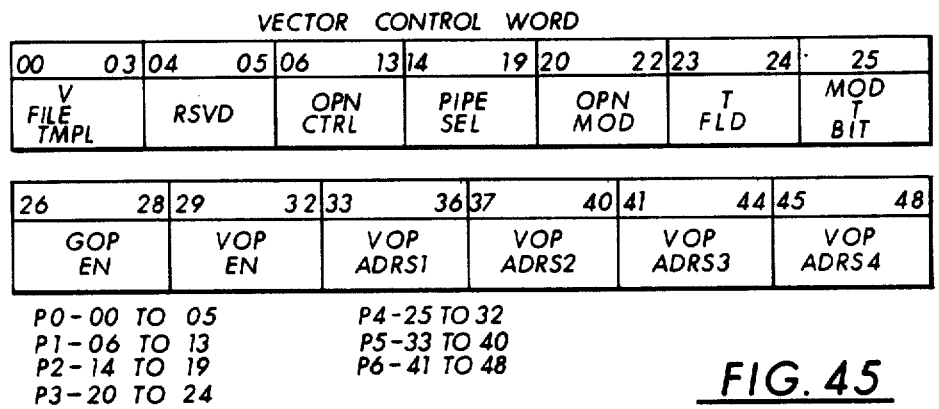
FIG. 45 is a pictorial diagram illustrating the format of a Vector Control Word.

Next, FIG. 45 is the format of the Vector Control word. There are bits 0 through 48 and we have 13 fields, 7 parity bits, and this shows each parity bit and which field it covers. First we will talk about the Vector File template. The Vector File template is in the translate RAM which leads directly out of the translate RAM and is carried along with the instruction. It is clocked into the VFO register and issued to the Vector side. Now the Vector File template is used by Vector Control to determine if there is a time slot available on the Vector File wheel. Bits 4 and 5 are the two reserve bits RSVD. Next is the operation control field. This includes bits 6 through 13 and depending upon the pipe select field and whether it is a load or store or RR format, it determines the use and the meaning of this field. Now if it is an add, a Multiplier or a Move Pipe it has a control store starting address. If it is a load pipe, bits 0 through 4 are not used, and bit 5 is only set by the Vector Control Module. Now if it is a Vector Load, bit 6 will be set and if it is an alternate Vector Load then bit 7 will be set. So this identifies the load operation. RR format bit 0 is set if it is a Scalar move, but if the RR format instruction requires a source element count or element pointer, then bit 1 is set. If it is a destination element pointer, bit 2 is set, while bit 3 is set if the source element is forced to zero. These bits are used in a move instruction.

The next field in the Vector Control word is the pipe select field which includes bits 14 through 19 of the Vector Control word format. This is a master bit field of 6 bits. Bit 0 of this field is set to select the Add Pipe and bit 1 is set to select the Multiply Pipe. The Move Pipe is selected by setting bit 2, while bit 3 and bit 4 correspond to the Load Pipe and the Store Pipe, with bit 5, the RR format pipe. Next, refer to the three bit operations modifier field. A value of 0 in this field indicates an absence of modification in the instructions. A value of 1 is reserved and a value of 2 indicates that the instruction is a generate index vector.

The next field in the format of the Vector Control word is the 2 bit T field, bits 23 and 24. In this 2 bit field a binary integer 00 means a single precision operation integer, 01 double precision; integer 10 a single precision floating point; and finally integer 11 indicates a double precision floating point operation. These bits come directly from bits 8 and 9 of the instruction for Vector instructions. If it is a Scalar instruction with an RR format for a dual module instruction, bit 23 is the source t bit and bit 24 is the destination t bit.

The next field is the modified t bit which is bit 25 of the Vector Control word. This defines to the pipe how the received element count should be treated i.e. whether as a double precision number of not. For example, a double precision vector multiply integer is treated as a single precision operation and the results produced are single precision. Next consider the G op enable bits 26 through 28 in the Vector Control. The setting of a G op enable bit specifies that the vector instruction has selected a G register. This is referred to as a broadcast G register. It is a group of Vector File elements. This group is either 32 or 64 elements depending on the operation of a single or double precision operation. The G op 1 enable bit specifies that op 1 is a G register which gets its add and its operand from an AG register. It gets its element counts from a G register.

Next, is the V op enable field which includes bits 29 through 32. This is a four bit field which provides an address which points to the Vector File.

Figure 44:
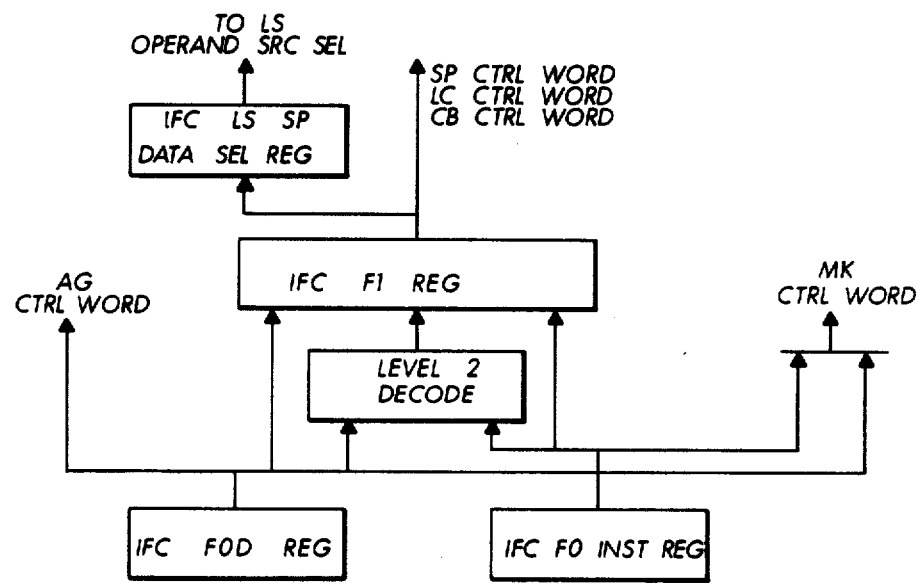
FIG. 44 is a logical block diagram showing the sequence necessary to accomplish a level 2 decode operation of the IFC control information.
Figure 46:
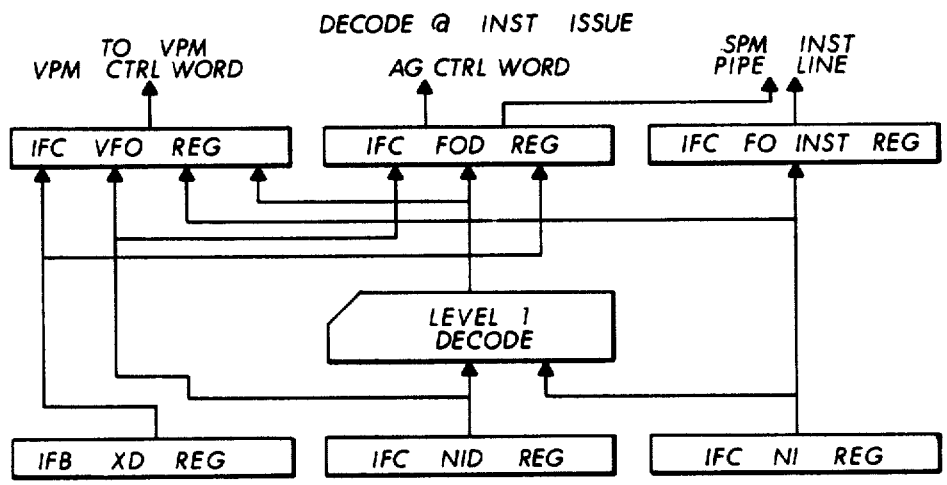
FIG. 46 is a logical block diagram of a level 1 decode operation at the issuance of an instruction.
Figure 47:
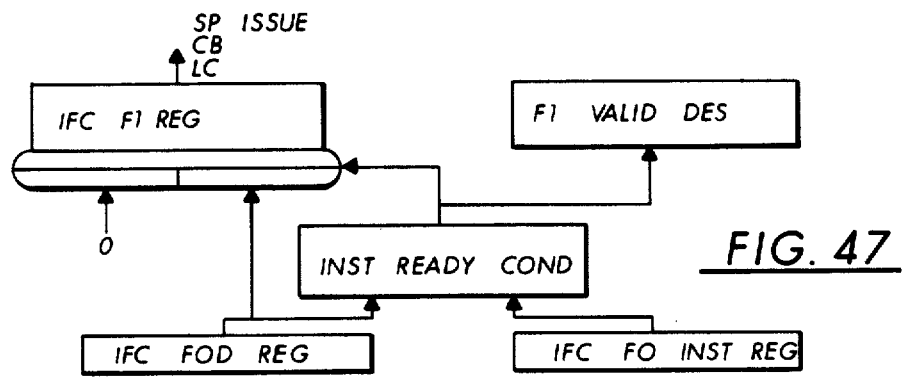
FIG. 47 is a logical block diagram illustrating instruction ready conditions in the IF section.

The Scalar instruction pipeline will be discussed next. As shown in FIG. 46 the Level 1 decoder goes into the IFC FO D register and that comes from the Next Instruction Decoder (NID) register and from the IFB XD register. From the IFC FO D register, the Address Generation control word information is issued. The only place that this is sent is to the Address Generation section of the SPM. The reason for this is to initiate operand fetches as quickly as possible because that is the longest time throughout the HPSU to read back an operand. Also requested is an address operation, so the AG section has to go through and translate the address if address translation is required. The next thing to be done at this level is to do a level 2 decode as shown in FIG. 44. At this point the control words are generated for the Scalar Processor logic section and for the Loop Control logic section and for the Control Block logic section. Also generated at the F1 time is the Local Store information or the operands source selection. Now this F1 register is a phase 3 latch, while the IFC LS SP data select register latch is a phase 4 latch.

Figure 43:
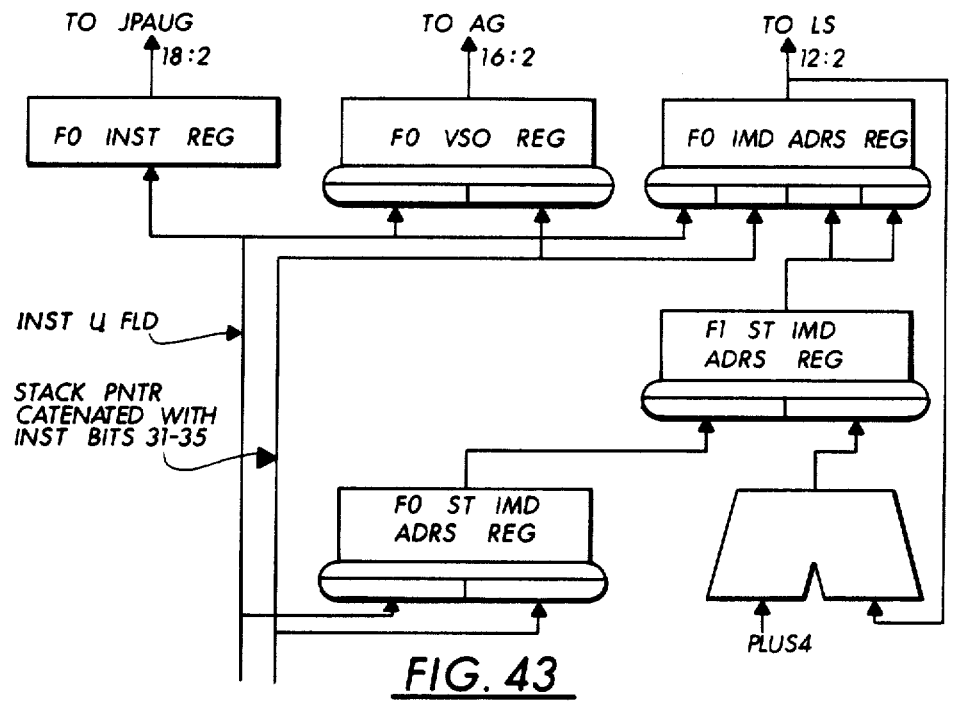
FIG. 43 is a logical block diagram illustrating the distribution of the addressing and offset information for jump instructions.

FIG. 43 illustrates the distribution of addressing information and offset information for jump instructions. The FO instruction register is where bits 19 through 35 of the instructions are transferred to the jump augend which is in the IFA. A total of eighteen (18) bits are transferred with two bits of parity and that goes directly over to F4. That is considered in many cases to be the U field of the instruction. Now basically in the virtual segment offset (VSO) register 16 bits of information are captured and two bits of parity are transferred to the AG section with the virtual set and the offset. Depending upon whether the instruction is in the RS format and if B is equal to 0 through 14, the U field is then transferred. However, if it is an RS format and B is equal to 15, the stack pointer is taken to generate the virtual segment offset. Basically the stack pointer is 11 bits and this together with four bits of the instruction (bits 31 to 35) are used to generate the virtual segment offset. Also generated is the FO immediate (IMD) address register and that is for the Local Store address. Note here that correct addressing is often referred to herein as immediate addressing. This information is held at S0 time for any store immediate instruction. Now this store immediate address is held in the F0 and when the store media transfers into F1, the F1 level of the instruction pipelines it. This address is then transferred in the F1 store immediate address register and finally the address is returned to the F0 address register and then is sent to the Local Store.

Address Generation control word will now be discussed. This control word is 22 bits in the FOD including its issue signal. The rest of AG control word, bits 22-23 is at the F2 level and it is 11 bits long. Now this information is R register update and invalidate information. Of course storage operations are initiated at the F0 level so the operand is returned to Scalar as quickly as possible. The first bit is the issue line which is a 30 nanosecond pulse that tells the AG that a valid control word is sent. Now, if the next bit is set it says that an instruction buffer miss has been detected and the IFC has issued all valid instructions of the pipeline. In other words, the pipeline has been flushed and the addressing section of IF has made a buffer miss request to the IFC. The IFC notes its presence and has no more valid instructions. From this it knows that there is a buffer miss available. The IFA then starts the buffer miss by getting the address ready for the AG. It is now time to do the miss request. The IFC then issues to the AG when the instruction page mis request bit is set in the control word. Bit 9, which is the generate address bit is also set.

The next bit is the AST load. Now the activity segment table in the AG contains the information necessary to translate virtual addresses into real addresses. This bit is really used at acceleration time. Thus, it is used when an acceleration signal loads the AST table into the AG. In other words, at acceleration time the LS is brought in and placed in the AST table. Now the AST table has 32 inquiries and it is four words per inquiry. The load break point bit is set when it is desired to load the break pointer register in the AG. In this way, the AG takes a virtual address and translates it into a real address. It then puts that in the Break Point register, so that an operand break point operation may be done. Bit four of the AG control word is a bit that indicates that this is a accelerate or a decellerate instruction. There are six (6) instructions that have been defined and are used in the macro code for acceleration and deceleration, and this bit will be up for each one of those instructions. Bit 6 will be set for any store instruction and that includes any Vector or Scalar store instruction. The next bit is the multi request bit and it is set for Vector format instructions or for load or store G multiples or loader store Loop Control. Single requests are Scalar requests for a load G or store G. External immediate address, bit 08, says that it is an RS format with B equal to 0 or 15 and the address is greater than 4096. This is the external Local Store segment which is in the HPSU. The generate address bit 9 is set at any time that it is necessary to generate a real address from a virtual address. When the U field offset bit 10 is set, it specifies that there is a U field offset that must be added to the real address when it is generated. The mailbox address, bit 11, for acceleration/deceleration purposes selects a mail box address so that the mail box may be addressed when the machine is being accelerated or decelerated. The last R (real) address bit 12 is again used for acceleration/deceleration and it is used to denote a continuous operation. This is used when a Local Store operation is being stripped as in a Vector operation. It orders the use of a G register with a last address that was stored in the address register rather than the given starting address. Bit 13 is a t bit from the instruction that indicates whether it is single or double precision operation. The next bit is the J bit or the set and clear bit. The operation modifier field includes bits 15–17 which together provide 8 codes. If the code is 000 it is normal; if it is 001 it is an index, a 010 (2) is an alternate, if an 011 (3) it is never used, if a 100 (4) then it is a Vector Store broadcast operation, where a G register is taken and written as a number of element counts into the HPSU. If it is a multiple operation, a load is indicated by the code 101 or store a G multiple or load a store Loop Control. A 110 code is a 6 and it is a test or set instruction and if it is a 111 a diagnose read or store instruction is specified.

The next four bits are bits 18–21 and they are the real address registers which are shadows of the t registers. Now if a G register, which has a virtual address in it, has been once translated then the information is stored away and the real address register and a real address register bit is set indicating that this is a valid real address. Each time a request is made to an AG, the real address is taken out of the control word and the real address register is checked to see if it is valid. If it is, it says that it is not necessary to search through the AST until the virtual address is resolved. This speeds up the performance of the machine. Bit 22 comes from the F2 register level and it says that an R register should be invalidated and the address is contained in bits 23 through 26. So the R register update enable bit will be set and whether an add or a subtraction is made to it, that bit will be set and then the update address will be in bits 29 through 32, and that is how the R register is controlled in the Address Generation section.

Figure 48:
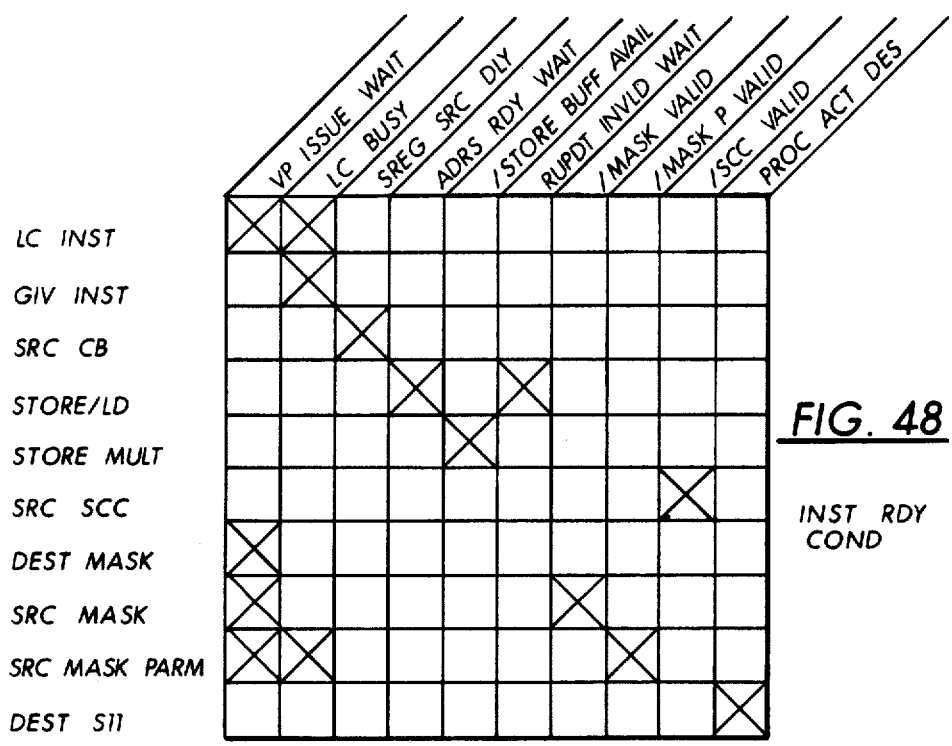
FIG. 48 is a table corresponding to the FIG. 47 which indicates in tabular form the instruction ready conditions.

Next, consider FIG. 48 which is a table illustrating instruction ready conditions in the IF section. They will hold the instruction in F0 and will not allow it to go into F1 or the control word. First a word about the control word instruction. They are actually interchangeable at this point in the instruction pipeline of the SPM. If there is a Loop Control instruction or if the LC is busy and we are in a VP issue wait, this will keep the instruction ready condition from coming up. These conditions are marked as crosses in the table of FIG. 48. In other words, the LC is currently executing an instruction that has just been issued to it, and the LC busy timing chain in the IF is running. The next control word cannot be dispatched to the LC until the LC is no longer busy. The next instruction noted in the table is the GIV instruction. If LC is busy, the GIV instruction requires a link parameter. So it is assumed that the length is being changed from the GIV and it is held in the F0 instruction until the LC becomes available and then the instruction is allowed to be clocked into the F1 register and F1 becomes valid at that point. With the source (SRC) CB, instruction we have what is called an S register source delay. If we have just destinated an S register in the CB we cannot immediately source any of the S registers in CB for one full cycle. This is due to an address conflict. The address ready wait signal is a one that comes back from the AG. It tells us that the address has been resolved. In other words, an address was translated during address translation, so issue is delayed or the instruction is held from going into the F1, until the address translation has occurred. The next conflict is an R register update and invalidates wait. There are registers in the address generation that are copies of the G register in the SP. If there is an invalidate or an update going on, the instruction cannot be allowed to become valid until the update and invalidate are finished. The next instruction is the store multiples, in other words, the store Loop Control or store G multiples. The Store Buffer must be available before these instructions can proceed into the F1. They could be held up by the Store Vector that is actually occupying the Store Buffer and they must wait until that Store Vector has finished before they can actually be involved in the store Loop Control or in the storing of the multiples to proceed. The next instruction is one that sources the Scalar condition code. In the IF there is a single designator that tells us whether these code bits are valid or not. These bit designators clear when an instruction is issued that is destinating the Scalar condition codes. It is set when the information is written into the Scalar condition code bits. It then sets the SCC valid designator in IF. When the source mask parameters are used as a source, there are cases where the length is needed in order to determine these source mask parameters and also to determine if the mask parameters are valid. The last instruction is the destinate S11 or a move designator 11. If the processor is acting it is not possible to destinate S11 and this is the mask register for internal interrupts which places the machine into a slow or a fast mode. So once a move is made to S11 the instruction waits until the processor is available and then the instruction proceeds.

Next, the contents of the Scalar Processor control word will be reviewed. The first bit or signal in the Scalar Processor control word is the issue line. This bit is set to indicate that a valid control word for the SP is in F1. The next bit is the RR format bit and this specifies that there is an RR format instruction in F1. The integer addend group bit specifies that the instruction has logical compare shift addend integers, subtract integers or divide integers, and since it is an instruction for the integer ALU it requires two operands. The next bit (3) is a floating addend group and it has the same meaning as the integer addend group except that it means that there are two operands required for the multiply, the add floating point, the subtract floating point, or the divide floating point. The next 18 bits (4–21) are instruction select bits. They are the master bitted field of the instruction that is actually being executed for the SP. In other words it is an add, a subtract, a multiply or a divide instruction. The next bit (22) is the test bit, and this specifies that a test instruction is destinating the scalar condition code bits. Bit 23 is the multiple instruction. The bit 24 is a conditional jump bit and it indicates that an initial jump instruction is being executed. Bit 25 is the R update enable, it specifies that when the operand is retrieved an integer add or an integer subtract must be also transmitted to the Address Generation section so it can update its own R register. The next three bits 7–9 comprise the t bit field of the instruction and they identify the instruction type that is being executed for the instruction. The next two bits are bits 29 and 30 and they comprise the convert T3 field or the J bits for the GIV instruction. They identify the destination T field. Bit 31 identifies that it is a move negative, in other words, we are going to negate the sources operand in the move instruction. Bit 32 is the V to V transfer bit where S1 equals 7. The next group of bits comprise of bits 33–35 as a field which are the result bits. This field identifies where the results from the SP are going and they are sent. The next field comprises five bits 36–40). It is the operand wait field. It is a master bit field, and it describes the results of this group as well as their destinations. The next field includes bits 41–43 and is the jump select field. It is a C field conditional jump and it is forced to a code of 6 for an IJL increment or for a DJG decrement. This C field sets up the jump detect gate arrays in the integer ALU section or the SP section and it specifies the condition that is being tested for on the conditional jump. Now the bit 44 is a C field of conditional jump equal to 7. Bit 45 specifies that there is a G register that is required for address translation and must be read out in the G register stack and then sent over to the Address Generation section. The next four bits 46–49 comprise the G register address and these bits come out of the F0 level so if there is an address generation request to the G register stack, it takes priority over any operand request to the stack.

The next field is a 2 bit master bit field. It indicates the destination when the G register is being read. Bit 52 is the G1 address valid bit and it states that there is a G register address op 1 that is valid. The next four bits (53–56) are the actual G register address for the operand. Bit 57 is the G2 address valid bit. The same applies for the next four bits 58–61. These are the addresses of the G register containing operand 2 for that operation. Bits 62 and 63 are the write and the lower G register enable. Bit 62 is the write enable bit for the upper 36 bits of the G register and bit 63 is the lower enable for the lower 36 bits of the G register. The final four bits (64–67) are the addresses of the G register. This is the destination G register where the results are being written which results specify whether we want to write in the upper half or the lower half or both halves of the register simultaneously.

The next control word that will be discussed is the Control Block control word. As usual bit 1 is the issue line which says that there is a valid control word in F1 for a Control Block. Bit 2 is the enable scalar condition code designator. It enables scalar condition code bit and when this bit is active we are writing the scalar condition code for the compare instruction. The bit (2) says that a diagnose instruction is being executed. Bit 3 is the load address and jump bit. This bit is set for a load word address of jump instruction. The JSX bit 4 is next. This is the jump external segment instruction. Bit 5 is the GI macro instruction. Bit 6 is the LS pointer bit and it is set for an advance or retract local store. Whether an advance or a retraction operation is determined by the modifier bit, bit 7. Next is bit 8, which is the decode of the B field in the RS format instruction. It says that the B field is equal to 0. The bit 9 is the source enable bit. This specifies that a CB register has been selected as a source by the move instruction or the macro store. Keep in mind that the macro store has a special acceleration/deceleration instruction used in the macro code. Now the source select field comprises the next four bits (10–13). It specifies the register that is being sourced within the selected register set. Bit 14 is the destinate enable bit. This specifies that a Control Block register has been selected as the destination for a move or macro load. The destinate select bits 15–18 select the register that is to be written. It is a four bit field. Bits 19–21 comprise the register set select field. It specifies the set of registers that are being destinated or sourced and a value of 0 in this field says that the S registers are being selected.

The next field includes bits 22–24 and is a conditional C field. This is a C field out of the conditional jump instruction. It specifies the conditions that are needed to test the operand during a conditional jump. The interrupt control lines are shown by bits 25, 26. These are again used for acceleration/deceleration operations. The final 27 bit is a mask move bit. The Control Block data out register selects data from the Mask Processor when this signal is active.

The next control word to be considered is the Loop Control word, or control word LC. Again the issue line is bit 0. It says that there is a valid control word in F1 for Loop Control. The first bit is the Begin Vector Loop instruction, a BVL. Next is the adjust loop pointer, it says that a jump loop register pointer instruction is being executed. The t bit is bit 3 and that is the least significant bit of the t field from the instruction. The E field is next and it includes bits 4–6. It selects the VL register entered by the BVL. It also selects the VL register for the adjust loop register pointer instruction and selects the EL register for entry by the BEL. This field also sets the current element register for the adjust loop register pointer instruction. The P field follows and includes bits 7 and 8. It is used by the loop control jump instructions JVL, BEL, or JEL and identifies the particular loop control jump that is being executed at that time. All loop control jumps are under one op code and this field specifies the selected loop control jump. It also specifies the type of adjust loop register pointer. Bit 9 is the store bit. It indicates that a store loop control instruction is being executed. Bit 10 is the load bit, or load instruction and it says that a load loop control is being executed. Next is the move source enable bit 11. It indicates that the LC has been selected for a bimove instruction as a source and the next two bits down select the value to be read from the Loop Control. If the move source field of bits 12, 13 depict a 0, the L field, the length parameter value, selected by the L field of the move instruction is being sourced. If the move source is a 1 then the strip size is being selected. A two says that the MEC value is being selected, while a three says that the element point value is being selected. Bit 14 of the Loop Control word is the move destinate enable bit. This bit is active or set when a loop control is destinated with a move instruction. Bit 15 specifies the register to be written and also whether a write operation is to be executed. Bit 16 is a Loop Control jump bit. It specifies whether or not a loop control jump instruction is executed. This specific jump instruction is specified by the P field. The last two bits, 17, 18 is the length field. It specifies the length parameter that is being selected, whether the element count is 0; 1 is the next element count NCNT, while 2 is ALT 1 and 3 is ALT 2 count.

To summerize these control words, operation and the instruction pipeline has been optimized to keep the SP sections filled with instructions. This is the key that should be kept in mind. If the control word is dispatched to the SP section, then the go instruction from the SP section dispatches the next control word, if the bit F1 is valid.

Figure 49:
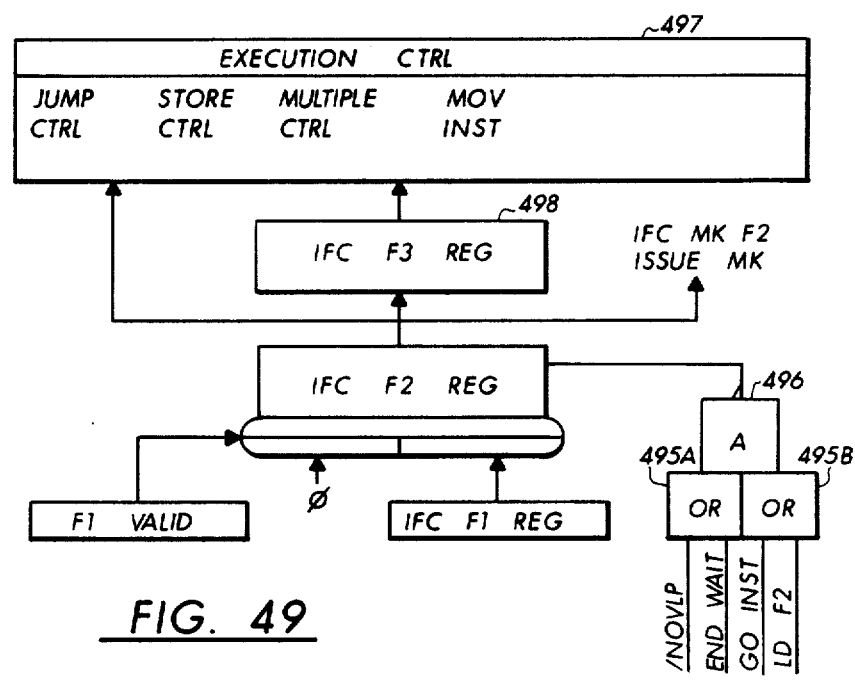
FIG. 49 is a logical block diagram illustrating the operation of the F2 register; which F2 register is present in each section of the machine.

Next consider the operation of the F2 register as illustrated in FIG. 49. Each section of the machine has an F2 register, even the IF section has an F2 register and basically it is the F2 register of the IF that is to be discussed. Notice the plurality of OR gates and the AND gate. These gates provide the enable for the F2 register. The selector address enters the left side of the F2 register and indicates that F1 is valid. Now when F1 is valid, the F1 register is read, however, if F1 is not valid then the inactive state of the signal prevails. Refer again to the enable signal where there is a GO instruction OR'ed with an F2 input signal. Either of these signals are AND'ed with either a NOVLP (no overlap) or OR'ed with an End Wait signal. Various combinations of these input signals are used to load the F2 Register. Now when a nonoverlapped instruction (NOVLP) gets into the machine, it occupies the instruction pipeline totally all the way from F0 to F1 clear into F2. When that nonoverlapped instruction is completed the F2 register is purged, F1 is now invalid and zeros are selected for the locations. When Load F2 returns together with an End Wait condition or a nonoverlapped instruction F2 is again purged. Actually what is happening is that F2 is being cleared out at the same time that F0 is being loaded with the same instruction.

The Execution Control section of the IF section is shown at the top of FIG. 49. Included therein are the jump controls, the store controls, the store instruction controls, and the multiple instructions. In other words the load G multiple, the storaging multiple, the load loop control and the move instructions. These are all nonoverlapped instructions. The IF section also has an F3 register to complete the execution of nonoverlapped instructions.

Consider finally instruction pipeline sequencing. Now there are 5 timing chains that control the sequencing of the instruction pipeline. There is a next instruction timing chain which runs unless the F0 wait timing chain is running. In other words, the F0 wait starts and the next instruction timing chain is shut down.

Figure 50:
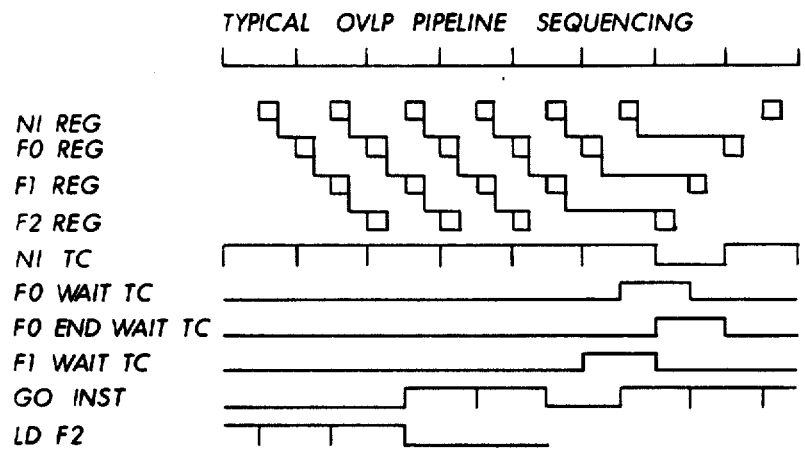
FIG. 50 is a timing diagram showing the sequencing of a typical pipeline for overlapped instruction.

FIG. 50 illustrates a typical sequencing timing diagram of a pipeline for overlapped instructions. Notice that the NI register is continually loading until all of a sudden the pipeline stops for a cycle. The same sequence occurs with F0, F1, F2 notice that the NI timing chain is running all of this time and when this condition occurs, this causes F1 to wait. In other words, a GO instruction has not returned. Remember that an F1 timing chain will fire if F1 is valid and conversely when F1 is valid the F1 timing chain is fired. This, in turn, will cause the F0 wait timing chain to fire and when this wait condition is terminated then the F0 end terminates the F0 wait timing chain and instructions continue. Notice also that the GO instruction returned. Also notice that earlier in the sequence, a plurality of load F2 instructions occurred to cause a number of issue signals to be sent to the SP. The SP returns a GO instruction by keeping the pipeline full of instructions.

Figure 51:
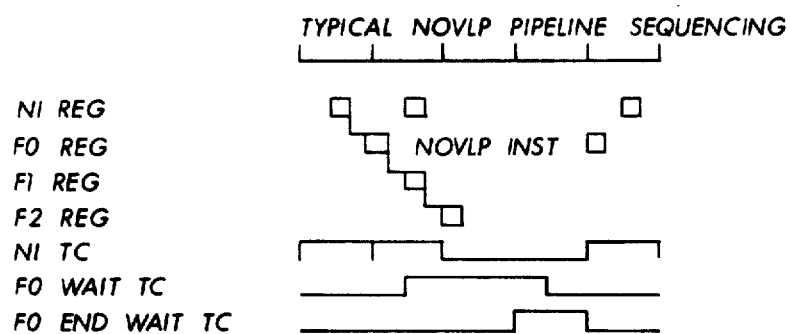
FIG. 51 is a timing diagram of a typical non overlap pipeline sequence.

Next consider FIG. 51 which is a typical nonoverlap pipeline sequence timing diagram. Typically the move instruction or jump instruction takes 90 nanoseconds and once a nonoverlapped instruction gets into the F0 then it occupies the instruction pipeline for the duration of the instruction. So this is a nonoverlapped instruction in the NI register and it finally gets issued to the SP SPM and it moves on into F1 and F2. Of course, it next moves to the pipeline based on the previous instruction. This, of course, is for a best case where there is no delay through the pipeline. Finally, it arrives at F2 where the execution of the instruction is completed. It is important to remember that the F0 register when it is in the nonoverlap condition of the following phase 3, the F0 wait timing chain will be fired and the F0 wait timing chain remains running for the duration of that nonoverlapped instruction or until it is terminated with the F0 wait signal. When this fires, then the F0 wait timing chain ceases and the NI timing chain starts running on to the next cycle while the F0 register is loaded with the next valid instruction. This is the typical sequencing of a nonoverlapped instruction in pipeline.

G. Address Generation

Figure 52:
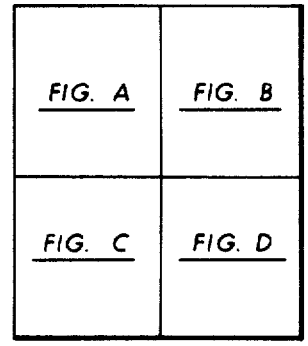
FIG. 52A, FIG. 52B, FIG. 52C and FIG. 52D, when arranged as in FIG. 52, is a detailed logical block diagram of the Address Generation section of the SPM, with the address translation portion of the AG section shown outlined.
Figure 52A:
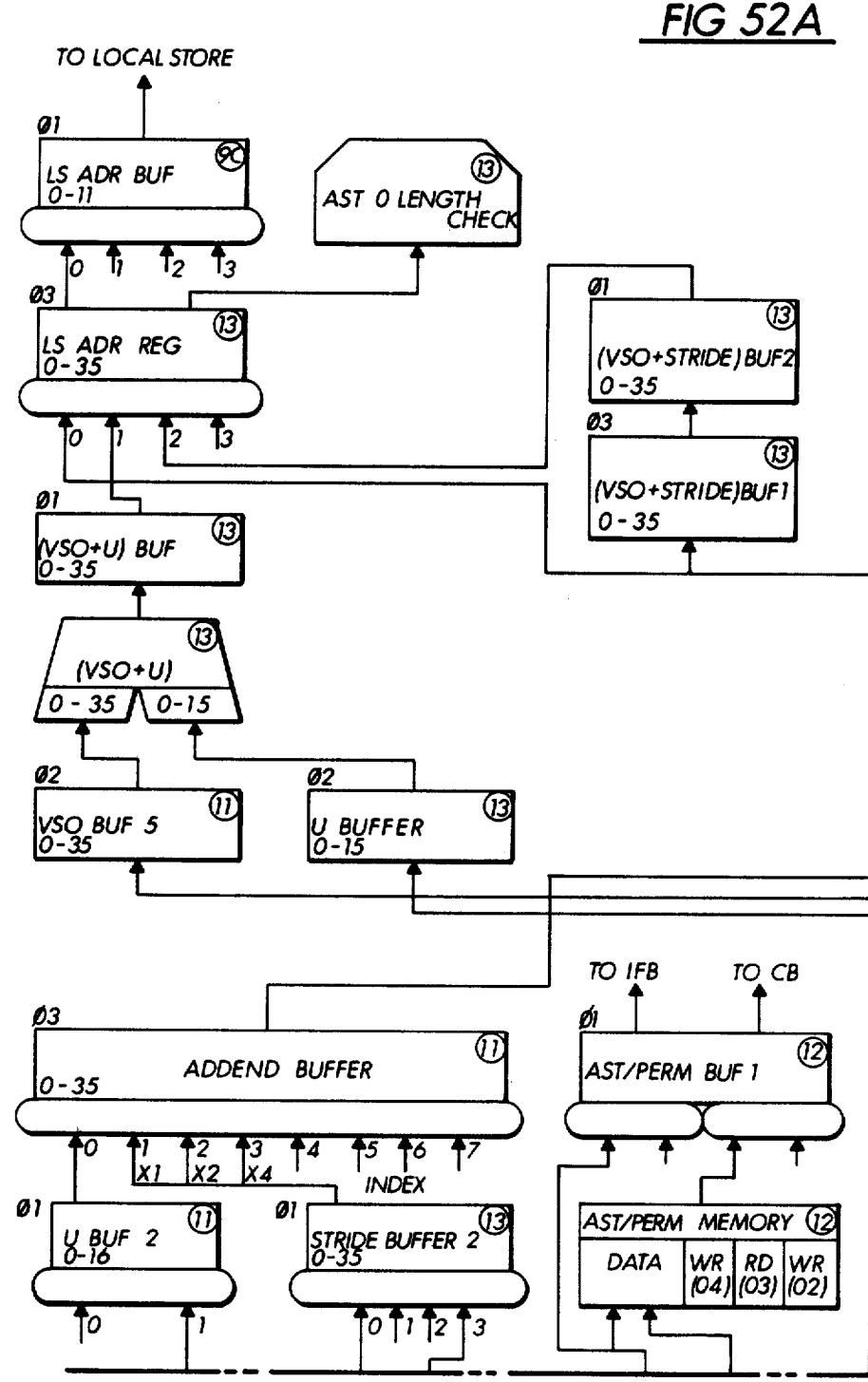
Figure 52B:
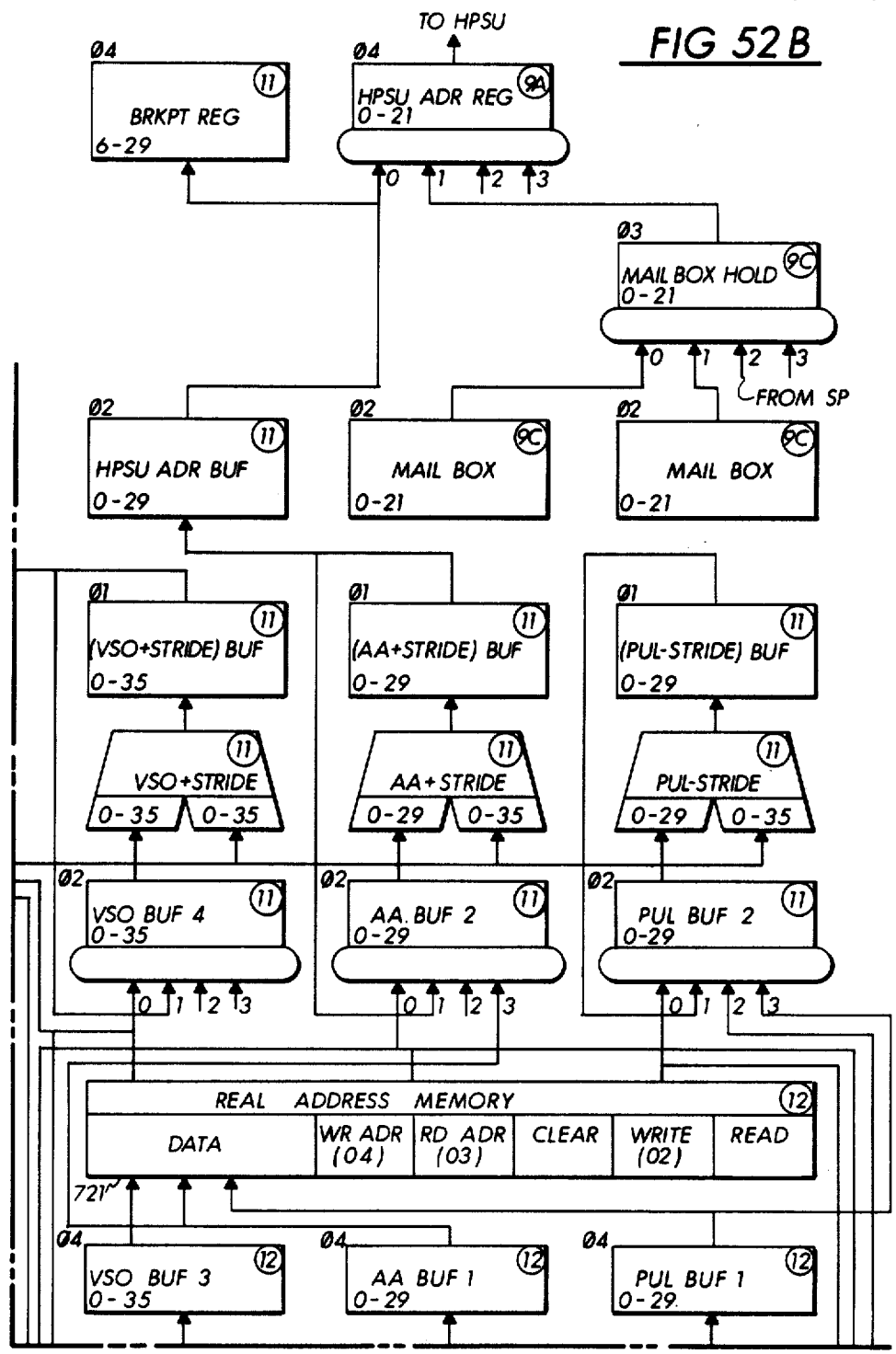
Figure 52C:
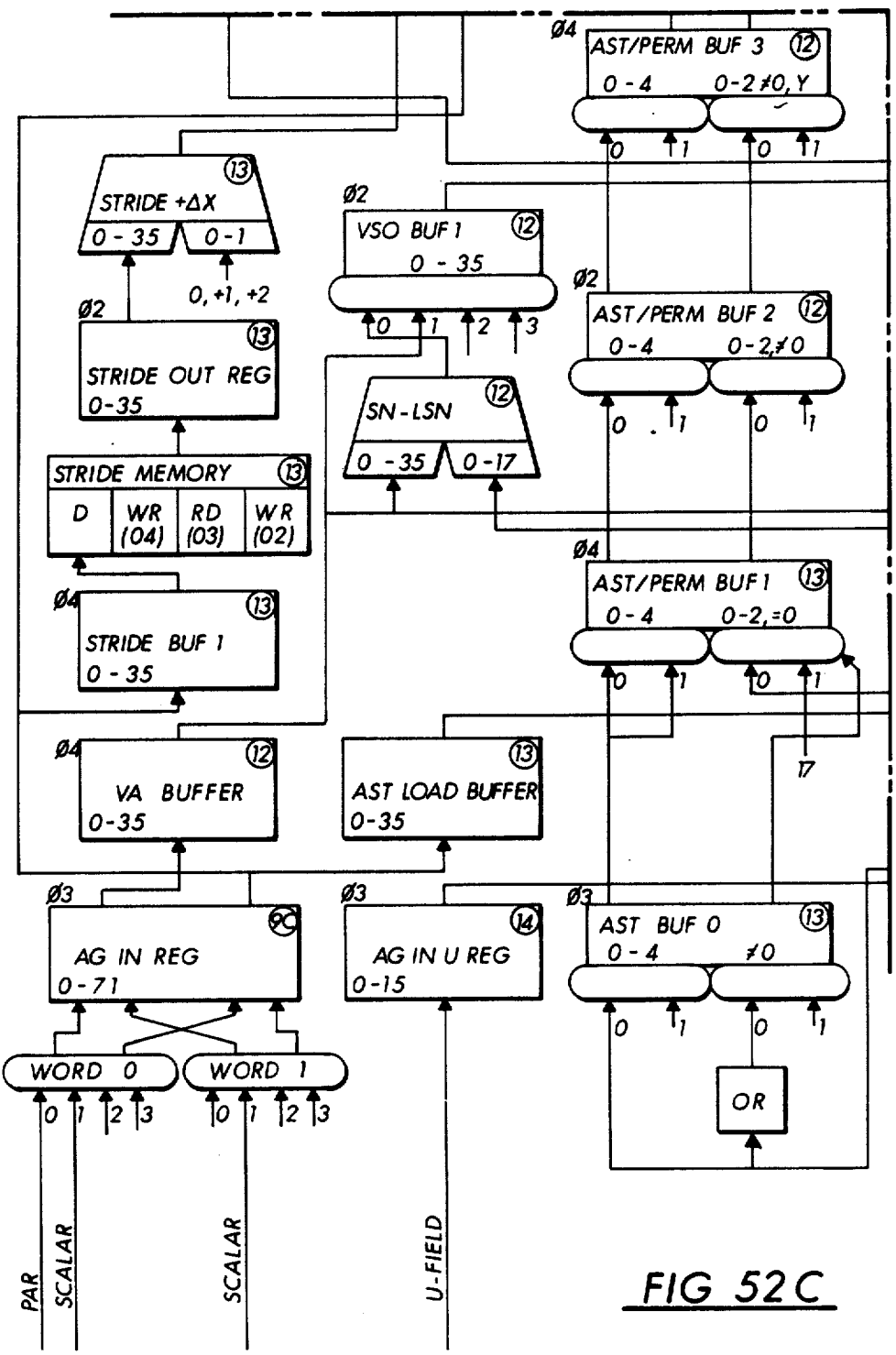
Figure 52D:
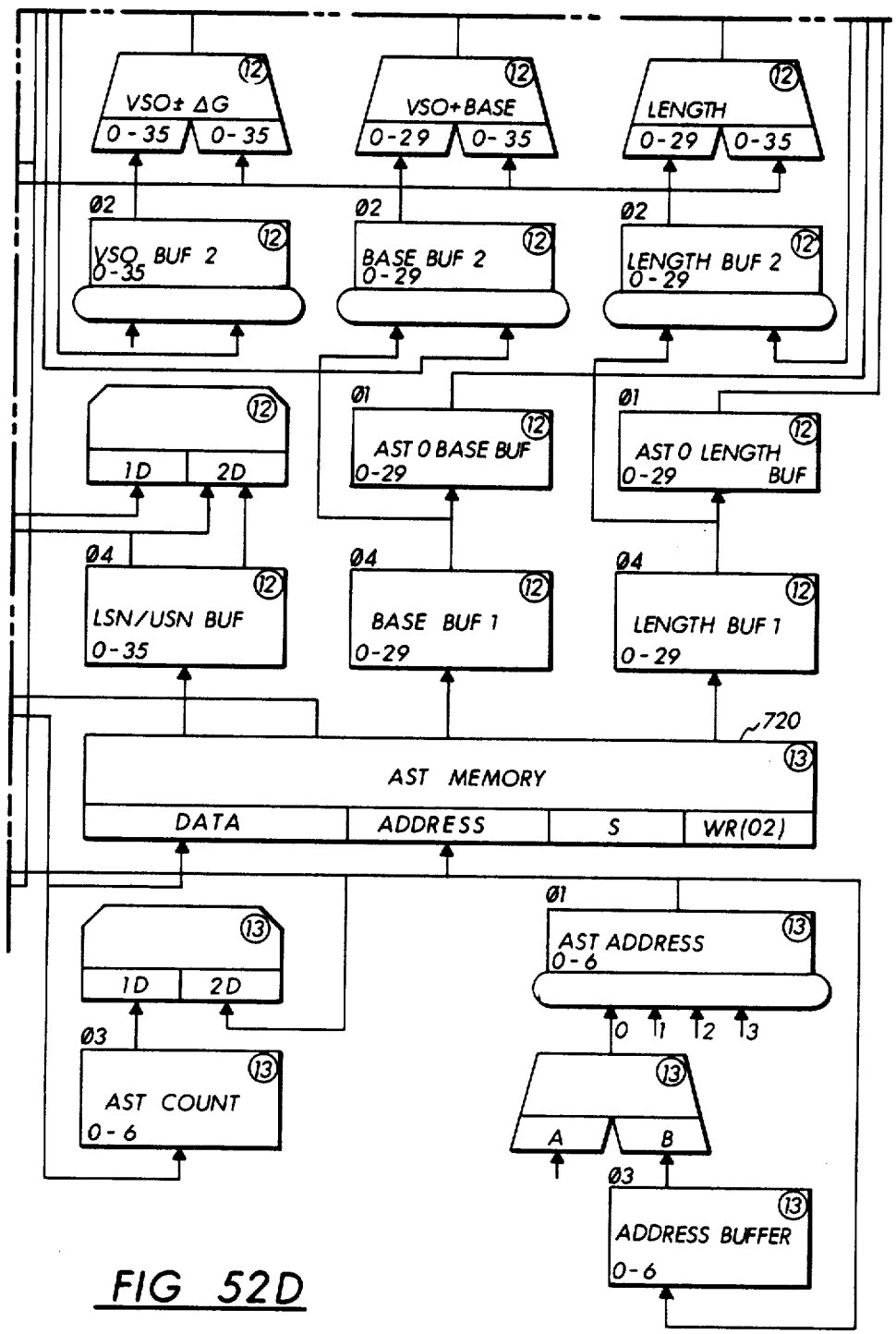

A major portion in any discussion of address generation is translation. The relationship between the two is illustrated in FIGS. 52A through 52B, when arranged as in FIG. 52.

Figure 53:
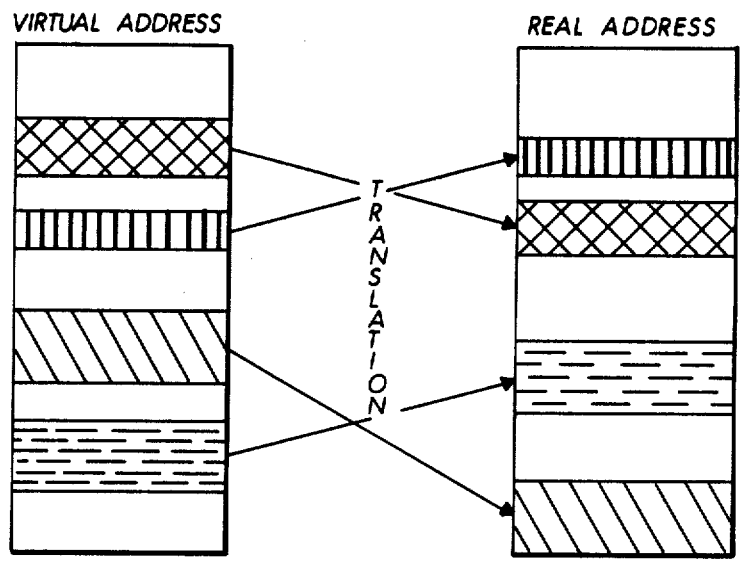
FIG. 53 is a pictorial block diagram illustrating the translation of a virtual address to a real address in the HPSU.
Figure 54:
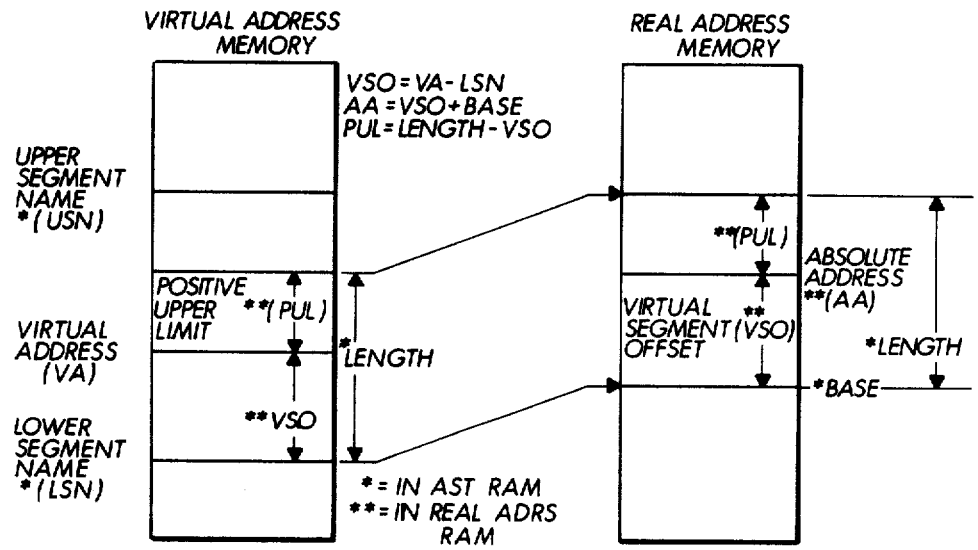
FIG. 54 is another more detailed pictorial block diagram illustrating more specifically how the translation between virtual address and real address is accomplished.

The subject of translation starts with a plan to take a virtual address, which is any address covered by the machine, and translate it into a real address which is within the range of the HPSU. As shown in FIG. 53 each block of virtual addresses translates into a specific block of the same size of real addresses. FIG. 54 is another more detailed illustration of how the translation between virtual addresses and real addresses is accomplished. The Virtual Address block consists of a Lower Segment Name (LSN), or lower limit, and Upper Segment Name (USN), or upper limit. From the virtual address that is given, an offset (VSO) is calculated. This is a distance from the lower limit to the virtual address. Also given is a length, and from the virtual address, the lower limit and the length, a Positive Upper Limit (PUL) may be calculated. This is the distance (PUL) remaining in the segment. All of this may then be translated into the base absolute address and the upper limit in the real address. The Lower Segment Name the Upper Segment Name and the Length are stored in an Activity Segment Table (AST).

Figure 55:
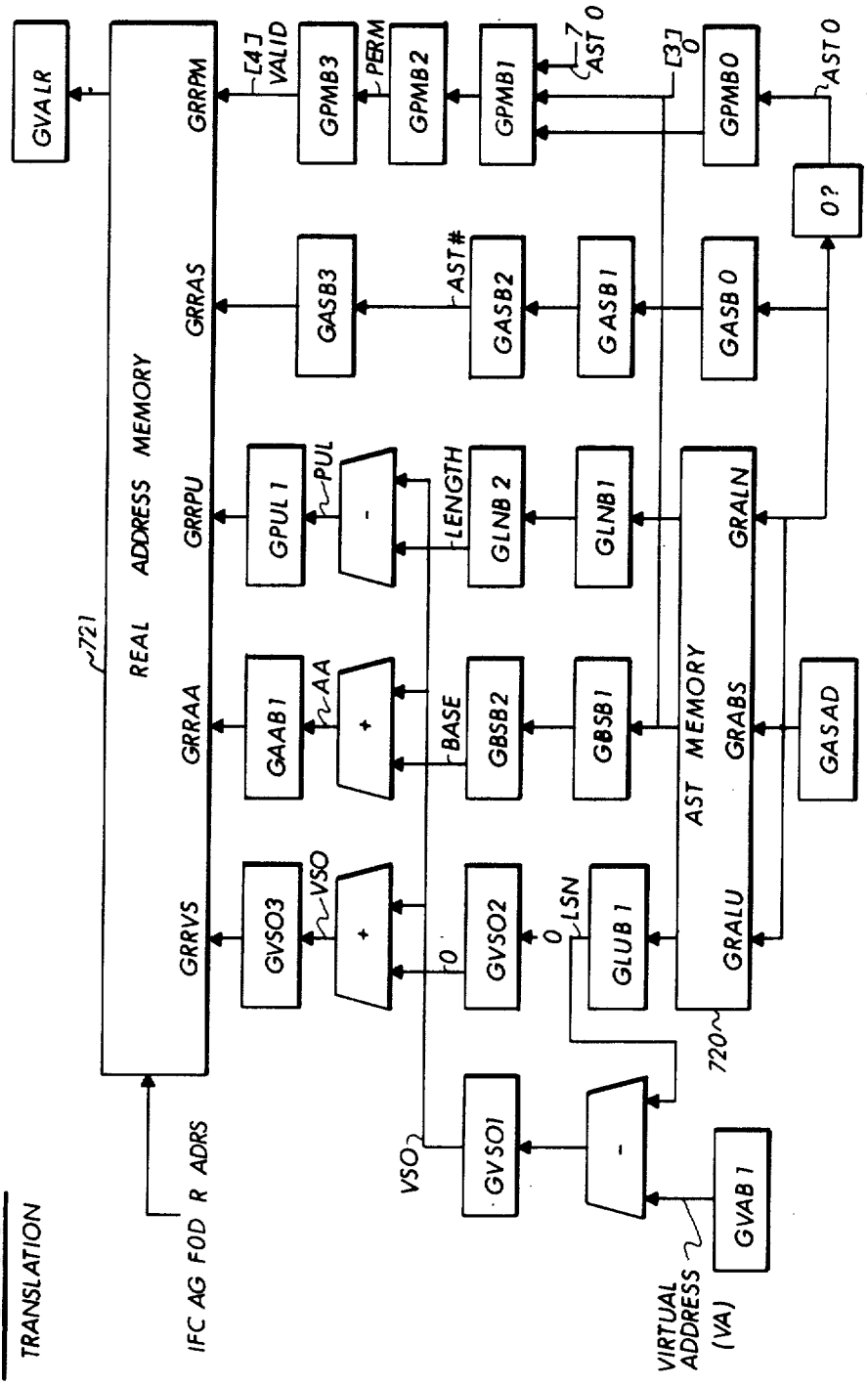
FIG. 55 is a logical block diagram showing how the address translation is logically accomplished via the loading of the AST memory.

FIG. 55 is a logical block diagram showing how the address translation is accomplished via loading the AST memory. To accomplish a translation, first the AST Memory 720 has to be loaded. This is done by an acceleration operation which has already been discussed. Once this AST Memory is loaded, a virtual address is brought in, and a translation is done. To do this, we first come up with an Absolute Address, an Offset and a Positive Upper Limit to store in the Real Address Memory 721.

Figure 56:
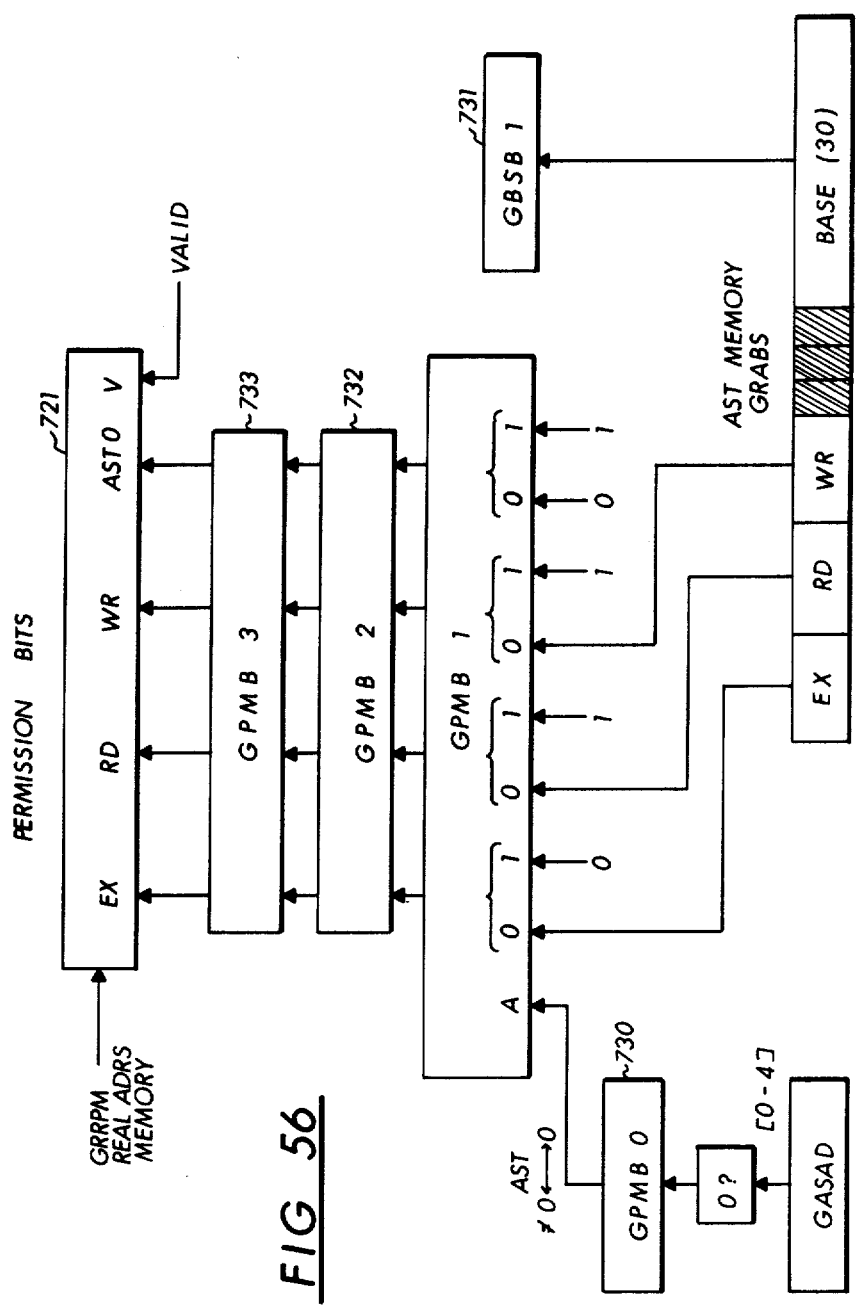
FIG. 56 is a logical block diagram showing the creation of the permission bits in the various register levels between the AST memory and the real address memory.
Figure 57:
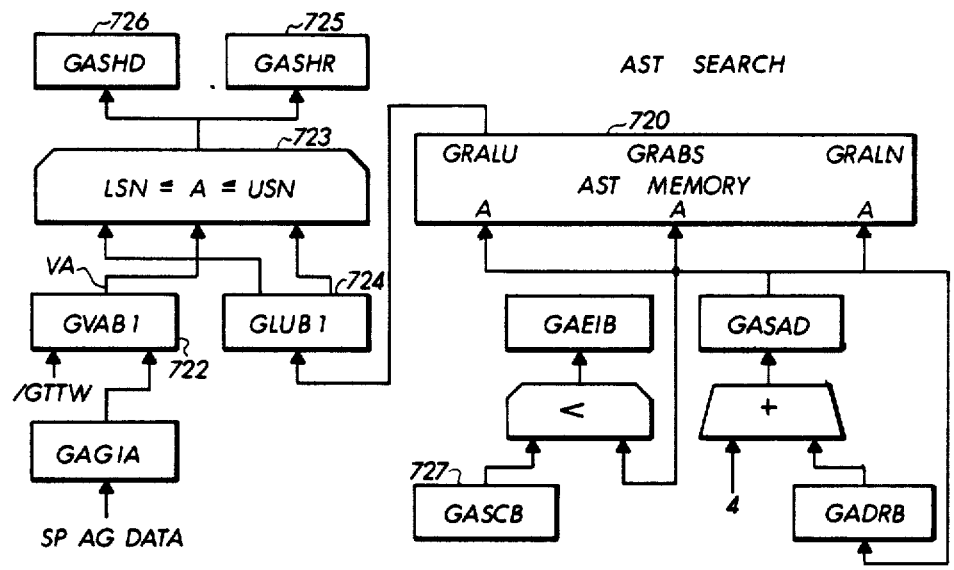
FIG. 57 is a logical block diagram showing the logical path required to accomplish an AST search.
Figure 58:
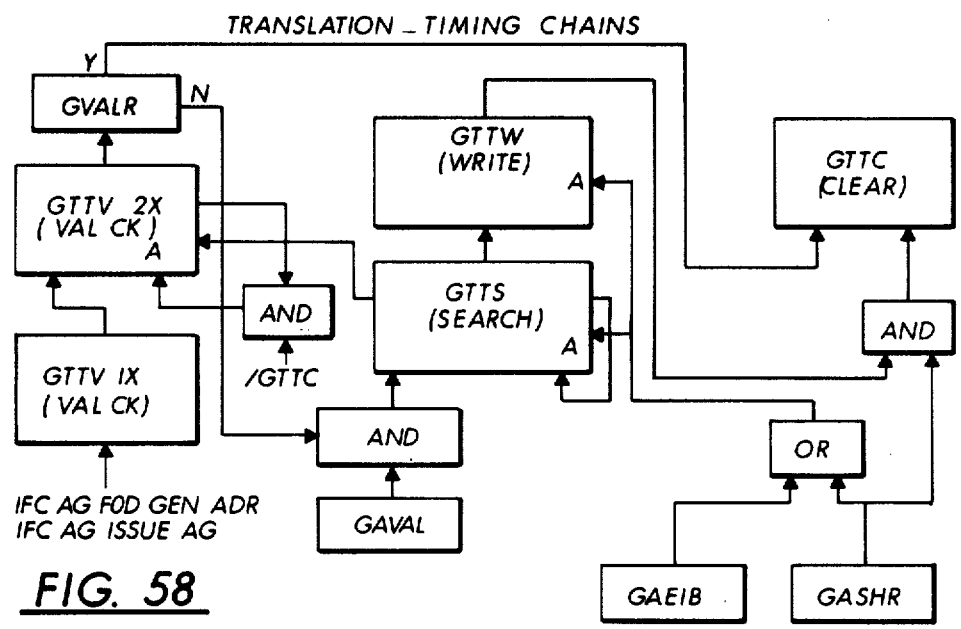
FIG. 58 is a logical block diagram illustrating the translation validity timing chain.
Figure 59:
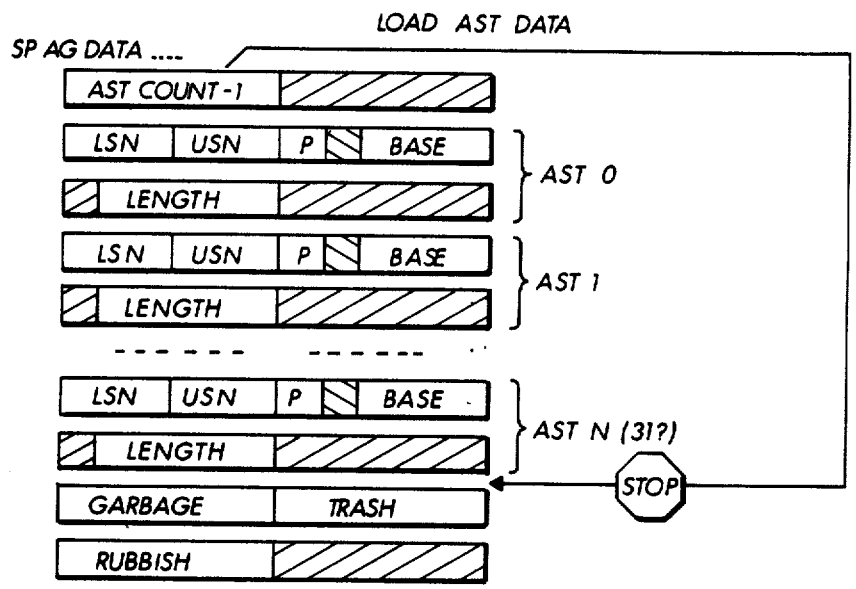
FIG. 59 pictorially illustrates the loading of the Activity Segment Table.
Figure 60:
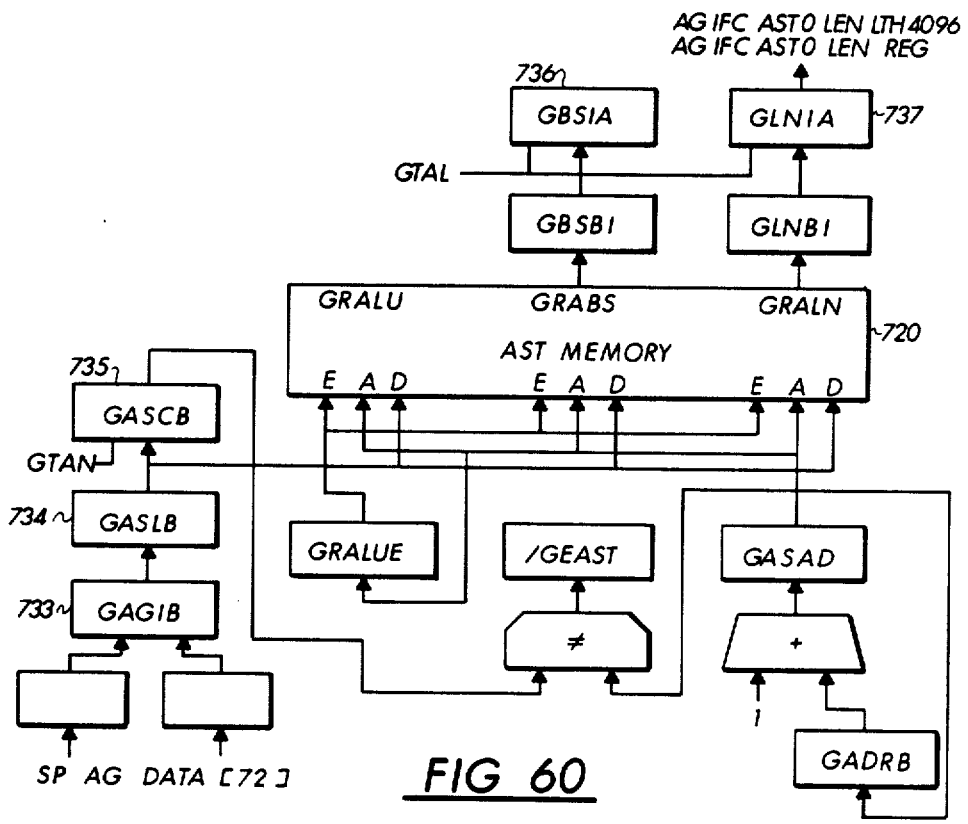
FIG. 60 is a block diagram showing how the loading of the AST is logically accomplished.

FIG. 56 illustrates creation of permission bits. The first thing that is done on a translation operation is to read the Permission (PERM) bits shown in FIG. 56. Next, we check to see whether the R-Register is valid. A particular R Register is pointed at in the Real Address Memory in order to read out the Valid bit. If it is valid, this indicates that the address has already been translated and the information in the Real Address Memory is good and we can go on from there. However, if R is not valid, we have to do an AST search. To do this we have to search the AST memory and look for an entry that corresponds to the incoming address. This is shown in FIG. 57. The virtual address arrives and is stored in the input register of the Address Generation (AG) section. From there it is sent to the virtual address buffer one and then it is applied to a compare circuit. The AST counter starts with a ST zero and counts through the AST memory reading both the lower and upper limits of each AST entry that is applied to the lower and upper buffer one register. The lower limit is compared with the virtual address and with the upper limit. Eventually it is expected that an address or a lower and upper limit will be forced so that the address is between them. When that happens the proper AST segment has been found and the AST hit register and the AST hit delay registers will be set. If an ST hit is not found, that is, if lower and upper limits for this particular address are not found, the AST number will eventually exceed the AST count which is stored in a count buffer. When that happens we will get an interrupt which will stop the AST and send an error message back to the other sections. This counter is also used for loading the AST memory where each of the three sections are loaded separately. So when the AST memory is being read we are not using the lower two bits of the counter. This is the reason that the counter adds four each time it goes through the cycle. Once we have the AST entry, assuming that one has been found, the AST address goes to AST buffer zero. The bits that have been used for the address are also checked to determine if they are zero. If they are, a bit is set in permission bit buffer zero indicating whether or not it is AST zero. Next, the virtual address is applied to an adder with the complement of the lower segment limit and subtracted. This gives us the virtual segment offset. This indicates how far above it is to the virtual address from the lower segment. The virtual segment offset is then applied to three adders. By passing through virtual segment offset buffer two, we wind up with a virtual segment offset. Next, the base address arrives from AST memory. Base buffer one and two are added to the virtual segment offset to give us the absolute address. The length signal passes through the length buffers one and two where the virtual segment offset is subtracted from the length giving us the remaining distance in the segment. This defines the positive upper limit that goes to the positive upper limit buffer one. These three pieces of data are stored in a real address memory at the selected R register address. The AST number goes through AST buffer one, two and three and finally enters the AST entry of the real address memory. The permission bits are actually stored with the base address. Those three bits, the execute permission bit, the read permission bit and the write permission bit enter the permission-in buffer one and on through the permission bits to the real address memory. If, in fact, AST zero is chosen, the read and write permission bits are set to one to execute permission to zero because we cannot execute from the AST zero. Thereafter, the AST zero bit is set to a one and those bits enter and are stored as permission bits. In addition, when a translation is done a valid bit is stored that indicates that the entry is valid when a later translation is attempted on the same R register. Consider again the permission bits shown in FIG. 56. Shown there is the execute bit, the read bit and the writ bit, these comprise the permission bits. They go to permission buffer one address input zero and along with a zero they indicate that this bit is an AST zero entry. This is so whether we are going to Local Store or not. When the permission bits are read from the AST memory, the AST address is checked for zero. If it is present it shifts the address select of the permission buffer one from input zero to input one. In any case whatever bits are selected as permission bits, go through the permission bit buffer two and permission bit buffer three and into the real address memory permission bits along with the valid bit. From the IF AG there is a generate address bit and an issue AG bit. This starts the translation validity check timing chain, shown in FIG. 58, which starts a second cycle of the same timing chain. At this point a looping operation is started. Next, a validity check is made to find out if the contents of the R register are, in effect, valid. If they are, a translation will not be done, rather, the translation clear timing chain is started and if that timing chain does not break the loop, the validity check is continued. If R is not valid it will come to a register which tells us that SP AG data is available and valid. That information will start the search timing chain. Once the search is started the validity check is aborted and the search timing chain supplies the continuous pulses necessary to do an AST search and a translation. This will continue until either an AST hit is made or we run off the end of the AST memory which run off causes an AST end interrupt buffer to be activated. Either one of those signals will abort the search and write timing chain. A hit will start the clear timing chain, however, if we abort because of an interrupt, the clear timing chain is not run, rather an error signal is sent. In addition to loading the real address memory, the SP AG data entering will be loaded into stored memory for use during vector operations. The data information is a seventy-two bit double word. The upper half of that double word contains a virtual address that concurrently goes to virtual address buffer one. Data contained in the lower half of that word goes to stored buffer one. If a translation search timing chain is not being run, the data is locked in store buffer one. However, when a hit is made the write enable input is activated for the stored memory and the same R address that points to the real address memory now points at one of the addresses in stored memory. At that time the data is entered as one location in stored memory for each R register corresponding to an address location of the real address memory. A translation cannot be done without having loaded the AST, the Activity Segment Table. FIG. 59 illustrates the loading of AST data. It is done once during an acceleration operation. It is done through an SP AG data register. As shown in FIG. 59 the first place of data that comes across is an AST count minus one. This indicates the number of valid AST entries that we are going to have. There can be up to thirty-two AST entries, zero through thirty-one. The next two double words contain the information for AST zero. The first, or upper portion of the first word contains the lower and upper segment limits. The lower half of the first double word contains the permission bits and the base real address. The next double word from SP AG data contains the length. This uses only thirty bits, the remaining bits are unused. The second half of the second double word is unused and it is a dead cycle. The next two double words contain the entry for AST register one and so on up to the AG to keep track of the count and stop loading AST entries. Because the SP and the IF are not performing as Address Generators data keeps coming across even though it is not useful to the AG. Also because of this, it is necessary to keep track of it and stop it at the appropriate time. The way the AST is loaded is shown in FIG. 60. It is done with SP AG double word data. Each time it comes across it selects one-half of a word or the other to go into the AG input register. From there it will go to the AST load buffer. The load AST number timing chain runs for only one cycle, that is all that is required to load the first word that comes across which contains the AST count. At that time the AST count buffer is loaded. This is the number of valid AST entries and they will stay here until another acceleration is done. This same count buffer tells us when we are finished loading the AST and the same count buffer that telss us while doing a translation that we have run out AST entries to search, so that number stays in the machine until another acceleration is done. This counter keeps running, each time incrementing by one rather than by fours, since only the upper bits are being used to select an AST address. The lower bits are running the enable register which enables one of the three write enables of the AST memory, either for the lower and upper limits, the base real address or the segment link. The data is entered at the appropriate time through the AST load buffer and is applied to all three data inputs. At the appropriate time, when the proper write enable is active, the data will be present at the input for that entry and the address will be there for that location in the AST memory and the data will get loaded. At the beginning of this operation, when the count becomes equal, the AST memory is cleared and then filled. At that time the counter gets reset to zero and actually reads AST zero. On the last pass of the timing chain, the base one A register and the link one A registers are enabled with the data from AST zero. This data is used for transmitting data to the Local Store from AST zero without having to do a translation. The IF is told the AST zero length. If the length is less than four K the LS handles it but if the length of AST zero is greater than four K then the segment is greater than the LS and it is necessary to go to the HPSU because the Local Store can only hold four K of the segment.

Figure 61:
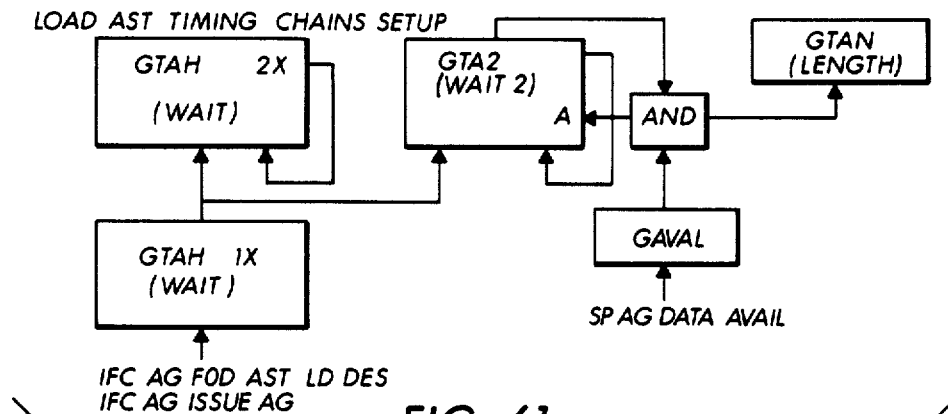
FIG. 61 is a simplified logical block diagram of a load AST timing chain setup.
Figure 62:
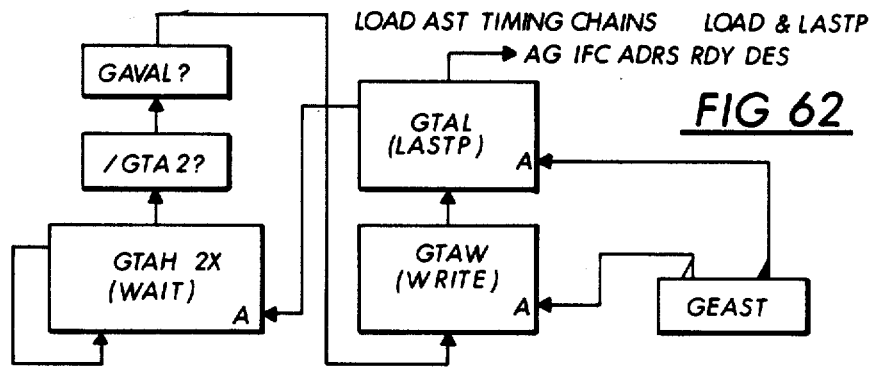
FIG. 62 is also a simplified logical block diagram of additional load AST timing chains.
Figure 63:
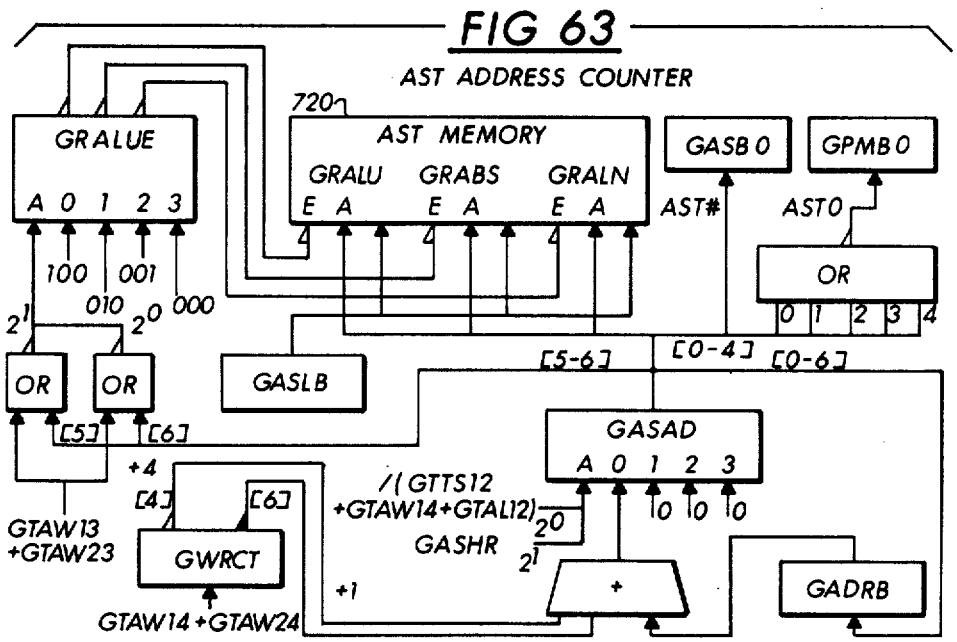
FIG. 63 is a logical block diagram of the address counter used in conjunction with the Activity Segment Table.

The timing chain that controls the loading of the ST is triggered from the control word by AST load disk from FOD and an AG issue as shown in FIG. 61. Starting with a load AST wait timing chain, the second cycle of the wait timing chain cycles within itself. That is, it sets up a loop. The wait two timing chain is also started. These loops will essentially run forever until then are externally halted. This loop is waiting for SP AG data available that indicates that we now have valid AST data entering the AG-in register. This will set the data available designator, which finally will abort this timing chain and start the length timing chain. The length timing chain will only run once. We will look now at the rest of those timing chains as shown in FIG. 62. The length timing chain loads the AST length, the 2× wait timing chain that has been running forever will still continue to run, and will be checked to see if wait two timing chain has been halted by a data available signal. If data is still available, the AST write timing chain is run. This is a two cycle timing chain that actually writes the AST data, the reason that its two cycles is because there are two halves of the word to look at and then it will start the last pass timing chain but since an AST is set while this operation is being done the last pass timing chain will always be aborted so that the pulses will be starting and going into the last pass timing chain and getting aborted. When the AST memory is finally filled or emptied of AST entries, an AST is cleared that aborts the write timing chain. This stops the abort on the last pass timing chain and allows it to go to completion. This, in turn aborts the wait timing chain which stops sending pulses. Finally, an IFC address ready signal is sent that tells us that the Address Generation sequence is done with the load AST and therefore may continue with other operations. If we are loading a full AST that is only thirty-two entries, the operation can wind up taking about 130 cycles or more because there are thirty-two entries of four cycles each plus additional housekeeping chores. The AST address counter is shown in FIG. 63. It loads the AST. The counter is running for both load AST and for translation. All seven bits of the counter are run in a loop. If a translation operation is being done, a translate search timing chain disk register is being run. The write control is not set so the low active output will be set. This is wired to the appropriate bit of the adder and a four will be added each time around. We also increment the AST number one address at a time and those bits are taken together and if none of the bits are set then this will tell us that we are looking at the zero address in the memory or AST zero. When doing an AST load the upper bits are used as the counter to increment this memory but now it is necessary to spend four cycles on each address, that is, each of the the three entries are loaded plus a dead cycle for the unused information from SP AG data. So one of these segments will be running on the AST write time chain which will set the write control designator so only one is added to the counter each time around. When the loading of the ASTs is stopped these time chains will cease and again the counter is cleared with a zero. The lower two bits $2^0$, $2^1$ are applied to the two OR gates along with a pulse from one of the AST write time chain segments.

Figure 64:
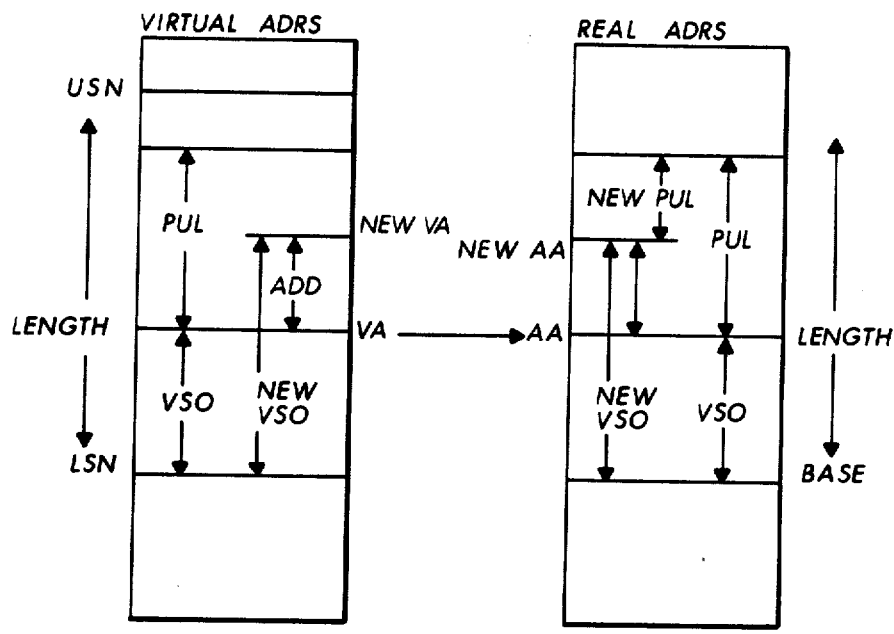
FIG. 64 is another simplified pictorial diagram of the translation operation between a virtual address memory and a real address memory which further shows an update add operation.
Figure 65:
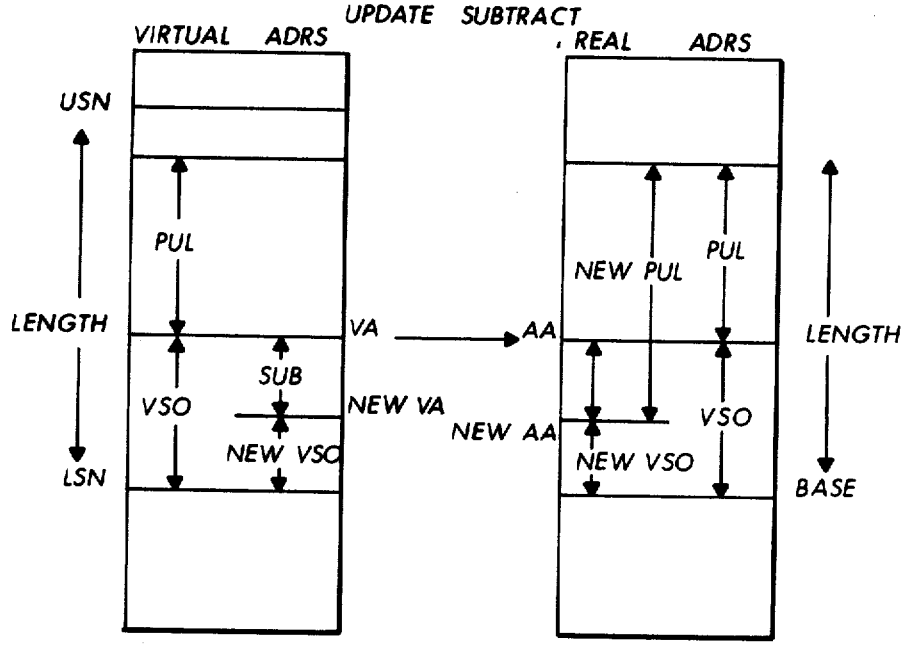
FIG. 65 is a pictorial diagram similar to that in FIG. 64 which further shows an update subtract operation.
Figure 66:
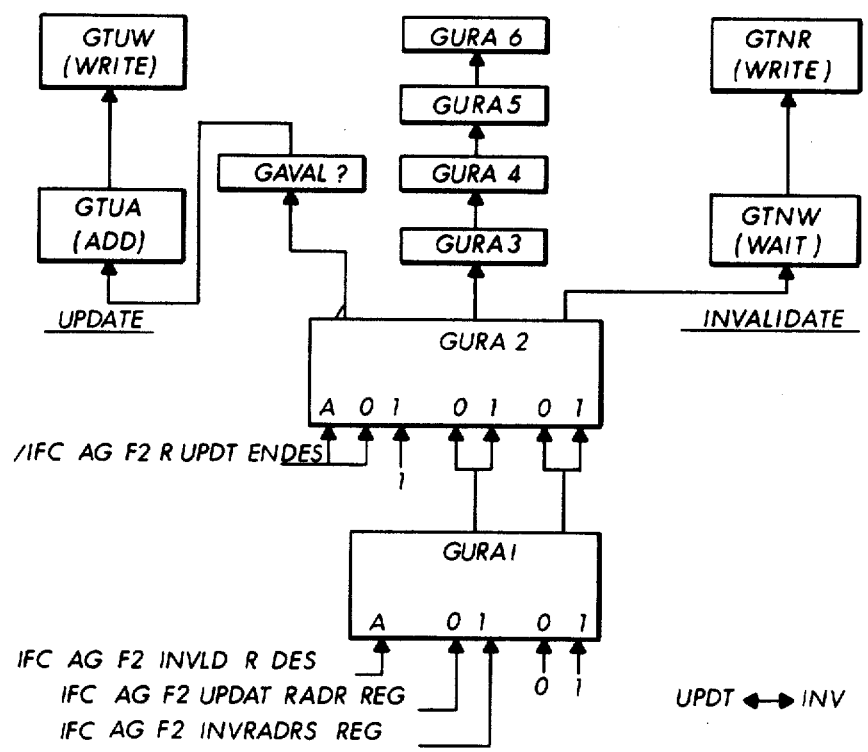
FIG. 66 is a logical block diagram illustrating several timing chains used for update and invalidation operations.

Two other operations will now be discussed that take place in connection with translation. They are the update and the validate operations. With the update operation the data in the real address memory is translated, since it is desired to change the virtual address to the new virtual address, without doing a whole new translation. This is shown in FIG. 64 as an update ADD operation. It is desired to change the data since most of what already exists is usable. So the add information is brought in again through SP AG data and through the AGN register. That tells us the amount that must be added to the old virtual address to get to the new virtual address. Now, from FIG. 64, this number is taken and added to the old virtual segment offset (VSO) to get the new virtual segment offset. Now if that same add information is taken and added to the absolute address the new absolute address is obtained. Conversely, if we subtract it from the old positive upper limit we get the new positive upper limit so the information is from the real address memory. That is, the absolute address, the new absolute address, the new virtual segment offset, and the new upper limit is gotten from the old absolute address and the old upper limit simply by having this small amount added to the virtual address. An update subtract works exactly the same way as shown in FIG. 65, except this data now must be subtracted from the virtual address, subtracted from the absolute address, subtracted from the virtual segment offset to get a new virtual segment offset and further added to the old positive upper limit to get a new positive upper limit. FIG. 66 illustrates the block diagram of the logic necessary to perform an update or an invalidate operation, while FIG. 67 illustrates a more detailed block diagram of the invalidate operation of the real address memory.

Figure 67:
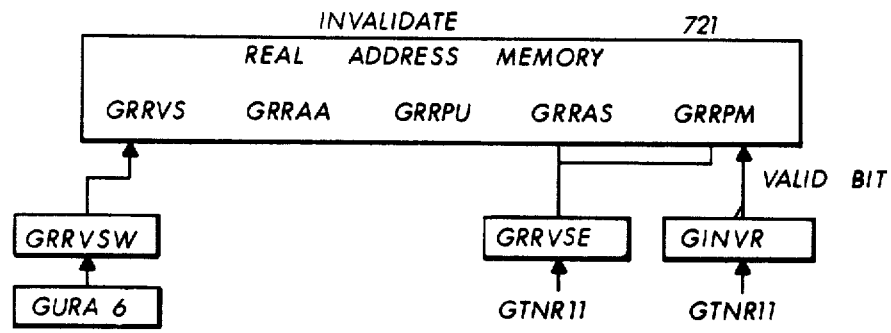
FIG. 67 is a pictorial representation of a simplified block diagram of the input information signals to the real address memory during an invalidation operation.
Figure 68:
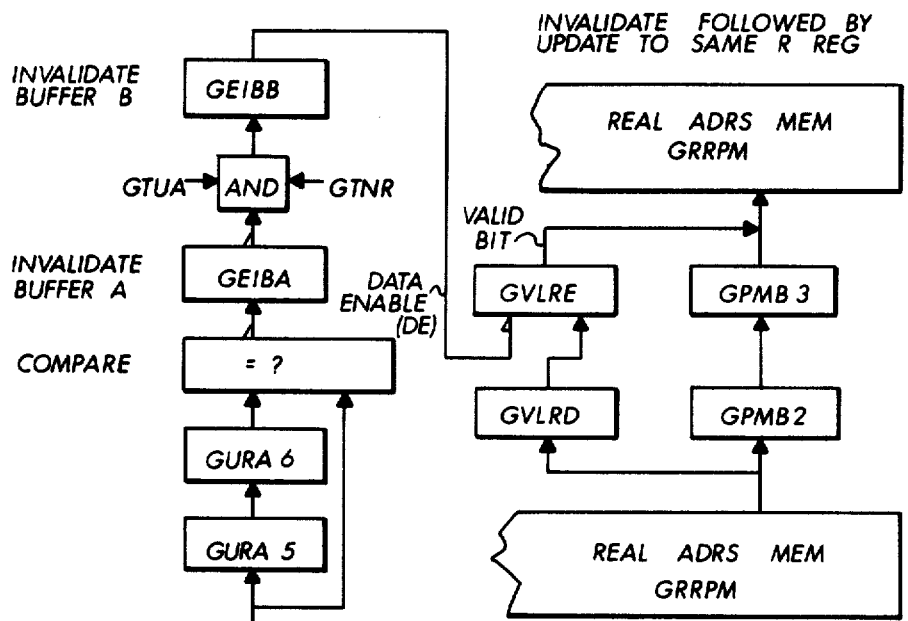
FIG. 68 logically illustrates an invalidate operation followed by an update operation to the same R register.

If it is desired to invalidate the translated data presently in the real address memory, as shown in FIG. 67 it is necessary to update R address register with the new address. To do this, the invalidate write timing chain enables the AST number and the permission bits of the real address memory. That timing chain, in turn, sets the invalidate R register. The low active output is then written into the valid bit which clears it. This indicates that all of the data for that R address is now erroneous and requires a new translation. For example refer to FIG. 68 and consider that an invalidate update signal is received by the update R address 6 (GURA6). A cycle later the update R register will be an update R address 4 (GURA4). At the same time if those are equal as indicated by the compare circuit the low active from that comparator will set a zero which will clear the invalidate buffer A (GE1BA). The output will then become a one indicating that an invalidate and/or update operation one cycle apart is going to the same address. If, in fact, the invalidate signal is first, the invalidate A write will be done at the same time that the update add is being accomplished. If both of those bits are set that says that the timing chains have occurred in the correct sequence and the instruction in the earlier invalidate buffer B register will be done. This disables the data enable on valid R register E (GVLRE) which, in turn, writes a zero into that register. This clears the valid bit and the update is completed.

Figure 69:
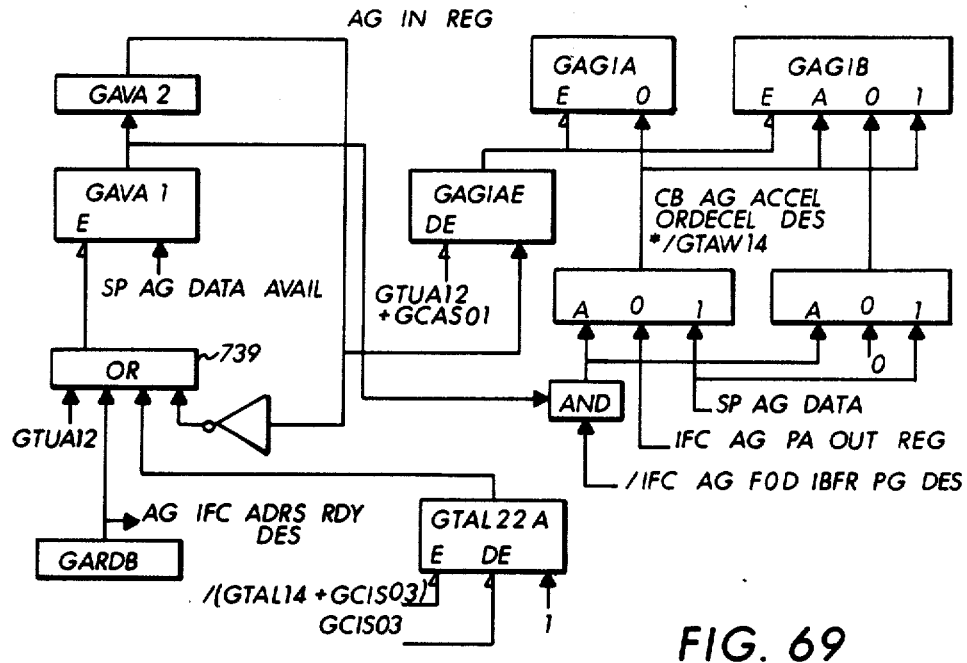
FIG. 69 is a detailed logical block diagram of the input register configuration for the Address Generator (AG).

The AG IN register is shown in FIG. 69. This register can get a little confusing, since there are a number of things that happen here. The first problem is that SP AG data continues even after it is no longer desired, so it is necessary to control the data into the AG IN register. This is done by the SP AG data available signal. It tells us that there is valid data on the SP AG line. What happens is the SP GA data availale bit sets the available one designator (GAVA1) which, in turn, sets the available two designator (GAVA2) and comes around and clears the OR gate. So at this point there is no output from the OR gate. The low active output goes high and locks the available one designator. So what has been done is that the loop is locked and no more data can be clocked in until the OR gate is unlocked. The available two bit is also latched into the address enable (GAGIAE) register locking the door behind the data. The signal that normally unlocks the AG IN register is then sending of the address ready signal back to the IF. This tells the Address Generator that the operation is completed. It also sets the OR gate and clears out the data available by unlocking this loop and setting up for the next piece of data.

The address ready signal is not sent in the case of an update because an update always takes two cycles. Since the address ready signal is not sent there isn't any mechanism to unlock the door for the AG input data. To accomplish the unlocking an update timing change signal is applied to unlock the loop immediately so that it is not necessary to wait for this to propagate through the loop. One other situation is possible to unlock this and that is when an AST load is being performed. Remember that when the AST data was being loaded, all of the AST entries through SP AG data were being brought in. A loading was continued by the presence of the AST bit and the AG control word which keeps the loop unlocked. When the AST load operation is completed, an address ready signal is sent to unlock this loop and the AST load control bit in the timing chain goes away.

So once an AST load operation is completed the door is still open for new data to enter. The next issue clears this and allows this to operate as it normally would for all other operations. The AFG load is only done once during acceleration and won't be done again until an acceleration operation is repeated. We also use the program address out register for some other operations other than those where we are getting an address from SP. Anytime that SP is going to be used for the input we have data available. We then set this latch and its output is applied to the address selecting SP AG data coming in. When a load AST is ordered, that is an acceleration operation, i.e. there is a CB AG acceleration or deceleration of data, so there is the option of selecting word half select zero or one on the AG input register B (GAGIB). In other words, we can select the upper or lower half of SP AG data. That selection, when we are doing the load AST, is done by the AST write timing chain. Since this is a two cycle timing chain each portion runs every other cycle, so DGAW 14 is active and it alternates every other cycle. This has the affect of switching AG IN register B (GAGIB) back and forth between the lower and upper half words to select which portion of SP AG data that is desired.

CONCLUSION

There has been described a tightly coupled data processing system having high performance characteristics for executing scientific instruction, while maintaining the environment and functionality associated with general purpose data processing systems wherein one or more general purpose host processors are utilized for selecting scientific tasks to be performed outside of the general purpose host processors. The general purpose host processors are coupled to high performance storage units and have access to this main storage address space. One or more scientific processors are directly and tightly coupled to the high performance storage units and provide for performance of scientific tasks under the direction of the general purpose host processors. The scientific processors are coupled either directly or through multiple unit adapters in the case of multiple high performance storage units, to the high performance storage main memory system, and operate to receive instructions and data operands therefrom. The scientific processors provide resultant data words back in the high performance storage unit or units and have accessability to the virtual address space of the general purpose host processors. The scientific processor incorporates improved address translation timing and control circuitry that permits the address translation to occur at rates similar to single-register indexing rates. The scientific processor utilizes an Activity Segment Table that is loaded by a controlling general purpose host processor for controlling accessing the tightly coupled high performance storage unit and is utilized in the formation of virtual addresses in the virtual address space of the host processor. From the foregoing description, and from the accommodation of teachings of the referenced co-pending patent applications, it is clear that the various stated purposes and objectives of the invention have been met and have been described. Recognizing that various modifications and alterations of the described embodiments will become apparent to those skilled in the art, what is desired to be protected by Letters Patent is set forth in the appended claims.

We claim:

1. A tightly coupled data processing system for executing both scientific instructions and general purpose data processing instructions comprising:

high performance storage unit means for providing addressable storage of first data words and first instruction words for use in general purpose operations and second data words and second instruction words for use in scientific operations, said high performance storage unit means including a plurality of addressable storage locations, reading and writing means, general purpose port means addressably coupled to said plurality of addressable storage locations, scientific port means addressably coupled to said plurality of addressable storage locations, and request/acknowledge means for controlling access to each referenced one of said plurality of addressable storage locations for activating said reading and writing means such that conflicts in any such references are arbitrated and only one such reference at a time is permitted;

general purpose host processor means for performing general purpose tasks and for selecting and controlling scientific tasks to be performed outside said general purpose host processor means, said general purpose host processor means including first port means directly coupled to said general purpose port means of said high performance storage unit means for reading and writing said first data words and said first instruction words required to perform said general purpose tasks and for selecting and controlling said scientific tasks;

scientific processor means having second port means directly coupled to said scientific port means of said high performance storage unit means for reading and writing second data words and said second instruction words for use in scientific operations, thereby having common access to said addressable storage locations available to said general purpose host processor means, whereby a tightly coupled data processing system wherein one or more ones of said scientific processor means share said plurality of storage locations of said high performance storage unit means with said general purpose host processor means to enable rapid task activity transfer and sharing between said general purpose host processor means and said scientific processor means.

2. The invention as set forth in claim 1 wherein said scientific processor means includes:

interface means coupled to said second port means of said scientific processor means for receiving said second data words and said second instruction words from said high performance storage unit means and for transmitting resultant data words to said high performance storage unit means;

unit control and timing means coupled to said interface means for providing timing and control signals for synchronizing operation with the operation of said general purpose host processor means and the high performance storage unit means; and local store means coupled to said interface means and coupled to said unit control and timing means for temporarily storing said second data words and said second instruction words received from said interface means and for at least temporarily storing said resultant data words for transmission through said interface means to said high performance storage unit means where it can be directly accessed by said general purpose host processor means.

3. The invention as set forth in claim 2 wherein said scientific processor means is capable of both scalar and vector processing and includes:

scalar processor module means coupled to said unit control and timing means and coupled to said local store means for performing scalar data processing instructions; and vector processor module means coupled to said unit control and timing means and coupled to said local store means for performing vector data processing instructions;

wherein both scalar operands and vector operands can be efficiently manipulated in various combinations under program control of said general purpose host processor means to make resultant data words available to said high performance storage unit means all without the requirement of dedicated or cached memory.

4. The invention as set forth in claim 3 wherein said scalar processor module means includes:

instruction flow means coupled to said interface means for receiving instruction words and for controlling the execution of instructions in response thereto;

scientific processor control block means for controlling the functioning of said scientific processor means;

mask processor means for selectively preventing the passage of information to said high performance storage unit means;

address generation means for generating addresses to be referenced in said high performance storage unit means;

scalar processor arithmetic logic unit means for performing scalar instruction manipulation of scalar data words read from said local store means;

loop control means for controlling nested loops of instructions; and store buffer means for at least temporarily storing said resultant data words and for making said resultant data words available to said interface means for transmission to said high performance storage unit means.

5. The invention as set forth in claim 4, wherein said vector processor module means includes:

vector control means for controlling vector operands to be processed;

vector file means for temporarily storing vector operands to be processed;

vector load means coupled to said vector control means and coupled to said vector file means for managing and timing storage of vector operands in said vector file means;

vector store means for transferring resultant vector operands for storage;

scalar/vector data transfer control means for selectively directing operands between scalar and vector processing operations;

add pipeline means for performing pipelined vector instruction functions involving addition;

multiply pipeline means for performing pipelined vector multiply functions;

move pipeline means for moving resultant vector data words to storage;

said add pipeline means, said multiply pipeline means, and said move pipeline means, operable in parallel for performing simultaneous respective functions; and conflict detection means coupled intermediate said vector file means and said add pipeline means, said multiply pipeline means, and said move pipeline means, for detecting conflicts in reference to respective ones of the vector operands therebetween.

6. The invention as set forth in claim 3 wherein said general purpose host processor means provides scientific processor control block information to said scientific processor means for controlling the scientific task to be performed by said scientific processor means, and wherein said scientific processor means includes activity segment table means and associated control circuitry responding to said scientific processor control block information and for storing signals for defining a called program code and data segments.

7. The invention as set forth in claim 6 wherein a copy of the contents of said activity segment table means is simultaneously maintained in said high performance storage unit means for permitting said general purpose host processor means to have common access to data words utilized or provided by said scientific processor means within said high performance storage unit means.

8. The invention set forth in claim 6 wherein said scientific control block information includes virtual address signals for defining virtual address space in said high performance storage unit means for a currently executing program in said scientific processor means, and said virtual address signals are stored in said activity segment table means for use by said scientific processor means in controlling address translation.

9. A tightly coupled data processing system for executing both scientific tasks and general purpose tasks comprising:

high performance storage unit means for providing addressable storage of operands, general purpose task instructions and scientific task instructions and having scientific processor port means and host processor port means for providing access thereto, said high performance storage unit means including means for reading and writing instructions and operands utilized in general purpose tasks and in scientific tasks as they are being executed;

general purpose host processor means coupled to said host processor port means for controlling performance of both of said general purpose tasks and scientific tasks; and scientific processor means coupled to said scientific processor port means for performing scientific tasks designated by said general purpose host processor means with direct access to said high performance storage unit means for obtaining instructions and operands and storing resultant operands, whereby said scientific processor means is tightly coupled to said general purpose host processor means and under its operating control.

10. The invention as set forth in claim 9 wherein said scientific processor means includes:

interface means coupled to said scientific processor port means at said scientific processor means for receiving data words and instruction words from said high performance storage unit means and for transmitting resultant data words to said high performance storage unit means;

unit control and timing means coupled to said interface means for providing timing and control signals for synchronizing operation with the operation of said general purpose host processor means and the high performance storage unit means; and local store means coupled to said interface means and coupled to said unit control and timing means for temporarily storing said scientific task data words and instruction words received from said interface means and for at least temporarily storing said resultant data words for transmission through said interface means to said high performance storage unit means where it can be directly accessed by said general purpose host processor means.

11. The invention as set forth in claim 10 wherein said scientific processor means is capable of both scalar and vector processing and includes:

scalar processor module means coupled to said unit control and timing means and coupled to said local store means for performing scalar data processing instructions; and vector processor module means coupled to said unit control and timing means and coupled to said local store means for performing vector data processing instructions;

wherein both scalar operands and vector operands can be efficiently manipulated in various combinations under program control of said general purpose host processor means to make resultant data words available to said high performance storage unit means all without the requirement of dedicated or cached memory.

12. The invention as set forth in claim 11 wherein said general purpose host processor means provides scientific processor control block information to said scientific processor means for controlling the scientific task to be performed by said scientific processor means, and wherein said scientific processor means includes activity segment table means and associated control circuitry responding to said scientific processor control block information and for storing signals for defining a called program code and data segments.

13. The invention as set forth in claim 12 wherein a copy of the contents of said activity segment table means is simultaneously maintained in said high performance storage unit means for permitting said general purpose host processor means to have common access to data words utilized or provided by said scientific processor means within said high performance storage unit means.

14. The invention set forth in claim 13 wherein said scientific control block information includes virtual address signals for defining virtual address space in said high performance storage unit means for a currently executing program in said scientific processor means, and said virtual address signals are stored in said activity segment table means for use by said scientific processor in controlling address translation.

15. A tightly coupled data processing system for executing general purpose programs and scientific programs while maintaining the functionality of a general purpose processing system comprising:
 common main storage system means for providing addressable storage for addressably storing scalar instruction words and vector instruction words and for addressably storing scalar data words and vector data words and having first interface means and second interface means;
 general purpose host processor means directly coupled to said first interface means of said common main storage system means for receiving instruction words and data words therefrom and providing resultant data words thereto;
 scientific processor means, having a scalar processor means and a vector processor means for respectively performing scalar and vector operations, directly coupled to said second interface means of said common main storage system means for receiving instruction words and data words therefrom and providing resultant data words thereto;
 wherein both general purpose functions and scientific functions may be respectively performed by said general purpose host processor means and said scientific processor means, each having storage access to the information of the other in said common main storage means via its respective one of said first interface means and said second interface means to thereby directly provide a tight storage coupling therebetween.

16. The invention as set forth in claim 15 wherein said tightly coupled data processing system includes:
 virtual address means for providing said scientific processor means tightly coupled access to the virtual address space of said general purpose host processor means.

17. The invention as set forth in claim 16 wherein said scientific processor means also includes:
 third interface means for coupling said scientific processor means to said common main storage system means for receiving said data words and said instruction words from said common main storage system means and for transmitting said resultant data words to said common main storage means;
 unit control and timing means coupled to said third interface means for providing timing and control signals for synchronizing operation of said scientific processor means with the operation of said general purpose host processor means and said common main storage system means; and
 local store means coupled to said third interface means and coupled to said unit control and timing means for temporarily storing said data words and said instruction words received from said third interface means and for at least temporarily storing said resultant data words for transmission through said third interface means to said common main storage stystem means where it can be directly accessed by said general purpose host processor means.

18. The invention as set forth in claim 17 wherein said scientific processor means is capable of both scalar and vector processing and includes:
 scalar processor module means coupled to said unit control and timing means and to said local store means for performing scalar data processing instructions; and
 vector processor module means coupled to said unit control and timing means and coupled to said local store means for performing vector data processing instructions;
 wherein both scalar operands, scalar control, and vector operands can be efficiently manipulated in various combinations under program control of said general purpose host processor means to make resultant data words available to said common main storage system means all without the requirement of a dedicated or cached memory.

19. The invention as set forth in claim 18 wherein said scalar processor module means includes:
 instruction flow means coupled to said third interface means for receiving instruction words and for controlling the execution of instructions in response thereto;
 scientific processor control block means for controlling the functioning of said scientific processor means;
 mask processor means for selectively preventing the passage of information to said common main storage system means;
 address generation means for generating addresses to be referenced in said common main storage system means;
 scalar processor arithmetic logic unit means for performing scalar instruction manipulation of scalar data words read from said local store means;
 loop control means for controlling nested loops of instructions; and
 store buffer means for at least temporarily storing said resultant data words and for making said resultant data words available to said third interface means for transmission to said common main storage system means.

20. The invention as set forth in claim 19 wherein said general purpose host processor means provides scientific processor control block information to said scientific processor means for controlling the scientific task to be performed by said scientific processor means, and wherein said scientific processor means includes activity segment table means and associated control circuitry responding to said scientific processor control block information and for storing signals for defining a called program code and data segments.

21. The invention as set forth in claim 20 wherein a copy of the contents of said activity segment table means is simultaneously maintained in said common main storage system means for permitting said general purpose host processor means to have common access to data words utilized or provided by said scientific processor means within said common main storage system means.

22. The invention set forth in claim 21 wherein said scientific control block information includes virtual address signals for defining virtual address space in said common main storage system means for a currently executing program in said scientific processor means, and said virtual address signals are stored in said activity segment table means for use by said scientific processor in controlling address translation.

23. The invention as set forth in claim 18, wherein said vector processor module means includes:
   vector control means for controlling vector operands to be processed;
   vector file means for temporarily storing vector operands to be processed;
   vector load means coupled to said vector control means and coupled to said vector file means for managing and timing storage of vector operands in said vector file means;
   vector store means for transferring resultant vector operands for storage;
   scalar/vector data transfer control means for selectively directing operands between scalar and vector processing operations;
   add pipeline means for performing pipelined vector instruction functions involving addition;
   multiply pipeline means for performing pipelined vector multiply functions;
   move pipeline means for moving pipelined resultant data words to storage;
   said add pipeline means, said multiply pipeline means, and said move pipeline means, operable in parallel for performing simultaneous respective functions; and
   conflict detection means coupled intermediate said vector file means and said add pipeline means, said multiply pipeline means, and said move pipeline means, for detecting conflicts in reference to respective ones of the vector operands therebetween.

24. A tightly coupled data processing system for executing scientific tasks and general purpose tasks comprising:
   a plurality of high performance storage unit means for providing addresable storage, each having a plurality of scientific processor port means and a plurality of host processor port means for providing access thereto and for providing storage of instruction words and operand words utilized in general purpose tasks and scientific tasks;
   a plurality of host processor means, each coupled to said plurality of high performance storage unit means through respectively associated ones of said plurality of host processor port means, each of said plurality of host processor means capable of controlling performance of tasks;
   a plurality of scientific processor means for performing scientific tasks designated by ones of said plurality of general purpose host processor means, each of said plurality of scientific processor means having interface means; and
   a plurality of multiple unit adapter means, each one coupled intermediate an associated one of said interface means of one of said plurality of scientific processor means and said plurality of high performance storage unit means through respectively associated ones of said plurality of scientific processor port means, and each of said plurality of multiple unit adapter means for providing tightly coupled access of the respectively associated ones of said scientific processor means to said plurality of high performance storage unit means for providing access to storage common to said plurality of general purpose processor means.

25. A tightly coupled data processing system as in claim 24 wherein each of said plurality of scientific processor means includes virtual address means for providing access to the virtual address space of selected ones of said plurality of host processor means.

26. A tightly coupled data processing system for executing scientific tasks and general purpose tasks comprising:
   high performance storage unit means for providing addressable storage and having a scientific processor port means and a plurality of host processor port means for providing access thereto, said high performance storage unit means for providing storage of instruction words and operand words utilized in general purpose tasks and scientific tasks;
   a plurality of host processor means each coupled to said high performance storage unit means through respectively associated ones of said plurality of host processor port means, each of said plurality of host processor means for controlling performance of tasks;
   scientific processor means for performing scientific tasks designated by ones of said plurality of general purpose host processor means, and including interface and control means coupled to said scientific processor port means of said high performance storage unit means for providing tightly coupled access to the address space common to ones of said plurality of host processor means.

27. The invention of claim 26 wherein said scientific processor means includes activity segment table means for use in the formation of virtual addresses in the virtual address space of ones of said plurality of host processor means.

28. The invention of claim 27 and further including:
   a plurality of said high performance storage unit means; and
   multiple unit adapter means coupled intermediate said scientific processor means and said plurality of high performance storage unit means for controlling access thereto.

29. The invention of claim 27 and further including:
   a plurality of said high performance storage unit means;
   a plurality of scientific processor means; and
   a plurality of multiple unit adapter means each coupled intermediate an associated one of said plurality of scientific processor means and said plurality of high performance storage unit means.

* * * * *